(12) United States Patent
Fujita et al.

(10) Patent No.: US 10,318,063 B2
(45) Date of Patent: Jun. 11, 2019

(54) TOUCHSCREEN PANEL, AND METHOD OF INITIALIZING TOUCHSCREEN PANEL

(71) Applicant: FUJITSU COMPONENT LIMITED, Tokyo (JP)

(72) Inventors: Kenichi Fujita, Tokyo (JP); Satoshi Sakurai, Tokyo (JP); Hiroshi Hasegawa, Tokyo (JP); Masanobu Hayama, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 0 days.

(21) Appl. No.: 14/640,115

(22) Filed: Mar. 6, 2015

(65) Prior Publication Data

US 2015/0177892 A1 Jun. 25, 2015

Related U.S. Application Data

(62) Division of application No. 14/265,702, filed on Apr. 30, 2014, now abandoned, which is a division of
(Continued)

(30) Foreign Application Priority Data

Jul. 22, 2010 (JP) ................................. 2010-165325
Sep. 28, 2010 (JP) ................................. 2010-217560
Oct. 27, 2010 (JP) ................................. 2010-241370

(51) Int. Cl.
*G06F 3/041* (2006.01)
*G06F 3/045* (2006.01)

(52) U.S. Cl.
CPC ............ *G06F 3/0418* (2013.01); *G06F 3/045* (2013.01); *G06F 3/0416* (2013.01); *G06F 2203/04104* (2013.01)

(58) Field of Classification Search
None
See application file for complete search history.

(56) References Cited

U.S. PATENT DOCUMENTS 5,324,895 A 6/1994 Inamori et al.
5,367,130 A 11/1994 Isono
(Continued)

FOREIGN PATENT DOCUMENTS

CN 1420474 5/2003
CN 101587412 11/2009
(Continued)

OTHER PUBLICATIONS

Office Action dated Oct. 14, 2015 issued with respect to the related U.S. Appl. No. 14/265,702.
(Continued)

*Primary Examiner* — Christopher R Lamb
(74) *Attorney, Agent, or Firm* — IPUSA, PLLC

(57) ABSTRACT

A touchscreen panel includes a first resistive film having a first electrode and a second electrode provided at corresponding ends thereof in a first direction; a second resistive film having a third electrode and a fourth electrode provided at corresponding ends thereof in a second direction perpendicular to the first direction; and a switch having a first end connected to the first electrode and a second end connected to a first end of a resistor group including a plurality of resistors, the resistor group having a second end connected to a certain electric potential. The switch is configured to allow one of the resistors of the resistor group to be selected and connected in series to the first resistive film.

2 Claims, 67 Drawing Sheets

Related U.S. Application Data application No. 13/177,238, filed on Jul. 6, 2011, now Pat. No. 8,760,434.

(56) References Cited

U.S. PATENT DOCUMENTS

| | | | |
|---|---|---|---|
| 5,432,304 | A | 7/1995 | Tanahashi |
| 5,777,604 | A | 7/1998 | Okajima et al. |
| 5,854,451 | A | 12/1998 | Miyazaki et al. |
| 6,275,207 | B1 * | 8/2001 | Nitta .................... G09G 3/2011 345/89 |
| 7,236,160 | B2 * | 6/2007 | Kong .................... G06F 3/045 178/18.01 |
| 7,940,063 | B2 | 5/2011 | Shimizu et al. |
| 2003/0122796 | A1 | 7/2003 | Kong |
| 2003/0210235 | A1 | 11/2003 | Roberts |
| 2004/0061687 | A1 | 4/2004 | Kent et al. |
| 2007/0085553 | A1 | 4/2007 | Keroe et al. |
| 2009/0109195 | A1 | 4/2009 | Kent et al. |
| 2009/0120775 | A1 | 5/2009 | Morita et al. |
| 2009/0128512 | A1 * | 5/2009 | Segev .................... G06F 21/83 345/174 |
| 2009/0189877 | A1 | 7/2009 | Washino et al. |
| 2009/0322700 | A1 | 12/2009 | D'Souza et al. |
| 2009/0322701 | A1 | 12/2009 | D'Souza et al. |
| 2010/0271322 | A1 | 10/2010 | Kondoh et al. |
| 2010/0328263 | A1 | 12/2010 | Lin |
| 2011/0025642 | A1 | 2/2011 | Tada et al. |
| 2011/0157083 | A1 | 6/2011 | Hershman et al. |
| 2011/0299015 | A1 | 12/2011 | Liu et al. |

FOREIGN PATENT DOCUMENTS

| | | |
|---|---|---|
| EP | 1770480 | 4/2007 |
| JP | H01-269120 | 10/1989 |
| JP | H03-077119 | 4/1991 |
| JP | H08-054976 | 2/1996 |
| JP | H08-054977 | 2/1996 |
| JP | H08-241161 | 9/1996 |
| JP | 2554577 | 11/1996 |
| JP | H09-045184 | 2/1997 |
| JP | H10-171581 | 6/1998 |
| JP | H11-095929 | 4/1999 |
| JP | H11-232023 | 8/1999 |
| JP | 2001-067186 | 3/2001 |
| JP | 3351080 | 11/2002 |
| JP | 3397519 | 4/2003 |
| JP | 3402858 | 5/2003 |
| JP | 2005-049978 | 2/2005 |
| JP | 2007-156875 | 6/2007 |
| JP | 2009-048233 | 3/2009 |
| JP | 2009-176114 | 8/2009 |
| JP | 2009-289157 | 12/2009 |
| JP | 2010-092347 | 4/2010 |
| JP | 2010-102627 | 5/2010 |
| TW | 200724560 | 7/2007 |
| TW | 201042518 | 12/2010 |
| WO | 2008/073478 | 6/2008 |
| WO | 20081073478 | 6/2008 |

OTHER PUBLICATIONS

Office Action dated Jun. 11, 2015 issued with respect to the related U.S. Appl. No. 14/265,702.
Office Action dated Jul. 13, 2015 issued with respect to the related U.S. Appl. No. 14/265,663.
Office Action dated Jun. 14, 2018 issued with respect to the related U.S. Appl. No. 15/356,842.
Office Action dated Dec. 11, 2018 issued with respect to the related U.S. Appl. No. 15/356,842.
Office Action dated Mar. 22, 2019 issued with respect to the related U.S. Appl. No. 15/356,842.

* cited by examiner

PRESSING TWO POINTS AT INTERVAL OF 15 IN Y DIRECTION CLOSER TO YL
PARALLEL TRANSLATION IN X DIRECTION

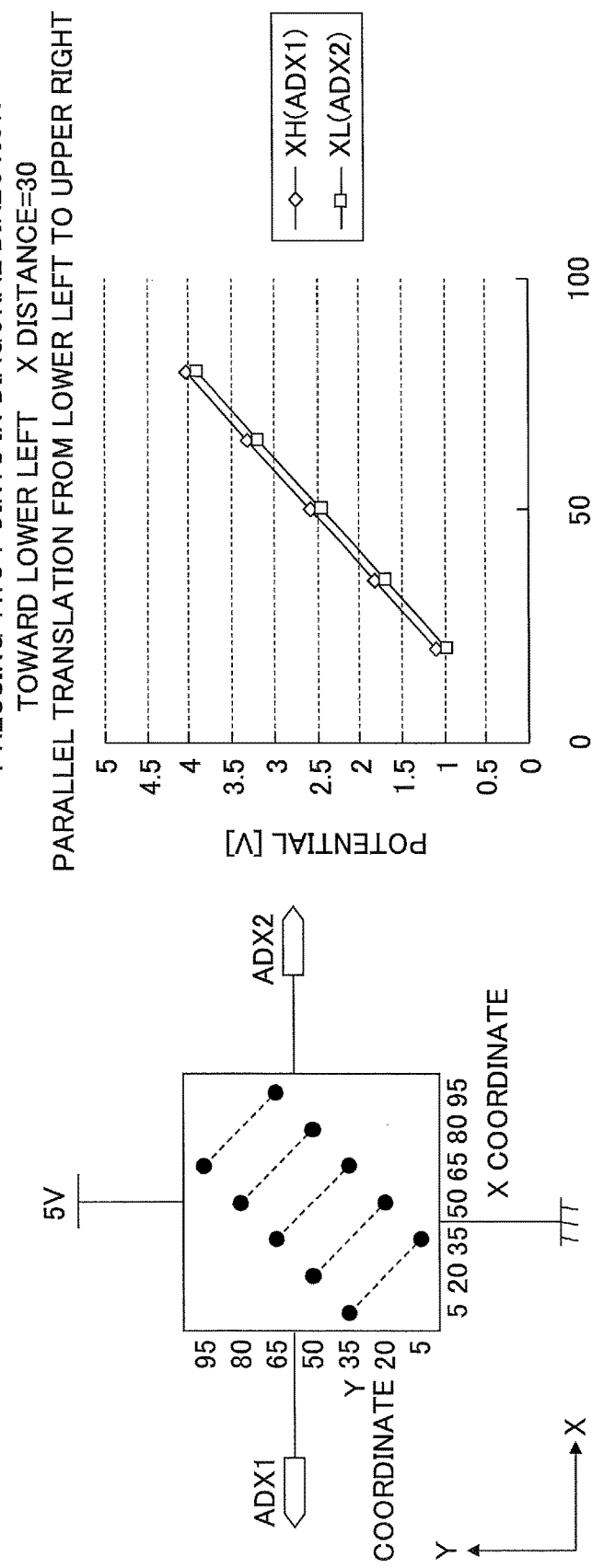

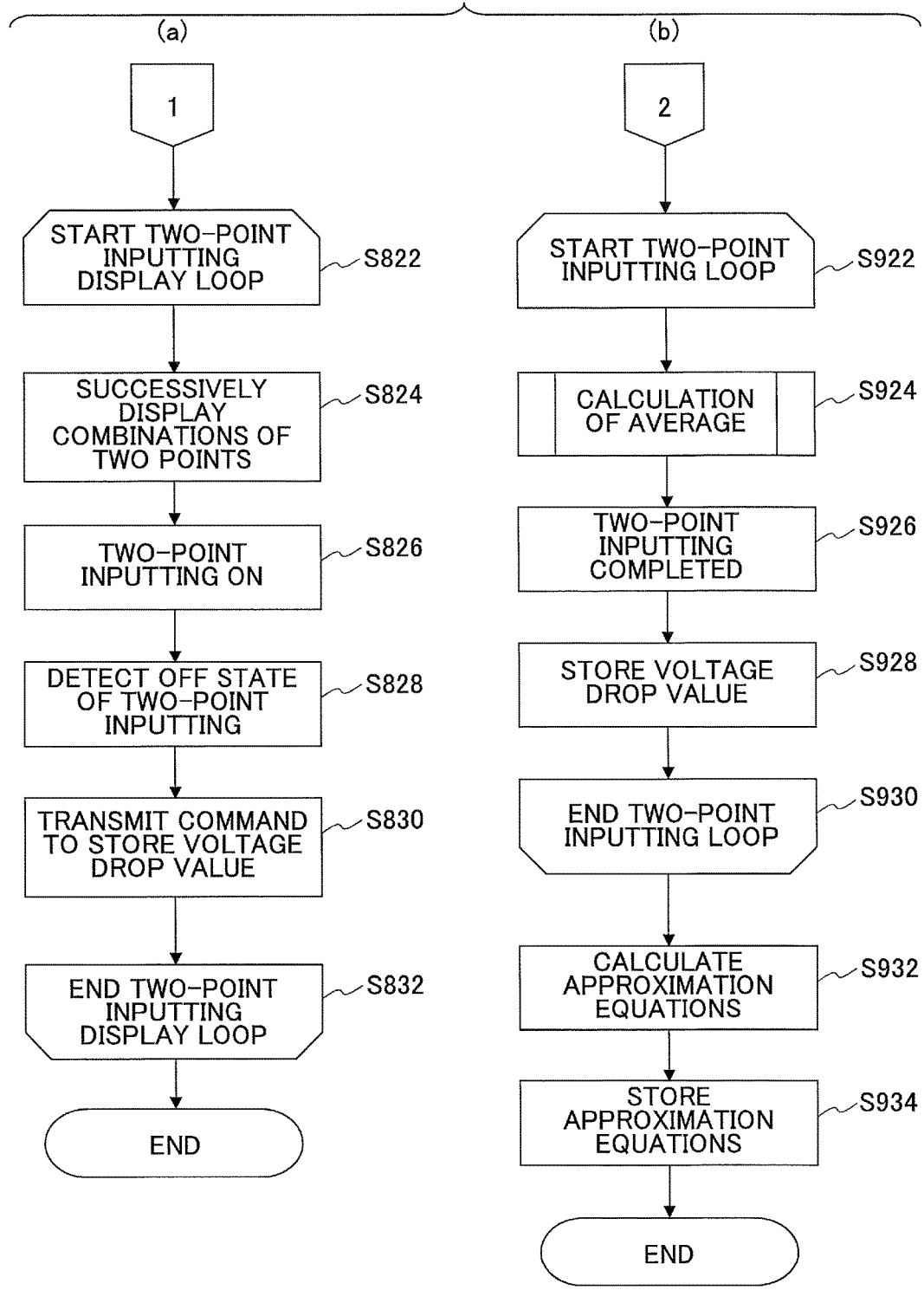

TOUCHSCREEN PANEL, AND METHOD OF INITIALIZING TOUCHSCREEN PANEL

CROSS-REFERENCE TO RELATED APPLICATIONS

This application is a divisional patent application of, and claims the benefit of and priority to U.S. patent application Ser. No. 14/265,702 filed on Apr. 30, 2014, which is a divisional patent application of, and claims the benefit of and priority to U.S. patent application Ser. No. 13/177,238 filed on Jul. 6, 2011, which is based on and claims the benefit of priority of Japanese Patent Application No. 2010-165325, filed on Jul. 22, 2010, Japanese Patent Application No. 2010-217560, filed on Sep. 28, 2010, and Japanese Patent Application No. 2010-241370, filed on Oct. 27, 2010, the entire contents of which are incorporated herein by reference.

BACKGROUND OF THE INVENTION

1. Field of the Invention

The present invention relates to a touchscreen panel, and a method of initializing a touchscreen panel.

2. Description of the Related Art

Electronic apparatuses popular at present often include a touchscreen panel. The touchscreen panel allows information to be input to electronic apparatuses through a direct touch on the touchscreen panel with a finger or the like. The touchscreen panel is expected to become more popular in the future as a simple information input device.

Most common touchscreen panels are configured to detect a contact position in response to being touched (contacted) at a single point. Accordingly, these touchscreen panels are prevented from detecting accurate position information of a contact point if being touched at two or more points. Therefore, there has been a demand for a method that makes it possible to accurately detect the position information of each contact point in the case where there are two contact points.

For example, Patent Documents 1 through 19 listed below disclose various methods of detecting contact points in the case where a touchscreen panel is contacted at two points. For example, such methods are disclosed as a method that uses a slight time difference between a first contact and a second contact, a method that connects a resistor to the conductive films of a touchscreen panel, and a method that applies voltage between X and Y electrodes.

Further, Patent Document 12 discloses a method that detects information on the distance between two points in the case where a touchscreen panel is pressed at two points. Further, Patent Document 14 discloses a touchscreen panel having divided resistive films. Further, Patent Document 17 discloses a touchscreen panel using two pairs of resistive films. Further, Patent Documents 18 and 19 disclose methods that correct a distortion in single-point inputting.

[Patent Document 1] Japanese Patent No. 3402858
[Patent Document 2] Japanese Laid-Open Patent Application No. 2009-289157
[Patent Document 3] Japanese Patent No. 3397519
[Patent Document 4] Japanese Laid-Open Patent Application No. 8-54976
[Patent Document 5] Japanese Laid-Open Patent Application No. 3-77119
[Patent Document 6] Japanese Laid-Open Patent Application No. 10-171581
[Patent Document 7] Japanese Laid-Open Patent Application No. 11-95929
[Patent Document 8] Japanese Laid-Open Patent Application No. 1-269120
[Patent Document 9] Japanese Laid-Open Patent Application No. 8-241161
[Patent Document 10] Japanese Laid-Open Patent Application No. 8-54977
[Patent Document 11] Japanese Laid-Open Patent Application No. 2007-156875
[Patent Document 12] Japanese Laid-Open Patent Application No. 2009-176114
[Patent Document 13] Japanese Patent No. 3351080
[Patent Document 14] Japanese Laid-Open Patent Application No. 9-45184
[Patent Document 15] Japanese Laid-Open Patent Application No. 2005-49978
[Patent Document 16] Japanese Laid-Open Patent Application No. 2010-102627
[Patent Document 17] Japanese Laid-Open Patent Application No. 11-232023
[Patent Document 18] Japanese Laid-Open Patent Application No. 2001-67186
[Patent Document 19] Japanese Patent No. 2554577

SUMMARY OF THE INVENTION

According to an aspect of the present invention, a method of detecting a position on a touchscreen panel including a first resistive film and a second resistive film, the first resistive film having a first electrode and a second electrode provided at corresponding ends thereof in a first direction, the second resistive film having a third electrode and a fourth electrode provided at corresponding ends thereof in a second direction perpendicular to the first direction includes (a) measuring a potential at the first electrode with a supply voltage being applied to a first end of a first resistor having a second end connected to the first electrode with the second electrode being grounded; (b) measuring a potential at the third electrode with the supply voltage being applied to a first end of a second resistor having a second end connected to the third electrode with the fourth electrode being grounded; (c) measuring a potential at the third electrode and a potential at the fourth electrode with the supply voltage being applied to the first electrode with the second electrode being grounded; and (d) measuring a potential at the first electrode and a potential at the second electrode with the supply voltage being applied to the third electrode with the fourth electrode being grounded.

According to an aspect of the present invention, a method of detecting a position on a touchscreen panel including a first resistive film and a second resistive film, the first resistive film having a first electrode and a second electrode provided at corresponding ends thereof in a first direction, the second resistive film having a third electrode and a fourth electrode provided at corresponding ends thereof in a second direction perpendicular to the first direction includes (a) measuring a potential at the second electrode with a supply voltage being applied to the first electrode with a first resistor having a first end connected to the second electrode and a second end grounded; (b) measuring a potential at the fourth electrode with the supply voltage being applied to the third electrode with a second resistor having a first end connected to the fourth electrode and a second end grounded; (c) measuring a potential at the third electrode and a potential at the fourth electrode with the supply voltage being applied to the first electrode with the second electrode being grounded; and (d) measuring a potential at the first electrode and a potential at the second electrode with the supply voltage being applied to the third electrode with the fourth electrode being grounded.

According to an aspect of the invention, a touchscreen panel includes a first resistive film having a first electrode and a second electrode provided at corresponding ends thereof in a first direction; a second resistive film having a third electrode and a fourth electrode provided at corresponding ends thereof in a second direction perpendicular to the first direction; and a control part configured to control measurement of respective potentials at the first electrode, the second electrode, the third electrode, and the fourth electrode, the control part being configured to cause the potential at the first electrode to be measured with a supply voltage being applied to a first end of a first resistor having a second end connected to the first electrode with the second electrode being grounded, to cause the potential at the third electrode to be measured with the supply voltage being applied to a first end of a second resistor having a second end connected to the third electrode with the fourth electrode being grounded, to cause the potential at the third electrode and the potential at the fourth electrode to be measured with the supply voltage being applied to the first electrode with the second electrode being grounded, and to cause the potential at the first electrode and the potential at the second electrode to be measured with the supply voltage being applied to the third electrode with the fourth electrode being grounded.

According to an aspect of the invention, a touchscreen panel includes a first resistive film having a first electrode and a second electrode provided at corresponding ends thereof in a first direction; a second resistive film having a third electrode and a fourth electrode provided at corresponding ends thereof in a second direction perpendicular to the first direction; a first resistor having a first end connected to the first electrode and a second end to which a supply voltage is to be applied; and a second resistor having a first end connected to the third electrode and a second end to which the supply voltage is to be applied, wherein a value of resistance of the first resistor is more than or equal to 25% and less than or equal to 400% of a value of resistance between the first electrode and the second electrode in the first resistive film.

According to an aspect of the invention, a touchscreen panel includes a first resistive film having a first electrode and a second electrode provided at corresponding ends thereof in a first direction; a second resistive film having a third electrode and a fourth electrode provided at corresponding ends thereof in a second direction perpendicular to the first direction; a first resistor having a first end connected to the first electrode and a second end to which a supply voltage is to be applied; and a second resistor having a first end connected to the third electrode and a second end to which the supply voltage is to be applied, wherein a value of resistance of the second resistor is more than or equal to 25% and less than or equal to 400% of a value of resistance between the third electrode and the fourth electrode in the second resistive film.

According to an aspect of the invention, a touchscreen panel includes a first resistive film having a first electrode and a second electrode provided at corresponding ends thereof in a first direction; a second resistive film having a third electrode and a fourth electrode provided at corresponding ends thereof in a second direction perpendicular to the first direction; a first resistor having a first end connected to the second electrode and a second end to be grounded; and a second resistor having a first end connected to the fourth electrode and a second end to be grounded, wherein a value of resistance of the first resistor is more than or equal to 25% and less than or equal to 400% of a value of resistance between the first electrode and the second electrode in the first resistive film.

According to an aspect of the invention, a touchscreen panel includes a first resistive film having a first electrode and a second electrode provided at corresponding ends thereof in a first direction; a second resistive film having a third electrode and a fourth electrode provided at corresponding ends thereof in a second direction perpendicular to the first direction; a first resistor having a first end connected to the second electrode and a second end to be grounded; and a second resistor having a first end connected to the fourth electrode and a second end to be grounded, wherein a value of resistance of the second resistor is more than or equal to 25% and less than or equal to 400% of a value of resistance between the third electrode and the fourth electrode in the second resistive film.

According to an aspect of the invention, a touchscreen panel includes a first resistive film having a first electrode and a second electrode provided at corresponding ends thereof in a first direction; a second resistive film having a third electrode and a fourth electrode provided at corresponding ends thereof in a second direction perpendicular to the first direction; and a switch having a first end connected to the first electrode and a second end connected to a first end of a resistor group including a plurality of resistors, the resistor group having a second end to which a supply voltage is to be applied, the switch being configured to allow one of the resistors of the resistor group to be selected and connected in series to the first resistive film.

According to an aspect of the invention, a touchscreen panel includes a first resistive film having a first electrode and a second electrode provided at corresponding ends thereof in a first direction; a second resistive film having a third electrode and a fourth electrode provided at corresponding ends thereof in a second direction perpendicular to the first direction; and a switch having a first end connected to the third electrode and a second end connected to a first end of a resistor group including a plurality of resistors, the resistor group having a second end to which a supply voltage is to be applied, the switch being configured to allow one of the resistors of the resistor group to be selected and connected in series to the second resistive film.

According to an aspect of the invention, a touchscreen panel includes a first resistive film having a first electrode and a second electrode provided at corresponding ends thereof in a first direction; a second resistive film having a third electrode and a fourth electrode provided at corresponding ends thereof in a second direction perpendicular to the first direction; and a switch having a first end to be grounded and a second end connected to a first end of a resistor group including a plurality of resistors, the resistor group having a second end connected to the second electrode, the switch being configured to allow one of the resistors of the resistor group to be selected and connected in series to the first resistive film.

According to an aspect of the invention, a touchscreen panel includes a first resistive film having a first electrode and a second electrode provided at corresponding ends thereof in a first direction; a second resistive film having a third electrode and a fourth electrode provided at corresponding ends thereof in a second direction perpendicular to the first direction; and a switch having a first end to be grounded and a second end connected to a first end of a resistor group including a plurality of resistors, the resistor group having a second end connected to the fourth electrode, the switch being configured to allow one of the resistors of the resistor group to be selected and connected in series to the second resistive film.

According to an aspect of the invention, a method of initializing a touchscreen panel including a first resistive film having a first electrode and a second electrode provided at corresponding ends thereof in a first direction, a second resistive film having a third electrode and a fourth electrode provided at corresponding ends thereof in a second direction perpendicular to the first direction, a first resistor having a first end connected to the first electrode and a second end having a supply voltage applied thereto, and a second resistor having a first end connected to the third electrode and a second end having the supply voltage applied thereto, includes (a) measuring a potential with the touchscreen panel being contacted at two points with a predetermined potential being applied to the touchscreen panel; and (b) calculating a relational expression between the potential and a distance between the two points based on the measured potential.

According to an aspect of the invention, a touchscreen panel includes a first resistive film having a first electrode and a second electrode provided at corresponding ends thereof in a first direction; a second resistive film having a third electrode and a fourth electrode provided at corresponding ends thereof in a second direction perpendicular to the first direction; a first resistor having a first end connected to the first electrode and a second end to which a supply voltage is to be applied; and a second resistor having a first end connected to the third electrode and a second end to which the supply voltage is to be applied, wherein the touchscreen panel is to be provided on a display unit configured to have a plurality of points displayed thereon, the points being for measuring a potential with the touchscreen panel being contacted at two of the points with a predetermined potential being applied to the touchscreen panel and calculating a relational expression between the potential and the two points based on the measured potential.

According to an aspect of the invention, a touchscreen panel includes a first resistive film having a first electrode and a second electrode provided at corresponding ends thereof in a first direction; a second resistive film having a third electrode and a fourth electrode provided at corresponding ends thereof in a second direction perpendicular to the first direction; a first resistor having a first end connected to the first electrode and a second end to which a supply voltage is to be applied; and a second resistor having a first end connected to the third electrode and a second end to which the supply voltage is to be applied, wherein the touchscreen panel is configured to have a plurality of points displayed thereon, the points being for measuring a potential with the touchscreen panel being contacted at two of the points with a predetermined potential being applied to the touchscreen panel and calculating a relational expression between the potential and the two points based on the measured potential.

The object and advantages of the embodiments will be realized and attained by means of the elements and combinations particularly pointed out in the claims.

It is to be understood that both the foregoing general description and the following detailed description are exemplary and explanatory and not restrictive of the invention as claimed.

BRIEF DESCRIPTION OF THE DRAWINGS

Other objects, features and advantages of the present invention will become more apparent from the following detailed description when read in conjunction with the accompanying drawings, in which:

FIGS. 12A and 122 are diagrams illustrating a finite element analysis of the touchscreen panel according to the first embodiment of the present invention;

FIGS. 13A and 132 are diagrams illustrating a finite element analysis of the touchscreen panel according to the first embodiment of the present invention;

FIGS. 14A and 142 are diagrams illustrating a finite element analysis of the touchscreen panel according to the first embodiment of the present invention;

FIGS. 29A and 29B are diagrams illustrating a finite element analysis of the touchscreen panel according to the first embodiment of the present invention;

FIGS. 61A and 61B are flowcharts of the method of initializing a touchscreen panel according to the seventh embodiment of the present invention;

DETAILED DESCRIPTION OF THE PREFERRED EMBODIMENTS

Figure 1:
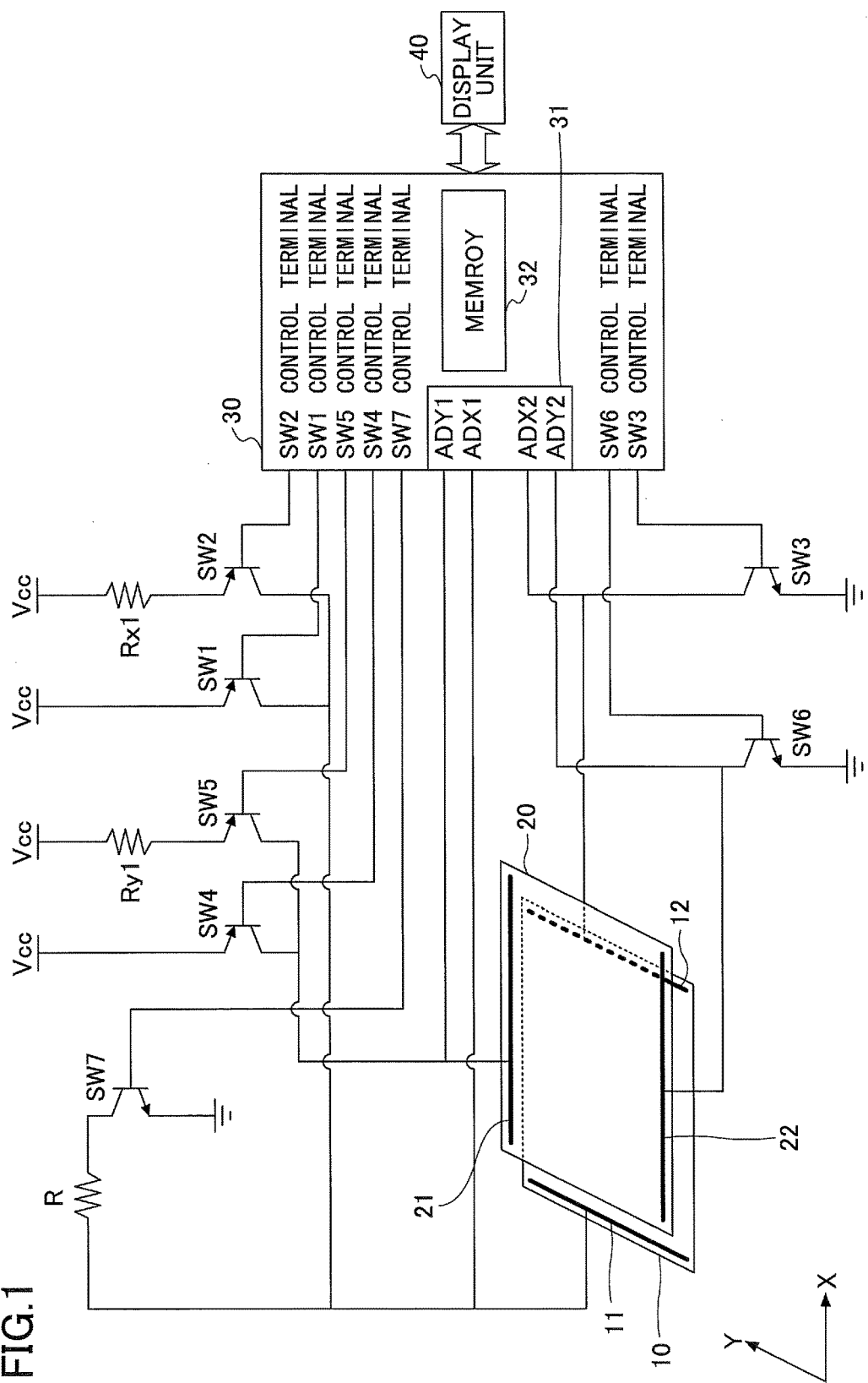
FIG. 1 is a diagram illustrating a touchscreen panel according to a first embodiment of the present invention.

According to the above-described methods of detecting the position information of two contact points on a touchscreen panel, there is a problem in that position coordinates at two points are prevented from being detected with accuracy if the touchscreen panel is contacted simultaneously at two points, and a special structure such as divided resistive films or two pairs of resistive films is necessary in order to detect position information at two points. In the latter case, there is also the problem of an increase in cost.

Therefore, in the conventionally-used four-wire touchscreen panels, a position detecting method is desired that is simple and inexpensive and is capable of detecting each coordinate position even in the case where the touchscreen panel is contacted simultaneously at two points.

According to an aspect of the present invention, a method of detecting a position on a touchscreen panel, a touchscreen panel, and a method of initializing a touchscreen panel are provided that are simple and inexpensive and are capable of detecting each coordinate position even in the case where the touchscreen panel is contacted simultaneously at two points.

A description is given below, with reference to the accompanying drawings, of embodiments of the present invention. The same elements are referred to by the same reference numerals, and a redundant description thereof is omitted.

First Embodiment

A description is given, with reference to FIG. 1, of a touchscreen panel according to a first embodiment.

The touchscreen panel according to this embodiment includes a first resistive film 10 and a second resistive film 20, each of which is formed of a transparent electrically conductive film of ITO (indium tin oxide) or the like. The first resistive film 10 and the second resistive film 20 may be formed on the surfaces of respective glass substrates or transparent films. In this case, the glass substrates or transparent films are arranged so that the first resistive film 10 and the second resistive film 20 are opposed to each other. An XH electrode 11 and an XL electrode 12 are formed along a Y-axis direction at a first end and a second end, respectively, of the first resistive film 10 in an X-axis direction. Further, a YH electrode 21 and a YL electrode 22 are formed along the X-axis direction at a first end and a second end, respectively, of the second resistive film 20 in the Y-axis direction.

The XH electrode 11, which serves as a first electrode, is connected to a switch SW1, formed of a transistor and connected to a power supply potential Vcc, and to a switch SW2, formed of a transistor and connected to the power supply potential Vcc via a resistor Rx1. The XH electrode 11 is also connected via a resistor R to a switch SW7, formed of a transistor and connected to a ground potential. The XH electrode 11 is further connected to a potential detecting part ADX1 for detecting a potential in an analog-to-digital (AD) converter 31 provided in a control part 30.

The XL electrode 12, which serves as a second electrode, is connected to a switch SW3, formed of a transistor and connected to the ground potential, and to a potential detecting part ADX2 for detecting a potential in the AD converter 31.

The YH electrode 21, which serves as a third electrode, is connected to a switch SW4, formed of a transistor and connected to the power supply potential Vcc, and to a switch SW5, formed of a transistor and connected to the power supply potential Vcc via a resistor Ry1. The YH electrode 21 is further connected to a potential detecting part ADY1 for detecting a potential in the AD converter 31 provided in the control part 30.

The YL electrode 22, which serves as a fourth electrode, is connected to a switch SW6, formed of a transistor and connected to the ground potential, and to a potential detecting part ADY2 for detecting a potential in the AD converter 31.

The resistor Rx1, which serves as a first resistor, has a resistance value substantially equal to the value of the resistance between the XH electrode 11 and the XL electrode 12 in the first resistive film 10. The resistor Ry1, which serves as a second resistor, has a resistance value substantially equal to the value of the resistance between the YH electrode 21 and the YL electrode 22 in the second resistive film 20.

The switches SW1, SW2, SW3, SW4, SW3, SW6, and SW7 are connected to a SW1 control terminal, SW2 control terminal, a SW3 control terminal, a SW4 control terminal, a SW5 control terminal, a SW6 control terminal, and a SW7 control terminal, respectively, provided in the control part 30.

The control part 30 further includes a memory 32 configured to store various information items. The control part 30 is connected to a display unit 40.

Figure 2:
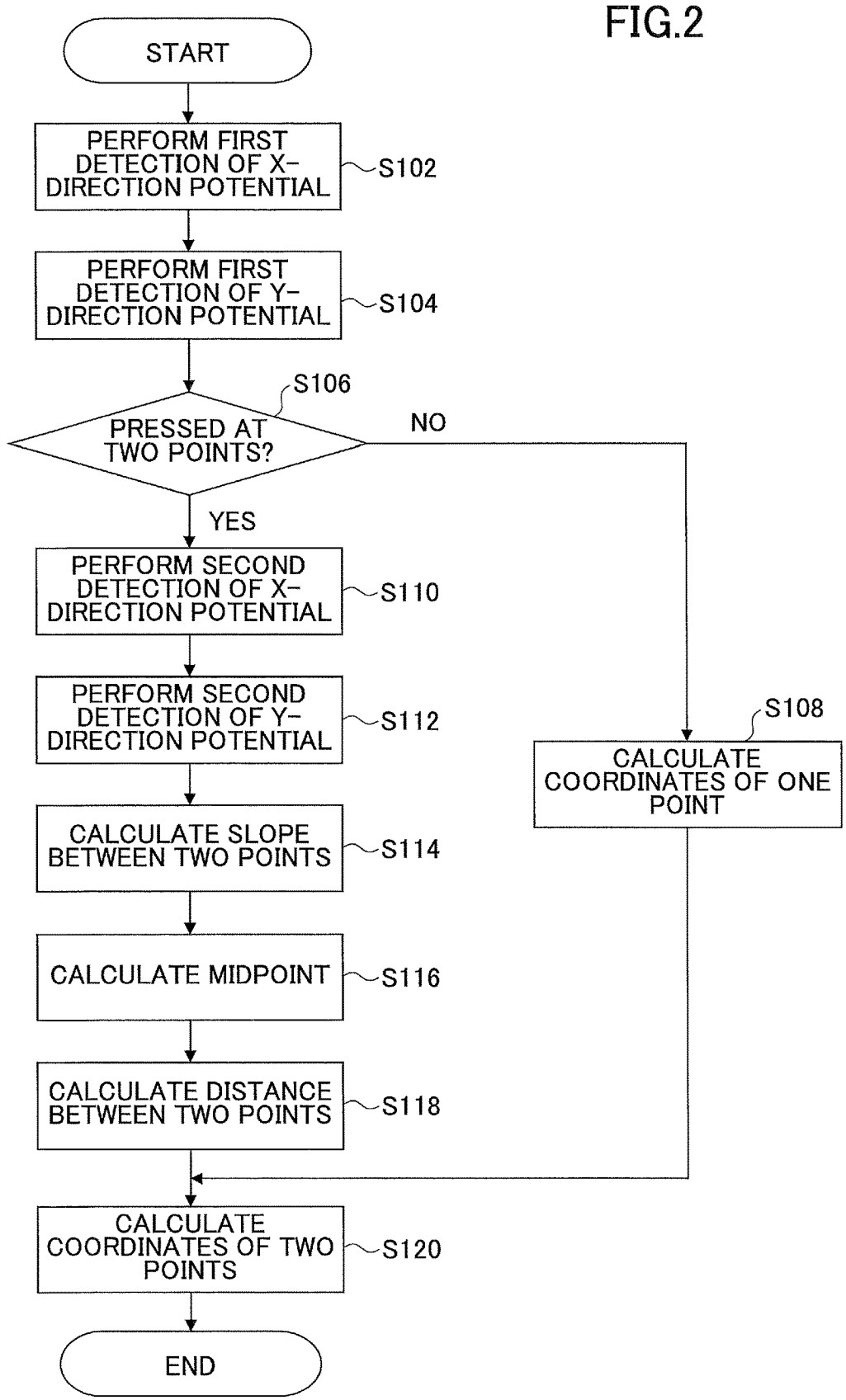
FIG. 2 is a flowchart of a position detecting method according to the first embodiment of the present invention.

Next, a description is given of a method of detecting a position on a touchscreen panel according to this embodiment. The method of detecting a position on a touchscreen panel according to this embodiment, which is a method of detecting a position on the touchscreen panel illustrated in FIG. 1, is described with reference to FIG. 2. In the description of this embodiment, the power supply potential Vcc may be expressed as 5 V, and the ground potential may be expressed as 0 V by way of example.

First, in step S102, a first detection of an X-direction potential is performed. Specifically, in the touchscreen panel illustrated in FIG. 1, the switches SW2 and SW3 are turned ON and the other switches SW1 and SW4 through SW7 are turned OFF, and a potential is measured at the potential detecting part ADX1. In this state, a voltage of Vcc is applied to the XH electrode 11 via the resistor Rx1, and the XL electrode 12 is grounded. Therefore, there is a potential distribution in the X-axis direction in the first resistive film 10. In this state, a potential is measured with the potential detecting part ADX1, and the detected potential is stored as information in the memory 32 or the like. The potential detected at the potential detecting part ADX1 is a value obtained through voltage division between the resistance component formed between the XH electrode 11 and the XL electrode 12 in the first resistive film 10 and the resistor Rx1. Further, step S102 may be referred to as a first measurement process.

Next, in step S104, a first detection of a Y-direction potential is performed. Specifically, in the touchscreen panel illustrated in FIG. 1, the switches SW5 and SW6 are turned ON and the other switches SW1 through SW4 and SW7 are turned OFF, and a potential is measured at the potential detecting part ADY1. In this state, a voltage of Vcc is applied to the YH electrode 21 via the resistor Ry1, and the YL electrode 22 is grounded. Therefore, there is a potential distribution in the Y-axis direction in the second resistive film 20. In this state, a potential is measured with the potential detecting part ADY1, and the detected potential is stored as information in the memory 32 or the like. The potential detected at the potential detecting part ADY1 is a value obtained through voltage division between the resistance component formed between the YH electrode 21 and the YL electrode 22 in the second resistive film 20 and the resistor Ry1. Further, step S104 may be referred to as a second measurement process.

Next, in step S106, it is determined whether the touchscreen panel is contacted (touched) at a single point or not. Specifically, it is determined whether the number of contact points is one or two by determining whether both of the potential measured at the potential detecting part ADX1 in step S102 and the potential measured at the potential detecting part ADY1 in step S104 are Vcc/2.

Figure 3:
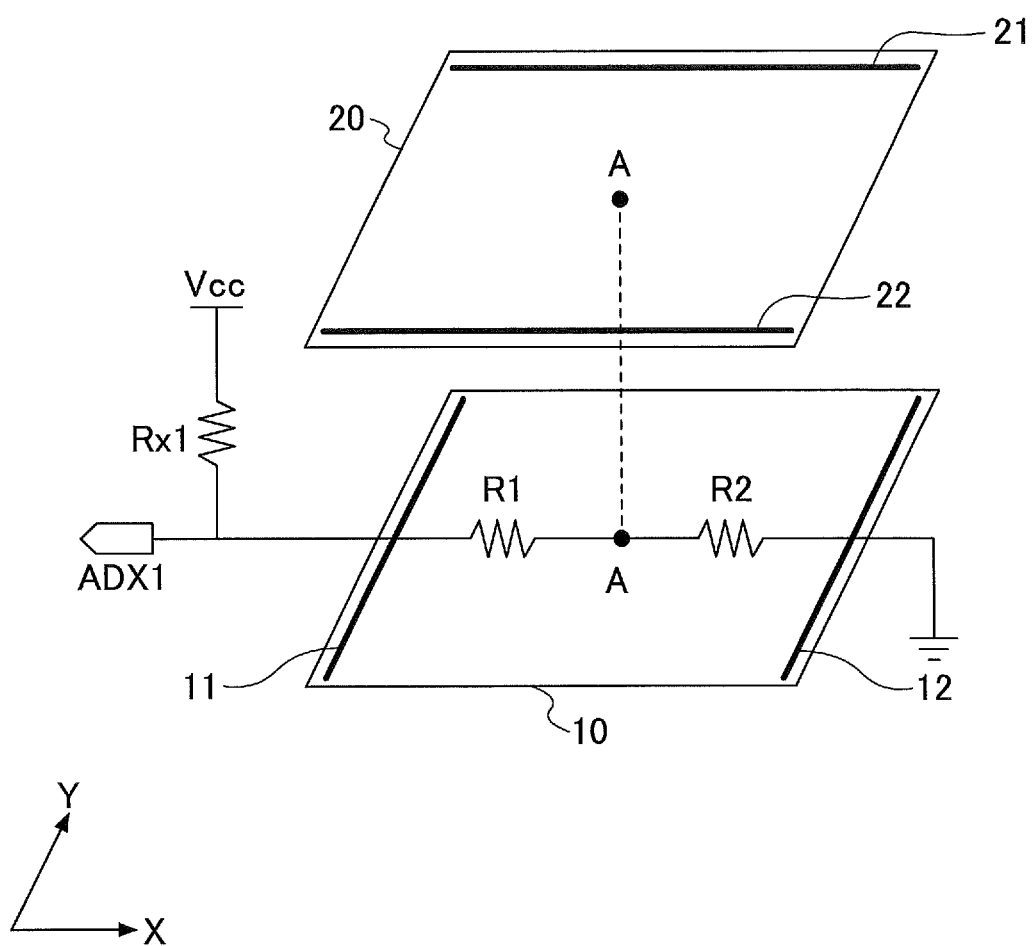
FIG. 3 is a diagram illustrating contacting the touchscreen panel at one point according to the first embodiment of the present invention.

More specifically, if there is only one contact point A between the first resistive film 10 and the second resistive film 20 in step S102, the resistance value of the first resistive film 10 between the XH electrode 11 and the XL electrode 12 is that of a series connection of a first resistance component R1 and a second resistance component R2 in the first resistive film 10 as illustrated in FIG. 3, and the resistance value of this series connection is substantially equal to the value of the resistor Rx1. Accordingly, the potential detected at the potential detecting part ADX1 is Vcc/2.

Figure 4:
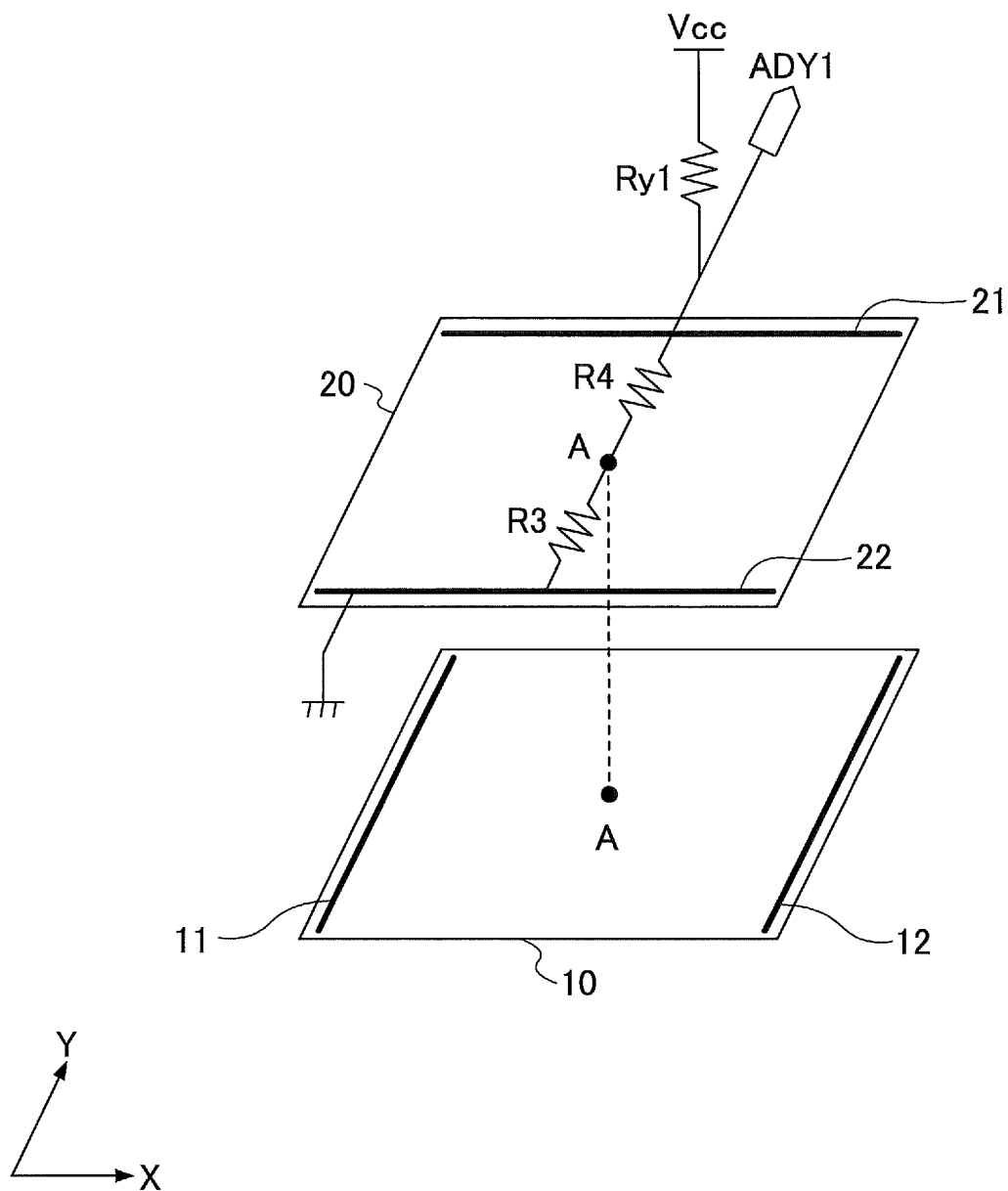
FIG. 4 is another diagram illustrating contacting the touchscreen panel at one point according to the first embodiment of the present invention.

Further, if there is only one contact point A between the first resistive film 10 and the second resistive film 20 in step S104, the resistance value of the second resistive film 20 between the YH electrode 21 and the YL electrode 22 is that of a series connection of a third resistance component R3 and a fourth resistance component R4 in the second resistive film 20 as illustrated in FIG. 4, and the resistance value of this series connection is substantially equal to the value of the resistor Ry1. Accordingly, the potential detected at the potential detecting part ADY1 is Vcc/2.

Figure 5:
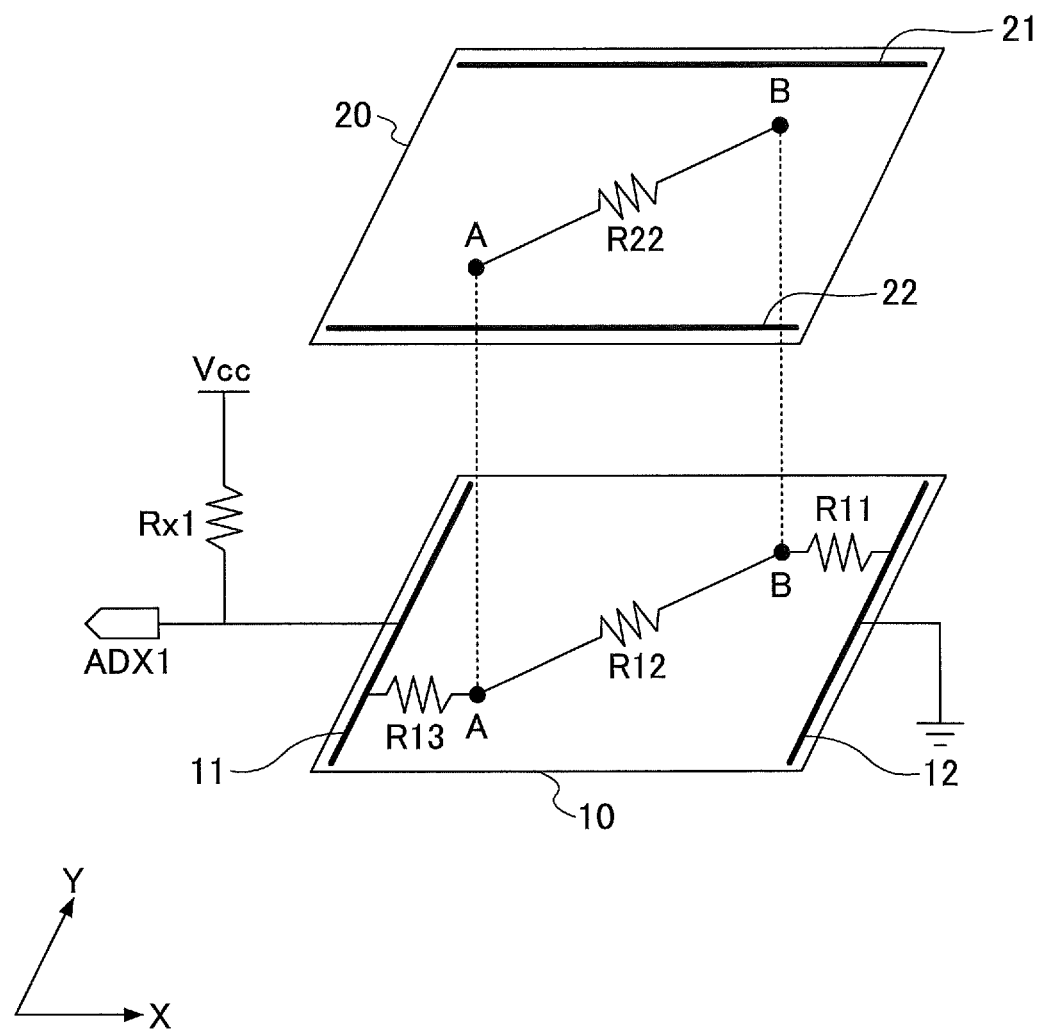
FIG. 5 is a diagram illustrating contacting the touchscreen panel at two points according to the first embodiment of the present invention.

On the other hand, if there are two contact points A and B between the first resistive film 10 and the second contact film 20 in step S102, the resistance component between the points A and B is a parallel connection of a resistance component R12 in the first resistive film 10 and a resistance component R22 in the second resistive film as illustrated in FIG. 5. Therefore, the resistance of the first resistive film 10 between the XH electrode 11 and the XL electrode 12 is a combined resistance of a resistance component R11 between the XL electrode 12 and the point B in the first resistive film 10, the parallel-connected resistance components R12 and R22 between the point A and the point B, and a resistance component R13 between the point A and the XH electrode 11 in the first resistive film 10. Accordingly, since the parallel-connected resistance components R12 and R22 are included, the value of this combined resistance is lower than the resistance value of the resistor Rx1. Accordingly, the potential detected at the potential detecting part ADX1 is lower than Vcc/2.

Figure 6:
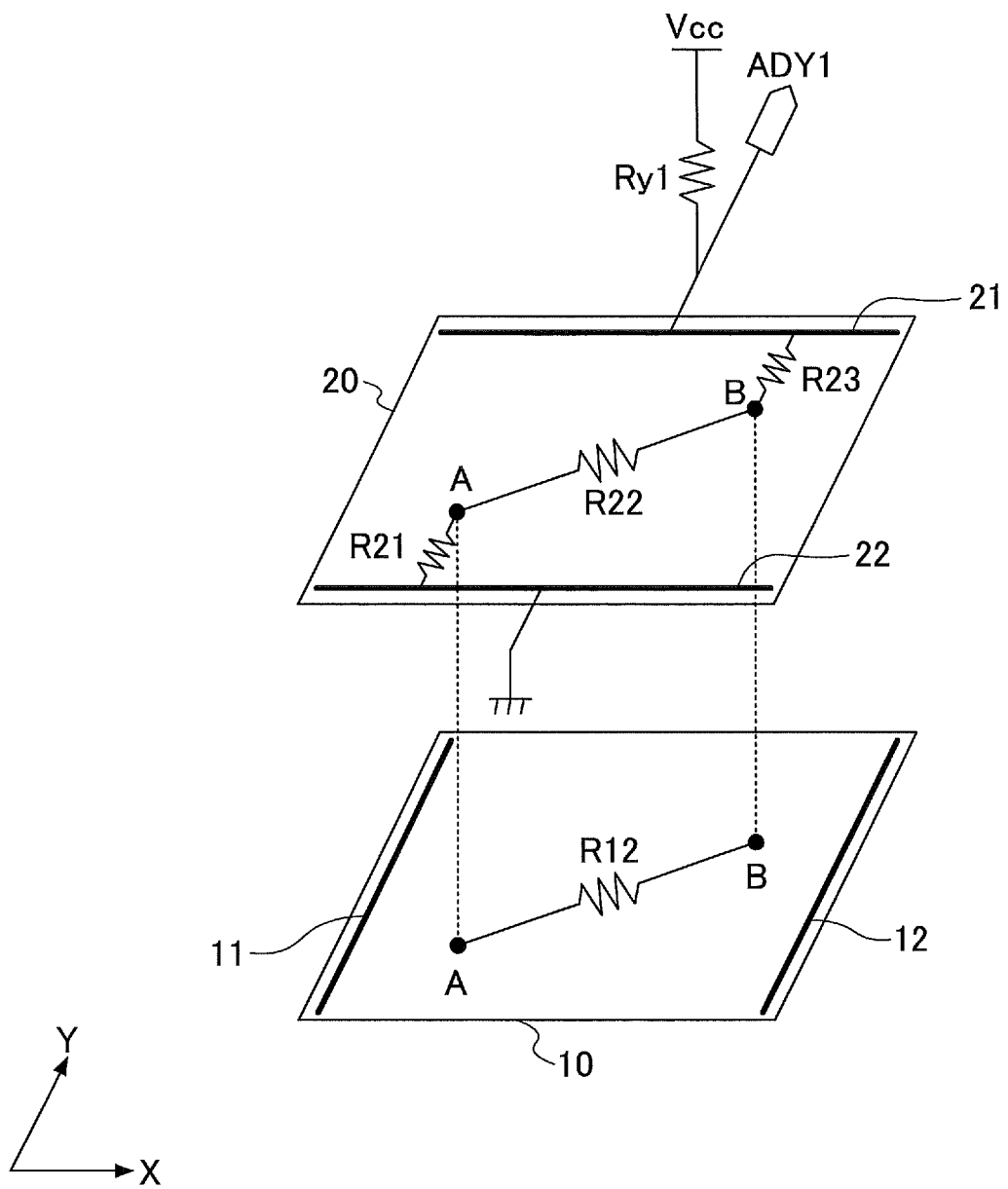
FIG. 6 is another diagram illustrating contacting the touchscreen panel at two points according to the first embodiment of the present invention.

Further, if there are two contact points A and B between the first resistive film 10 and the second contact film 20 in step S104, the resistance component between the points A and B is the parallel connection of the resistance component R12 in the first resistive film 10 and the resistance component R22 in the second resistive film as illustrated in FIG. 6. Therefore, the resistance of the second resistive film 20 between the YH electrode 21 and the YL electrode 22 is a combined resistance of a resistance component R21 between the YL electrode 22 and the point A in the second resistive film 20, the parallel-connected resistance components R12 and R22 between the point A and the point B, and a resistance component R23 between the point B and the YH electrode 21 in the second resistive film 20. Accordingly, since the parallel-connected resistance components R12 and R22 are included, the value of this combined resistance is lower than the resistance value of the resistor Ry1. Accordingly, the potential detected at the potential detecting part ADY1 is lower than Vcc/2.

Thus, whether the number of contact points is one or two may be determined by determining whether both of the potential measured at the potential detecting part ADX1 in step S102 and the potential measured at the potential detecting part ADY1 in step S104 are Vcc/2.

Figure 7:
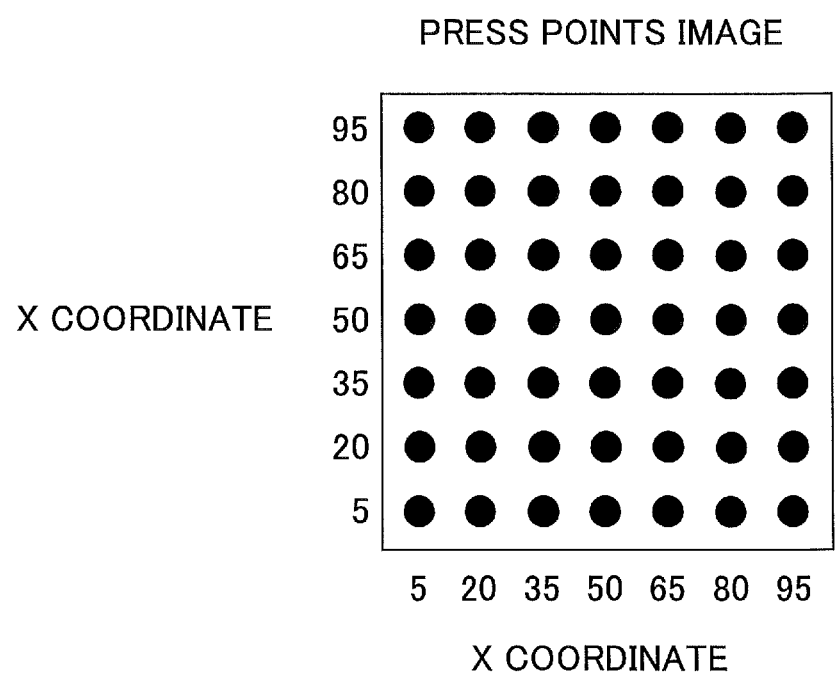
FIG. 7 is a diagram for illustrating a finite element analysis of pressed points on the touchscreen panel according to the first embodiment of the present invention.

As evidence to support this, the results of a finite element analysis made with respect to a touchscreen panel are shown. Specifically, a square touchscreen panel as illustrated in FIG. 7 is assumed, and an analysis is made with respect to the case where the press points are $5^{th}$, $20^{th}$, $25^{th}$, $50^{th}$, $65^{th}$, $80^{th}$, and $95^{th}$ positions in an X direction (which may be hereinafter referred to as positions of 5, 20, 25, 50, 65, 80, and 95, respectively) and $5^{th}$, $20^{th}$, $25^{th}$, $50^{th}$, $65^{th}$, $80^{th}$, and $95^{th}$ positions in a Y direction (which may be hereinafter referred to as positions of 5, 20, 25, 50, 65, 80, and 95, respectively) on the touchscreen panel, which are divided into 100 in each of the X direction and the Y direction. The interval or distance may be expressed using the difference between the values of positions.

Figure 8B:
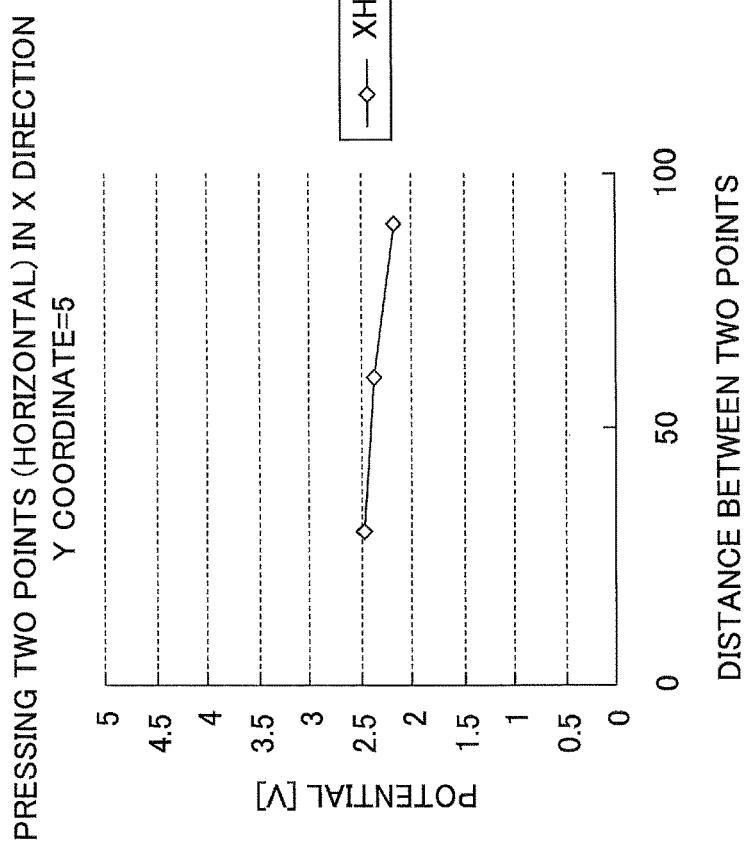
FIGS. 8A and 8B are diagrams illustrating a finite element analysis of the touchscreen panel according to the first embodiment of the present invention.
Figure 8A:
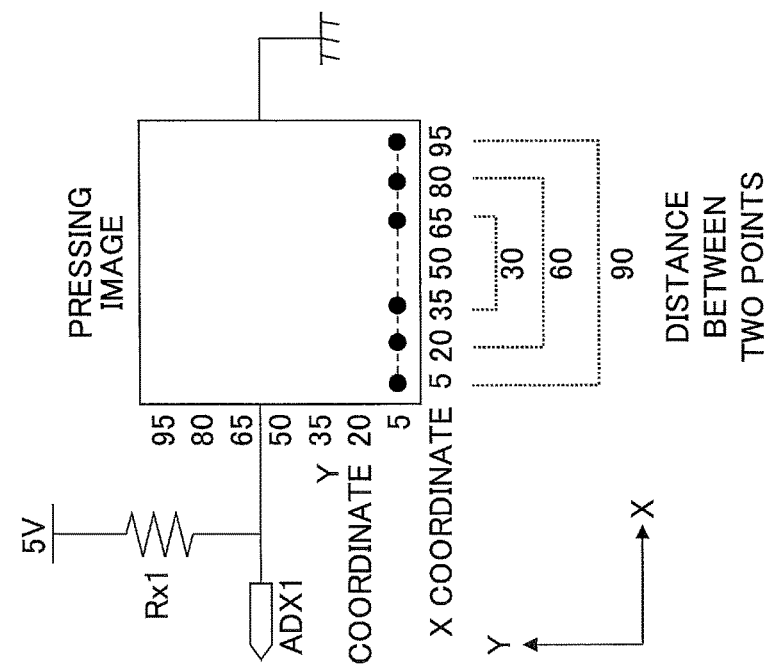

FIGS. 8A and 8B illustrate a case where two contact positions on the touchscreen panel have the same Y coordinate of the position of 5 while the interval of their X coordinates changes from 30 to 60 to 90 in the case of applying voltage in the X-axis direction, that is, in the case of applying a voltage of 5 V to the XH electrode 11 via the resistor Rx1 and grounding the XL electrode 12. FIG. 8A illustrates the coordinate positions of the two contact points on the touchscreen panel in this case. FIG. BB illustrates the relationship between the interval between the two points, that is, the distance between the two points, and the potential detected at the potential detecting part ADX1.

Figure 9B:
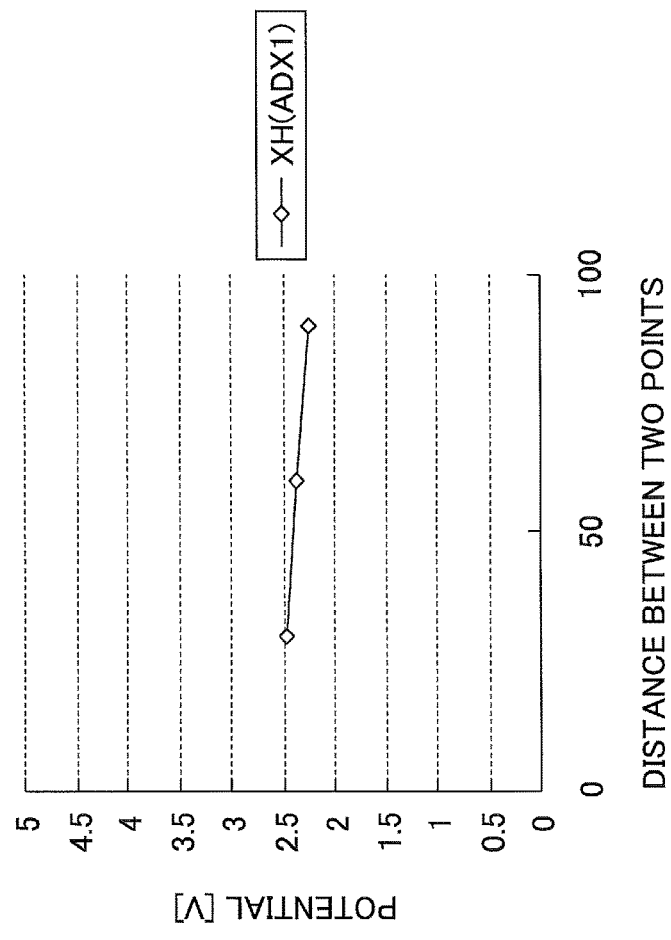
FIGS. 9A and 9B are diagrams illustrating a finite element analysis of the touchscreen panel according to the first embodiment of the present invention.
Figure 9A:
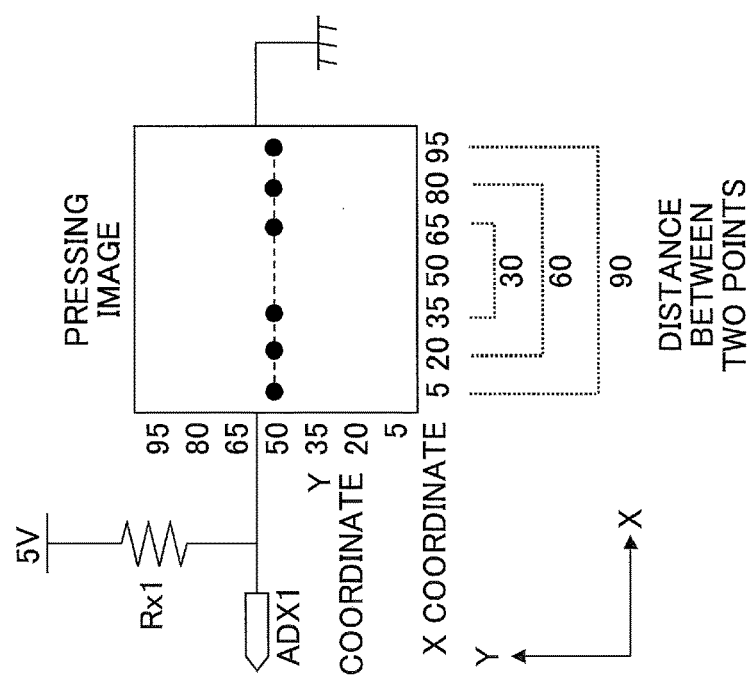

FIGS. 9A and 9B illustrate a case where two contact positions on the touchscreen panel have the same Y coordinate of the position of 50 while the interval of their X coordinates changes from 30 to 60 to 90 in the case of applying voltage in the X-axis direction, that is, in the case of applying a voltage of 5 V to the XH electrode 11 via the resistor Rx1 and grounding the XL electrode 12. FIG. 9A illustrates the coordinate positions of the two contact points on the touchscreen panel in this case. FIG. 9B illustrates the relationship between the interval between the two points, that is, the distance between the two points, and the potential detected at the potential detecting part ADX1.

Figure 10B:
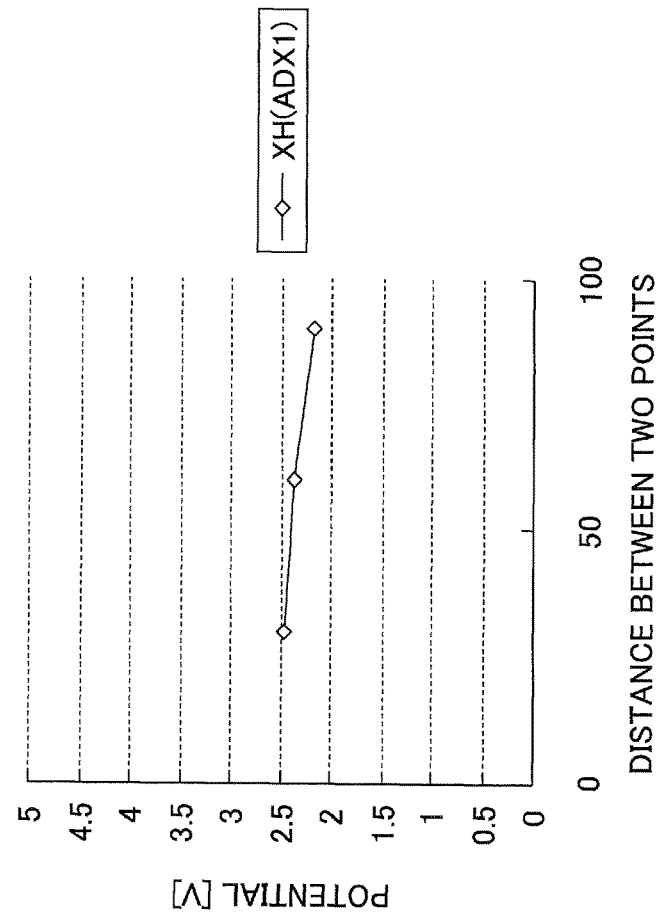
FIGS. 10A and 10B are diagrams illustrating a finite element analysis of the touchscreen panel according to the first embodiment of the present invention.
Figure 10A:
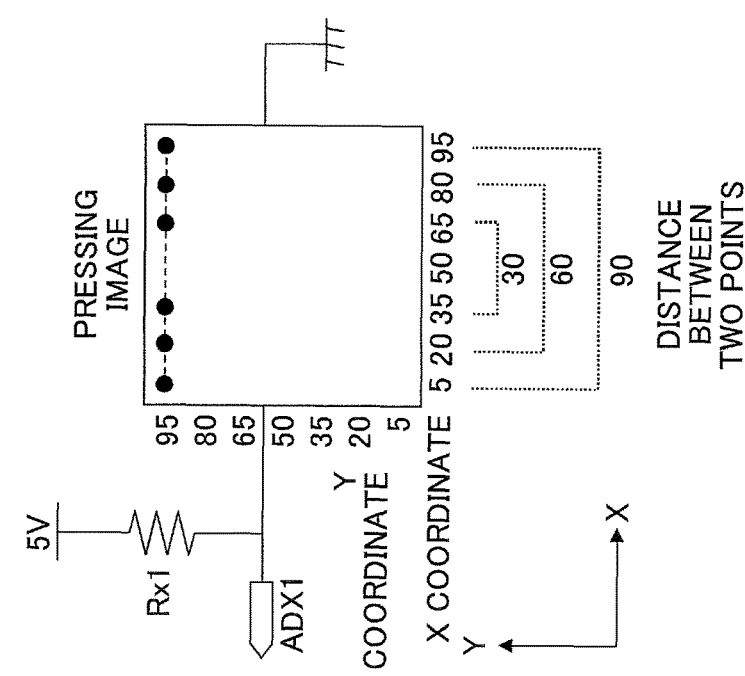

FIGS. 10A and 10B illustrate a case where two contact positions on the touchscreen panel have the same Y coordinate of the position of 95 while the interval of their X coordinates changes from 30 to 60 to 90 in the case of applying voltage in the X-axis direction, that is, in the case of applying a voltage of 5 V to the XH electrode 11 via the resistor Rx1 and grounding the XL electrode 12. FIG. 10A illustrates the coordinate positions of the two contact points on the touchscreen panel in this case. FIG. 10B illustrates the relationship between the interval between the two points, that is, the distance between the two points, and the potential detected at the potential detecting part ADX1.

As illustrated in FIG. 8A through FIG. 10B, if the Y coordinates of two contact points are the same position, the potential detected at the potential detecting part ADX1 is less than or equal to half of the applied voltage of 5 V, and the potential detected at the potential detecting part ADX1 decreases as the distance between the two points increases. That is, if there is an increase in the distance between two contact points in a direction parallel to the direction in which voltage is applied, the potential detected at the potential detecting part ADX1 decreases. The same applies to the case of applying voltage in the Y-axis direction. In this case, the potential detected at the potential detecting part ADY1 decreases.

Figure 11B:
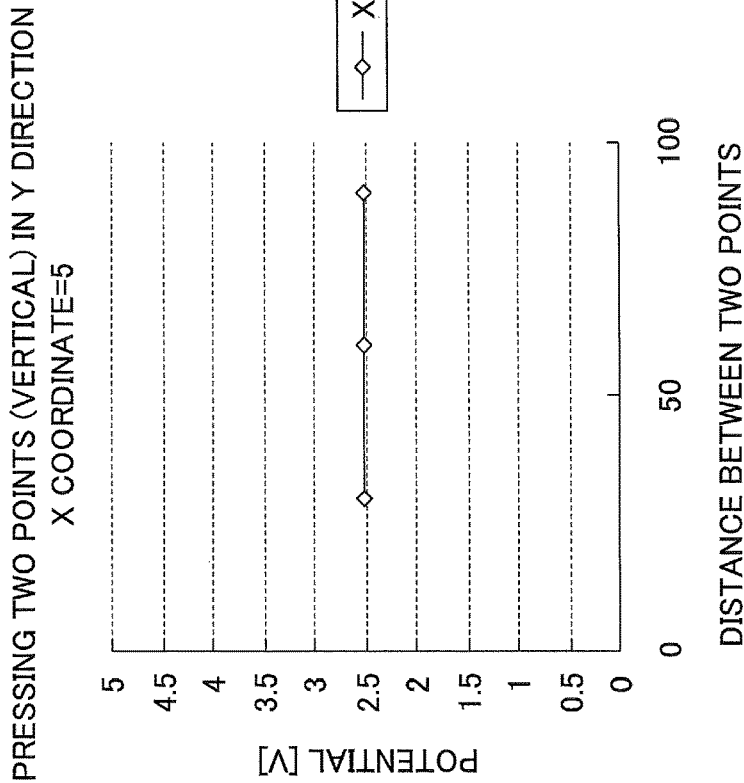
FIGS. 11A and 11B are diagrams illustrating a finite element analysis of the touchscreen panel according to the first embodiment of the present invention.
Figure 11A:
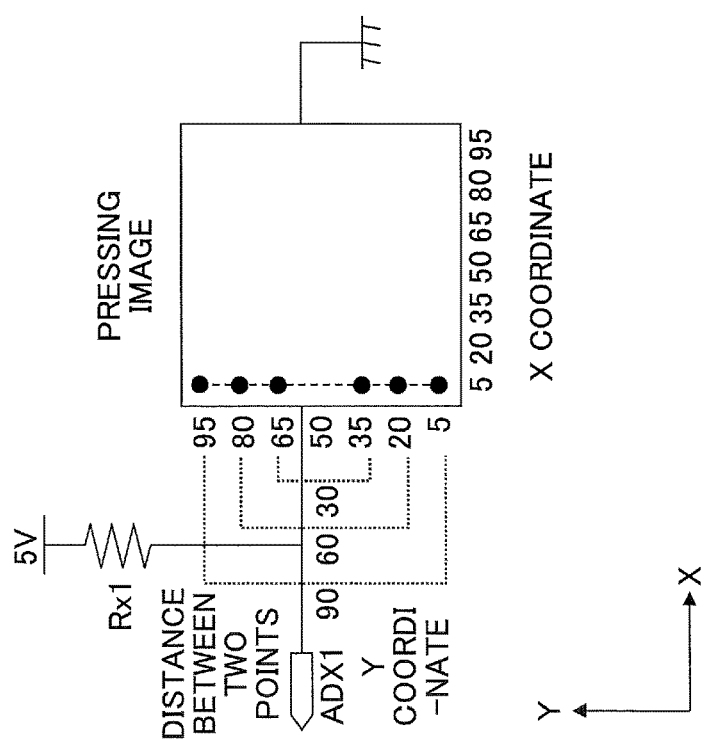

FIGS. 11A and 11B illustrate a case where two contact positions on the touchscreen panel have the same X coordinate of the position of 5 while the interval of their Y coordinates changes from 30 to 60 to 90 in the case of applying voltage in the X-axis direction, that is, in the case of applying a voltage of 5 V to the XH electrode 11 via the resistor Rx1 and grounding the XL electrode 12. FIG. 11A illustrates the coordinate positions of the two contact points on the touchscreen panel in this case. FIG. 11B illustrates the relationship between the interval between the two points, that is, the distance between the two points, and the potential detected at the potential detecting part ADX1.

Figure 12B:
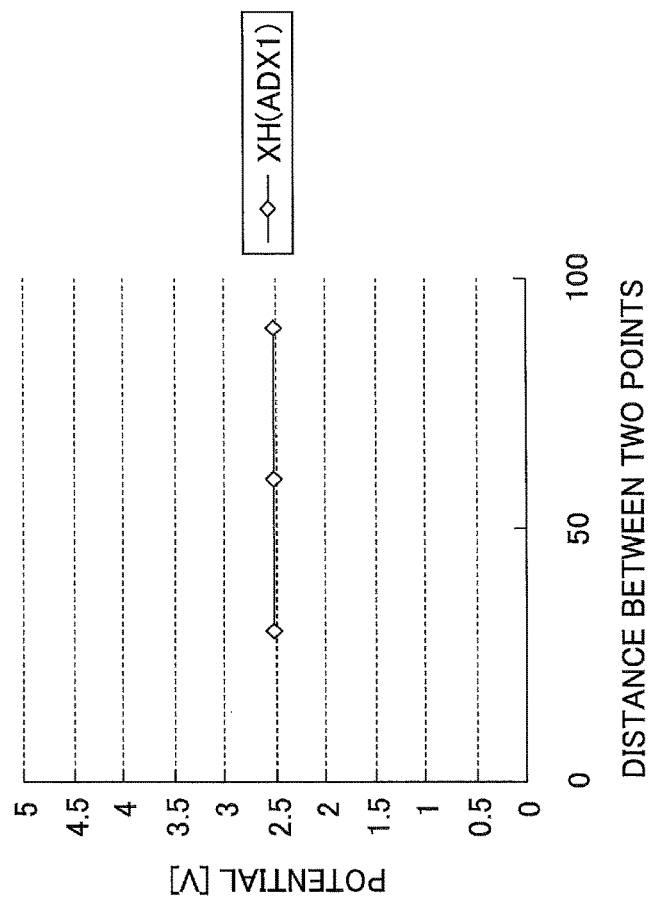
Figure 12A:
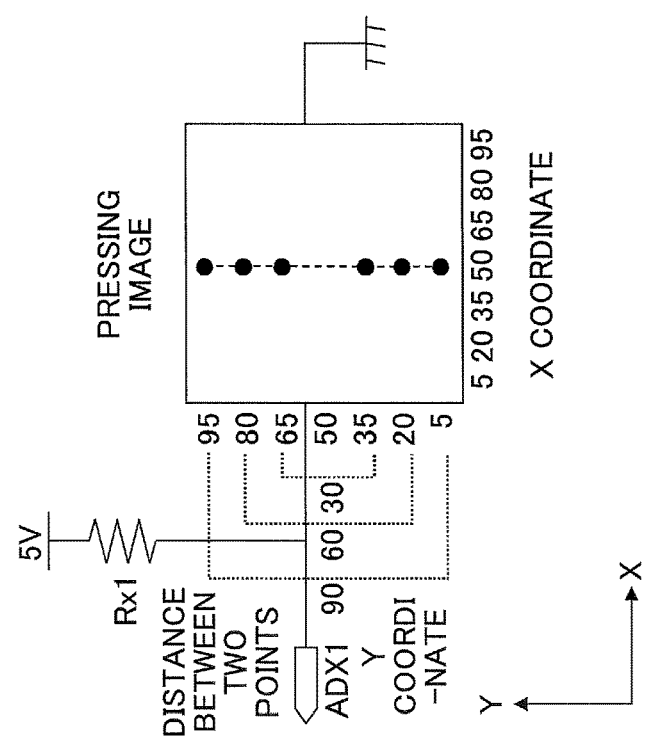

FIGS. 12A and 12B illustrate a case where two contact positions on the touchscreen panel, have the same X coordinate of the position of 50 while the interval of their Y coordinates changes from 30 to 60 to 90 in the case of applying voltage in the X-axis direction, that is, in the case of applying a voltage of 5 V to the XH electrode 11 via the resistor Rx1 and grounding the XL electrode 12. FIG. 12A illustrates the coordinate positions of the two contact points on the touchscreen panel in this case. FIG. 12B illustrates the relationship between the interval between the two points, that is, the distance between the two points, and the potential detected at the potential detecting part ADX1.

Figure 13B:
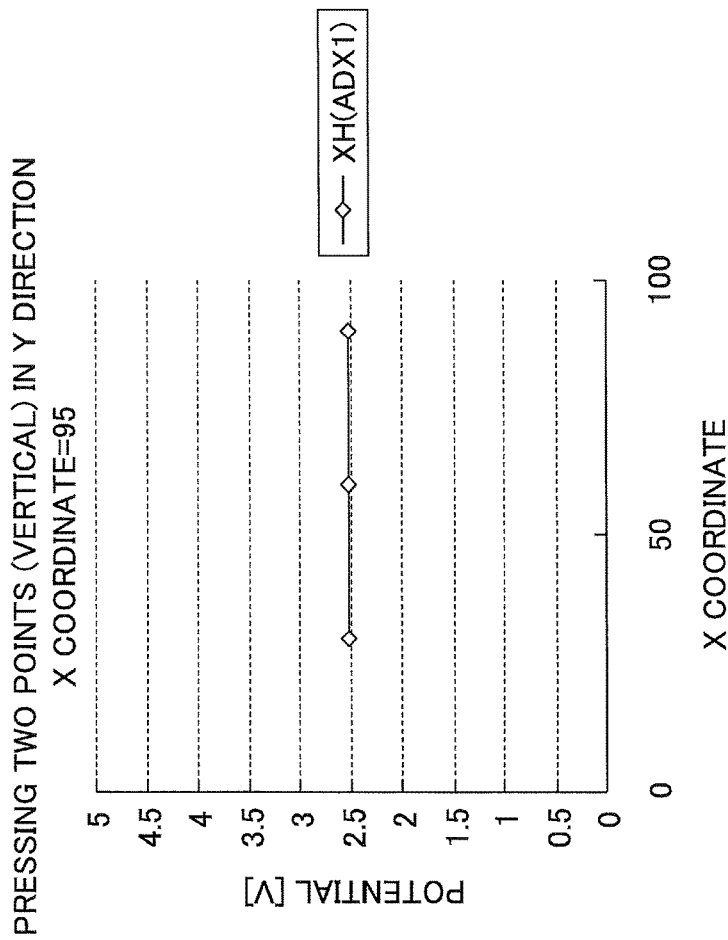
Figure 13A:
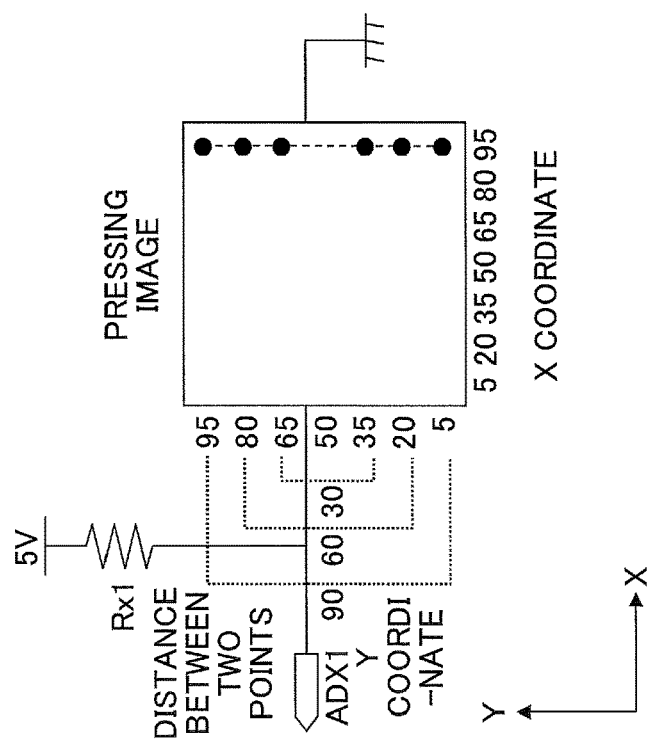

FIGS. 13A and 13B illustrate a case where two contact positions on the touchscreen panel have the same X coordinate of the position of 95 while the interval of their Y coordinates changes from 30 to 60 to 90 in the case of applying voltage in the X-axis direction, that is, in the case of applying a voltage of 5 V to the XH electrode 11 via the resistor Rx1 and grounding the XL electrode 12. FIG. 13A illustrates the coordinate positions of the two contact points on the touchscreen panel in this case. FIG. 13B illustrates the relationship between the interval between the two points, that is, the distance between the two points, and the potential detected at the potential detecting part ADX1.

As illustrated in FIG. 11A through FIG. 13B, if the X coordinates of two contact points are the same, the potential detected at the potential detecting part ADX1 is half of the applied voltage of 5 V, and remains constant without depending on the distance between the two points. That is, even if there is an increase in the distance between two contact points in a direction perpendicular to the direction in which voltage is applied, the potential detected at the potential detecting part ADX1 remains constant (without a change). The same applies to the case of applying voltage in the Y-axis direction. In this case, the potential detected at the potential detecting part ADY1 remains constant (without a change).

Figure 14B:
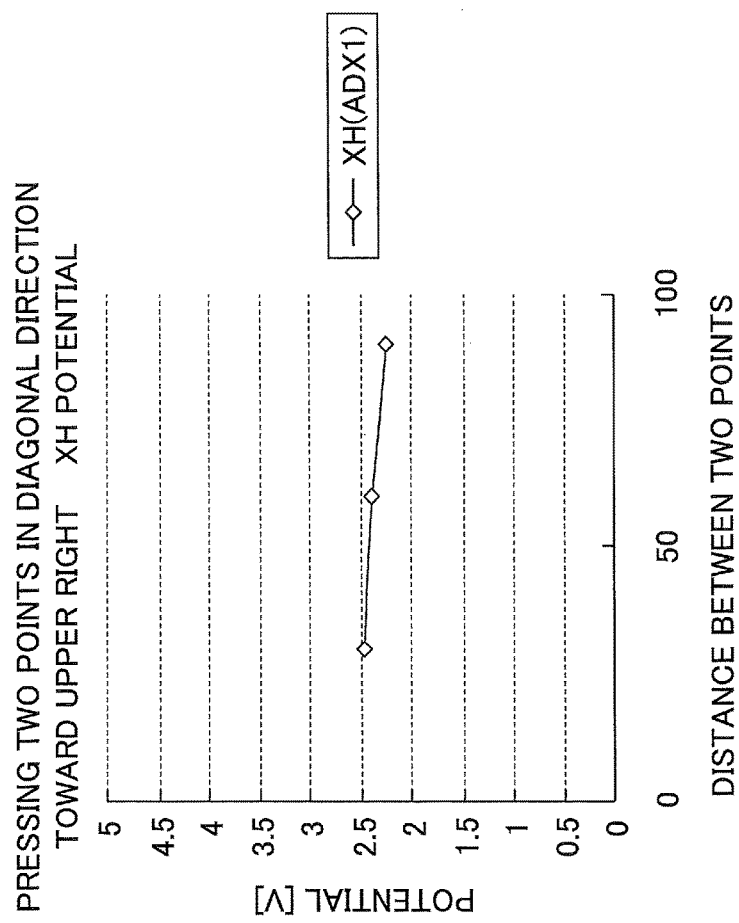
Figure 14A:
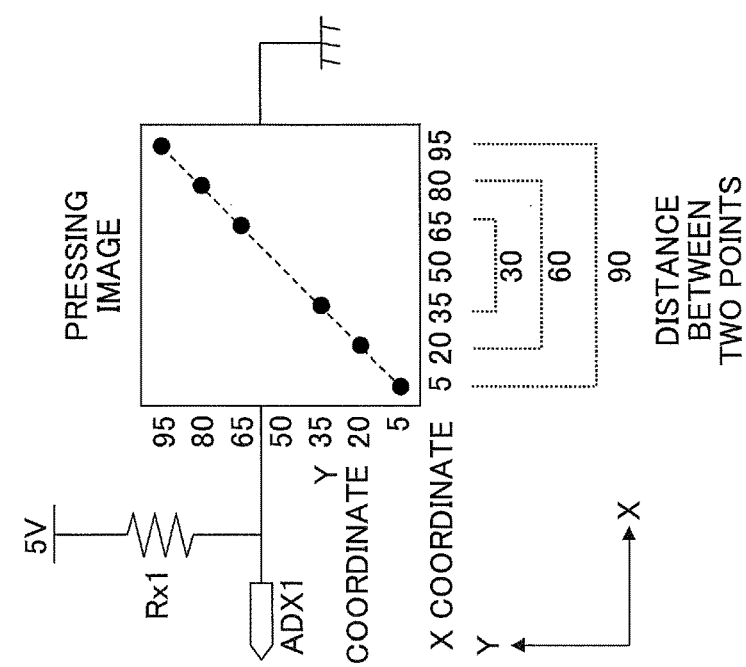

FIGS. 14A and 14B illustrate a case where two contact positions on the touchscreen panel have their interval in the X-axis direction caused to change from 30 to 60 to 90 along a diagonal (or oblique) direction, that is, a direction that is neither the X-axis direction nor the Y-axis direction and is toward upper right (such a direction as to have one of the contact points positioned closer to both of the XL electrode 12 and the YH electrode 21 than the other one of the contact points or such a direction as to have the other one of the contact points positioned closer to both of the XH electrode 11 and the YL electrode 22 than the one of the contact points) in the case of applying voltage in the X-axis direction, that is, in the case of applying a voltage of 5 V to the XH electrode 11 via the resistor Rx1 and grounding the XL electrode 12. FIG. 14A illustrates the coordinate positions of the two contact points on the touchscreen panel in this case. FIG. 14B illustrates the relationship between the interval between the two points, that is, the distance between the two points, in the X-axis direction and the potential detected at the potential detecting part ADX1.

Figure 15B:
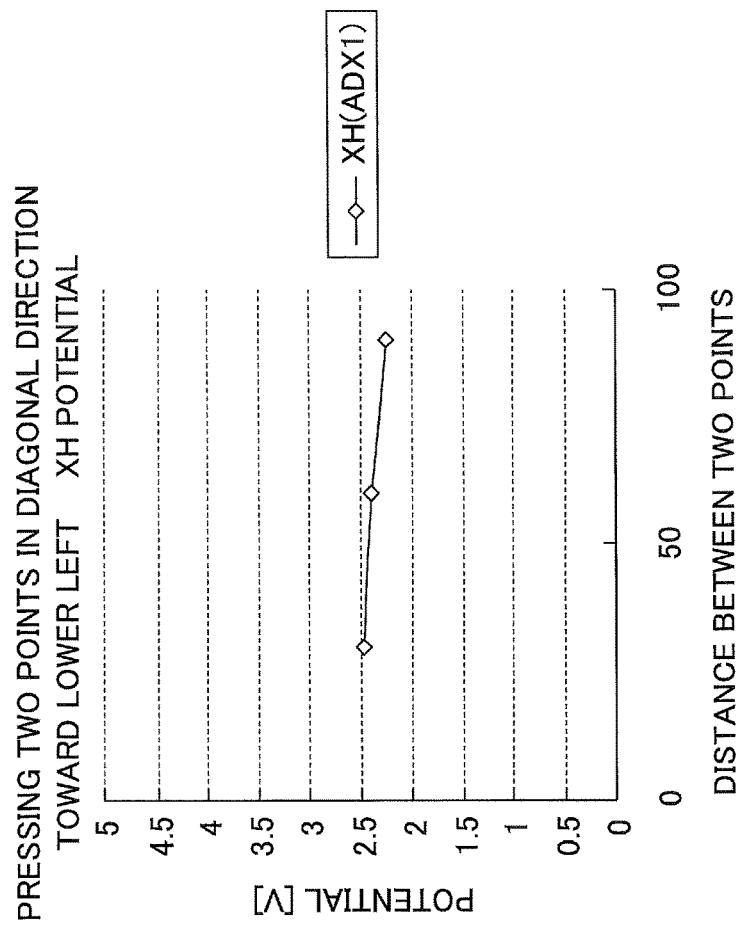
FIGS. 15A and 15B are diagrams illustrating a finite element analysis of the touchscreen panel according to the first embodiment of the present invention.
Figure 15A:
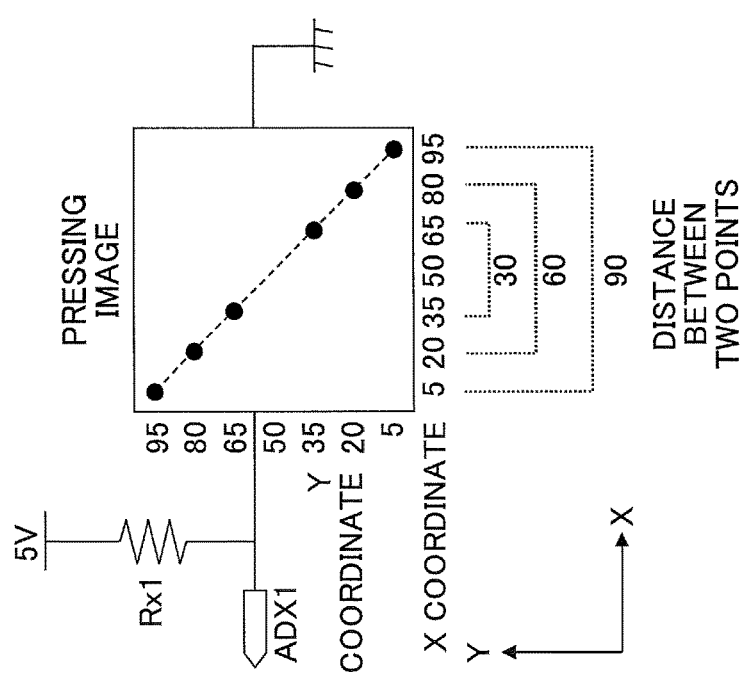

FIGS. 15A and 15B illustrate a case where two contact positions on the touchscreen panel have their interval in the X-axis direction caused to change from 30 to 60 to 90 along a diagonal (or oblique) direction, that is, a direction that is neither the X-axis direction nor the Y-axis direction and extends from lower right to upper left (such a direction as to have one of the contact points positioned closer to both of the XH electrode 11 and the YH electrode 21 than the other one of the contact points or such a direction as to have the other one of the contact points positioned closer to both of the XL electrode 12 and the YL electrode 22 than the one of the contact points) in the case of applying voltage in the X-axis direction, that is, in the case of applying a voltage of 5 V to the XH electrode 11 via the resistor Rx1 and grounding the XL electrode 12. FIG. 15A illustrates the coordinate positions of the two contact points on the touchscreen panel in this case. FIG. 15B illustrates the relationship between the interval between the two points, that is, the distance between the two points, in the X-axis direction and the potential detected at the potential detecting part ADX1.

As illustrated in FIG. 14A through FIG. 15B, if two contact points are in a direction that is neither the X-axis direction nor the Y-axis direction, the potential detected at the potential detecting part ADX1 is less than or equal to half of the applied voltage of 5 V, and the potential detected at the potential detecting part ADX1 decreases as the distance between the two points increases. That is, if there is an increase in the distance between two contact points in a direction that is neither parallel nor perpendicular to the direction in which voltage is applied, the potential detected at the potential detecting part ADX1 decreases. The same applies to the case of applying voltage in the Y-axis direction. In this case, the potential detected at the potential detecting part ADY1 decreases.

Specifically, a potential to serve as an initial potential is measured beforehand at the potential detecting part ADX1 by causing an electric field distribution to be generated in the X-axis direction in the case of no or one contact point on the touchscreen panel. Likewise, a potential to serve as an initial potential is measured beforehand at the potential detecting part ADY1 by causing an electric field distribution to be generated in the Y-axis direction. The measured potentials are stored in the memory 32 (FIG. 1) or the like. That is, in the case of no or one contact point on the touchscreen panel, a potential is detected at the potential detecting part ADX1 by turning ON the switches SW2 and SW3 and turning OFF the other switches SW1 and SW4 through SW7 in the touchscreen panel illustrated in FIG. 1. In this state, a voltage of Vcc is applied to the XH electrode 11 via the resistor Rx1, and the XL electrode 12 is grounded. Therefore, there is a potential distribution in the X-axis direction in the first resistive film 10. In this state, a potential is measured with the potential detecting part ADX1, and the detected potential is stored as an initial potential in the memory 32 or the like. Likewise, a potential is detected at the potential detecting part ADY1 by turning ON the switches SW5 and SW6 and turning OFF the other switches SW1 through SW4 and SW7. In this state, a voltage of Vcc is applied to the YH electrode 21 via the resistor Ry1, and the YL electrode 22 is grounded. Therefore, there is a potential distribution in the Y-axis direction in the second resistive film 20. In this state, a potential is measured with the potential detecting part ADY1, and the detected potential is stored as an initial potential in the memory 32 or the like.

Comparing the values of these initial potentials and the values of the potentials measured in steps S102 and S104 makes it possible to determine whether the number of contact points is one or two and to determine, in the case where the number of contact points is two, whether the line connecting the two contact points is parallel to the X-axis direction, parallel to the Y-axis direction (perpendicular to the X-axis direction), or in a direction parallel to neither the X-axis direction nor the Y-axis direction.

Specifically, it is determined that the number of contact points is one if the potential measured with the potential detecting part ADX1 in step S102 is substantially equal to the initial potential measured at the potential detecting part ADX1 and the potential measured with the potential detecting part ADY1 in step S104 is substantially equal to the initial potential measured at the potential detecting part ADY1. It is determined that the line connecting two contact points is parallel to the X-axis direction (perpendicular to the Y-axis direction) if the potential measured with the potential detecting part ADX1 in step S102 is lower than the initial potential measured at the potential detecting part ADX1 and the potential measured with the potential detecting part ADY1 in step S104 is substantially equal to the initial potential measured at the potential detecting part ADY1. It is determined that the line connecting two contact points is parallel to the Y-axis direction (perpendicular to the X-axis direction) if the potential measured with the potential detecting part ADX1 in step S102 is substantially equal to the initial potential measured at the potential detecting part ADX1 and the potential measured with the potential detecting part ADY1 in step S104 is lower than the initial potential measured at the potential detecting part ADY1. It is determined that two contact points are in a diagonal direction that is neither the X-axis direction nor the Y-axis direction if the potential measured with the potential detecting part ADX1 in step S102 is lower than the initial potential measured at the potential detecting part ADX1 and the potential measured with the potential detecting part ADY1 in step S104 is lower than the initial potential measured at the potential detecting part ADY1.

More specifically, for example, in the case where both of the initial potentials measured at the potential detecting parts ADX1 and ADY1 are 2.5 V, it is determined that the number of contact points is one if the potential measured with the potential detecting part ADX1 in step S102 is 2.5 V and the potential measured with the potential detecting part ADY1 in step S104 is 2.5 V. It is determined that the line connecting two contact points is parallel to the X-axis direction (perpendicular to the Y-axis direction) if the potential measured with the potential detecting part ADX1 in step S102 is lower than 2.5 V and the potential measured with the potential detecting part ADY1 in step S104 is 2.5 V. It is determined that the line connecting two contact points is parallel to the Y-axis direction (perpendicular to the X-axis direction) if the potential measured with the potential detecting part ADX1 in step S102 is 2.5 V and the potential measured with the potential detecting part ADY1 in step S104 is lower than 2.5 V. It is determined that the line connecting two contact points is in a diagonal direction that is neither the X-axis direction nor the Y-axis direction if the potential measured with the potential detecting part ADX1 in step S102 is lower than 2.5 V and the potential measured with the potential detecting part ADY1 in step S104 is lower than 2.5 V.

This makes it possible to determine whether the number of contact points is one or two and, in the case where the number of contact points is two, whether the line connecting the two contact points is parallel to the X-axis direction, parallel to the Y-axis direction (perpendicular to the X-axis direction), or in a direction parallel to neither, the X-axis direction nor the Y-axis direction.

Further, as another method of making the same determination, which does not measure initial potentials, it may be determined that the number of contact points is one if the potential detected at the potential detecting part ADX1 is 2.5 V and the potential detected at the potential detecting part ADY1 is 2.5 V. Further, it may be determined that two contact points are in a direction parallel to the Y-axis direction if the potential measured at the potential detecting part ADX1 is 2.5 V and the potential measured at the potential detecting part ADY1 is lower than 2.5 V. It may be determined that two contact points are in a direction parallel to the X-axis direction if the potential measured at the potential detecting part ADX1 is lower than 2.5 V and the potential measured at the potential detecting part ADY1 is 2.5 V. It may be determined that two contact points are in a diagonal direction that is neither the X-axis direction nor the Y-axis direction if the potential measured at the potential detecting part ADX1 is lower than 2.5 V and the potential measured at the potential detecting part ADY1 is lower than 2.5 V.

Based on the above-described configuration, it may be determined in step S106 whether the number of contact points is one or two on the touchscreen panel according to this embodiment. Regarding the determination as to whether the potential is 2.5 V or less than 2.5 V, thresholds for determining a predetermined range with reference to 2.5 V may be determined. If a measured potential is within the predetermined range, it is determined that the potential is 2.5 V, and if a measured potential is out of the predetermined range (for example, lower than the lower limit of the predetermined range), it is determined that the potential is lower than 2.5 V. These determinations are stored as information in the memory 32 or the like in the control part 30 as desired.

Referring back to FIG. 2, if it is determined in step S106 that the number of contact points on the touchscreen panel is one (NO in step S106), the process proceeds to step S108. If it is determined that the number of contact points is two (YES in step S106), the process proceeds to step S110.

Next, in step S108, the position coordinates of the contact point are detected in the case where the touchscreen panel is contacted at a single point. Since the number of contact points is one, the coordinate position at the contact point may be detected by a common position detecting method. For example, with a potential of 5 V being applied to the XH electrode 11 and the XL electrode 12 being grounded, the potential in the X-axis direction is detected with the potential detecting part ADX1, and a position at the X coordinate of the contact point is detected based on this potential. Further, with a potential of 5 V being applied to the YH electrode 21 and the YL electrode 22 being grounded, the potential in the Y-axis direction is detected with the potential detecting part ADY1, and a position at the Y coordinate of the contact point is detected based on this potential.

Next, in step S110, a second detection of an X-direction potential is performed. Specifically, in the touchscreen panel illustrated in FIG. 1, the switches SW1 and SW3 are turned ON and the other switches SW2 and SW4 through SW7 are turned OFF, and potentials are measured at the potential detecting parts ADY1 and ADY2. In this state, a voltage of Vcc is applied to the XH electrode 11, and the XL electrode 12 is grounded. Therefore, there is a potential distribution in the X-axis direction in the first resistive film 10. In this state, potentials are measured at the potential detecting parts ADY1 and ADY2, and the detected potentials are stored as information in the memory 32 or the like. Step S110 may be referred to as a third measurement process.

Next, in step S112, a second detection of a Y-direction potential is performed. Specifically, in the touchscreen panel illustrated in FIG. 1, the switches SW4 and SW6 are turned ON and the other switches SW1 through SW3, SW5, and SW7 are turned OFF, and potentials are measured at the potential detecting parts ADX1 and ADX2. In this state, a voltage of Vcc is applied to the YH electrode 21, and the YL electrode 22 is grounded. Therefore, there is a potential distribution in the Y-axis direction in the second resistive film 20. In this state, potentials are measured at the potential detecting parts ADX1 and ADX2, and the detected potentials are stored as information in the memory 32 or the like. Step S112 may be referred to as a fourth measurement process.

Next, in step S114, the slope of the line connecting the two contact points on the touchscreen panel is detected. Specifically, it is determined whether the line connecting the two contact points on the touchscreen panel is parallel to the X-axis or Y-axis direction or not, and if the line is parallel to neither the X-axis direction nor the Y-axis direction, it is determined whether the slope is in a diagonal (or oblique) direction toward upper right or in a diagonal (or oblique) direction toward upper left. That is, as described above, a potential to serve as an initial potential is measured beforehand at the potential detecting part ADX1 by causing an electric field distribution to be generated in the X-axis direction in the case of no or one contact point on the touchscreen panel. Likewise, a potential to serve as an initial potential is measured beforehand at the potential detecting part ADY1 by causing an electric field distribution to be generated in the Y-axis direction. The measured potentials are stored in the memory 32 (FIG. 1) or the like. Specifically, in the case of no or one contact point on the touchscreen panel, a potential is detected at the potential detecting part ADX1 by turning ON the switches SW2 and SW3 and turning OFF the other switches SW1 and SW4 through SW7 in the touchscreen panel illustrated in FIG. 1. In this state, a voltage of Vcc is applied to the XH electrode 11 via the resistor Rx1, and the XL electrode 12 is grounded. Therefore, there is a potential distribution in the X-axis direction in the first resistive film 10. In this state, a potential is measured with the potential detecting part ADX1, and the detected potential is stored as an initial potential in the memory 32 or the like. Likewise, a potential is detected at the potential detecting part ADY1 by turning ON the switches SW5 and SW6 and turning OFF the other switches SW1 through SW4 and SW7. In this state, a voltage of Vcc is applied to the YH electrode 21 via the resistor Ry1, and the YL electrode 22 is grounded. Therefore, there is a potential distribution in the Y-axis direction in the second resistive film 20. In this state, a potential is measured with the potential detecting part ADY1, and the detected potential is stored as an initial potential in the memory 32 or the like.

Comparing the values of these initial potentials and the values of the potentials measured in steps S102 and S104 makes it possible to determine whether the line connecting the two contact points is parallel to the X-axis direction or parallel to the Y-axis direction (perpendicular to the X-axis direction).

Specifically, it may be determined that the line connecting the two contact points is parallel to the X-axis direction (perpendicular to the Y-axis direction) if the potential measured with the potential detecting part ADX1 in step S102 is lower than the initial potential measured at the potential detecting part ADX1 and the potential measured with the potential detecting part ADY1 in step S104 is substantially equal to the initial potential measured at the potential detecting part ADY1. It may be determined that the line connecting the two contact points is parallel to the Y-axis direction (Perpendicular to the X-axis direction) if the potential measured with the potential detecting part ADX1 in step S102 is substantially equal to the initial potential measured at the potential detecting part ADX1 and the potential measured with the potential detecting part ADY1 in step S104 is lower than the initial potential measured at the potential detecting part ADY1. In this case, it may also be determined that the two contact points are in a diagonal direction that is neither the X-axis direction nor the Y-axis direction if the potential measured with the potential detecting part ADX1 in step S102 is lower than the initial potential measured at the potential detecting part ADX1 and the potential measured with the potential detecting part ADY1 in step S104 is lower than the initial potential measured at the potential detecting part ADY1.

More specifically, for example, it is determined that the line connecting the two contact points is parallel to the X-axis direction (perpendicular to the Y-axis direction) if the potential measured with the potential detecting part ADX1 in step S102 is lower than 2.5 V and the potential measured with the potential detecting part ADY1 in step S104 is 2.5 V. It is determined that the line connecting the two contact points is parallel to the Y-axis direction (perpendicular to the X-axis direction) if the potential measured with the potential detecting part ADX1 in step S102 is 2.5 V and the potential measured with the potential detecting part ADY1 in step S104 is lower than 2.5 V. In this case, it may also be determined that the line connecting the two contact points is in a diagonal direction that is neither the X-axis direction nor the Y-axis direction if the potential measured with the potential detecting part ADX1 in step S102 is lower than 2.5 V and the potential measured with the potential detecting part ADY1 in step S104 is lower than 2.5 V.

This makes it possible to determine whether the line connecting the two contact points is parallel to the X-axis direction or parallel to the Y-axis direction.

Further, as another method of making the same determination, which does not measure initial potentials, it may be determined that the two contact points are in a direction parallel to the Y-axis direction if the potential measured at the potential detecting part ADX1 is 2.5 V and the potential measured at the potential detecting part ADY1 is lower than 2.5 V, that is, if the potential detected at the potential detecting part ADY1 is lower than the potential detected at the potential detecting part ADX1. It may be determined that the two contact points are in a direction parallel to the X-axis direction if the potential measured at the potential detecting part ADX1 is lower than 2.5 V and the potential measured at the potential detecting part ADY1 is 2.5 V, that is, if the potential detected at the potential detecting part ADY1 is higher than the potential detected at the potential detecting part ADX1.

Figure 16:
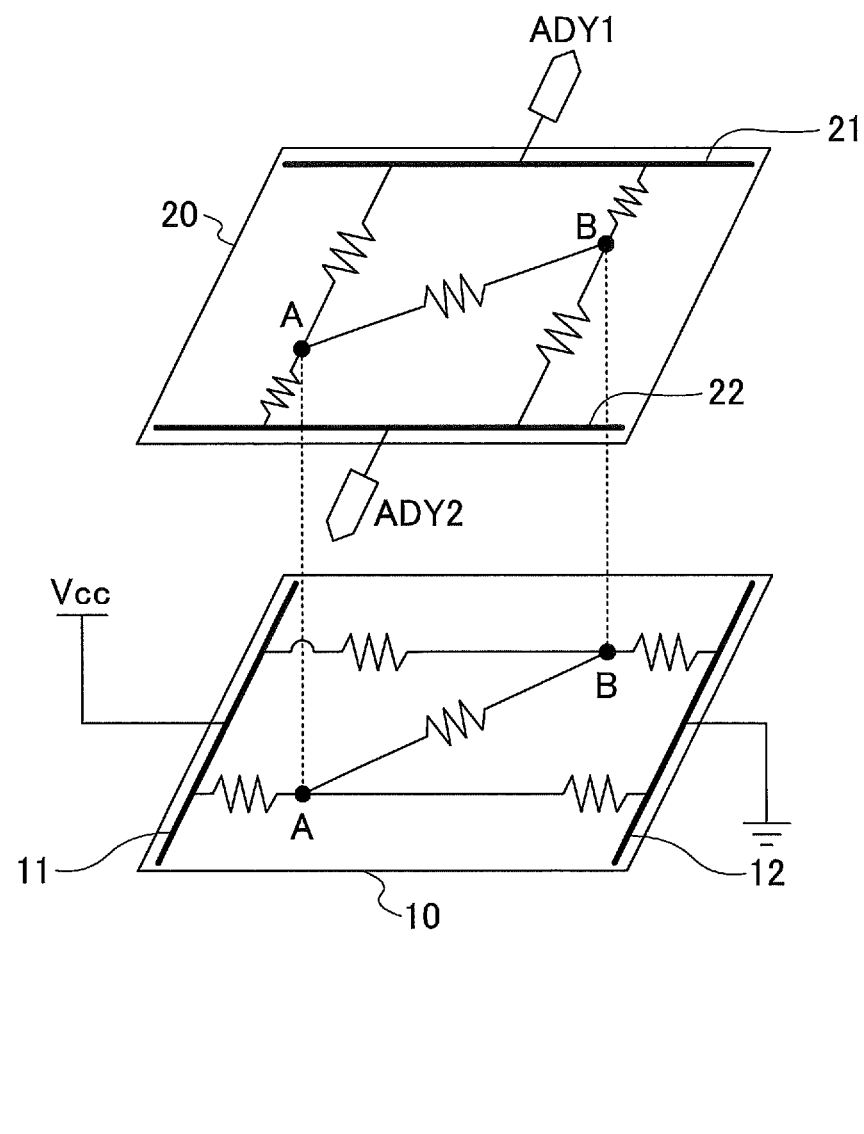
FIG. 16 is a diagram illustrating the position detecting method of the touchscreen panel according to the first embodiment of the present invention.
Figure 17B:
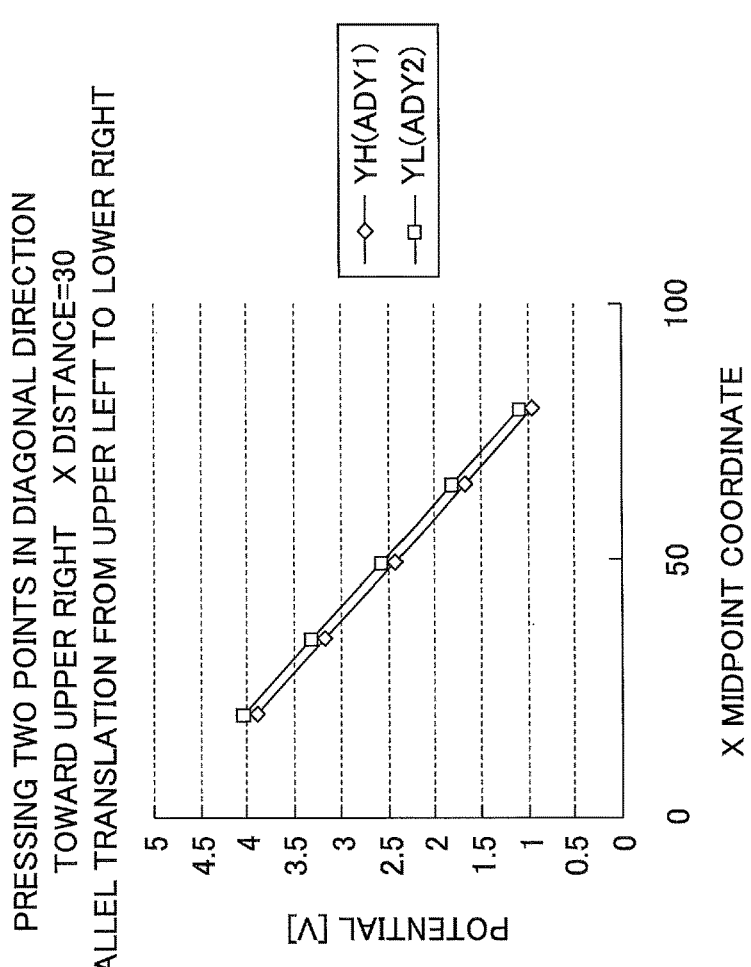
FIGS. 17A and 17B are diagrams illustrating a finite element analysis of the touchscreen panel according to the first embodiment of the present invention.

In the case where the line is parallel to neither the X-axis direction nor the Y-axis direction, specifically, in step S110, the potential detected at the potential detecting part ADY2 is higher than the potential detected at the potential detecting part ADY1 as illustrated in FIG. 17B if, of the two contact points A and B on the touchscreen panel, the point B is closer to both of the XL electrode 12 and the YH electrode 21 than is the point A as illustrated in FIG. 16.

Figure 17A:
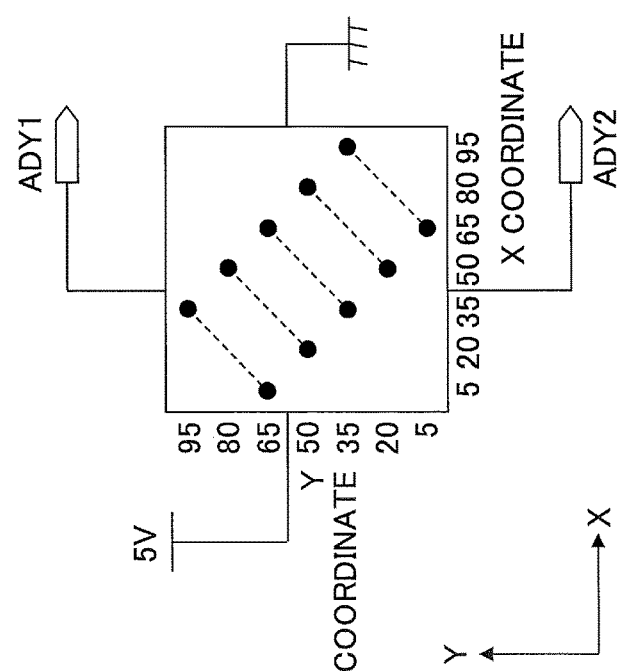

FIGS. 17A and 17B illustrate the case of changing the two contact positions on the touchscreen panel so that the two contact positions are in lower left-to-upper right straight lines at regular intervals in the case of applying voltage in the X-axis direction, that is, applying a voltage of 5 V to the XH electrode 11 and grounding the XL electrode 12. FIG. 17A illustrates the coordinate positions of the two contact points on the touchscreen panel in this case. FIG. 17B illustrates the relationship between the X coordinate position at the midpoint between the two points and the potentials detected in the potential detecting parts ADY1 and ADY2.

It is presumed that the point A, which is close to the XH electrode 11 to which a potential of 5 V is applied in the first resistive film 10, is heavily affected by this so that a relatively high potential is likely to be detected at the potential detecting part ADY2 connected to the YL electrode 22, which is close to the point A, in the second resistive film 20, while the point B, which is close to the grounded XL electrode 12 in the first resistive film 10, is heavily affected by this so that a relatively low potential is likely to be detected at the potential detecting part ADY1 connected to the YH electrode 21, which is close to the point B, in the second resistive film 20.

Figure 18:
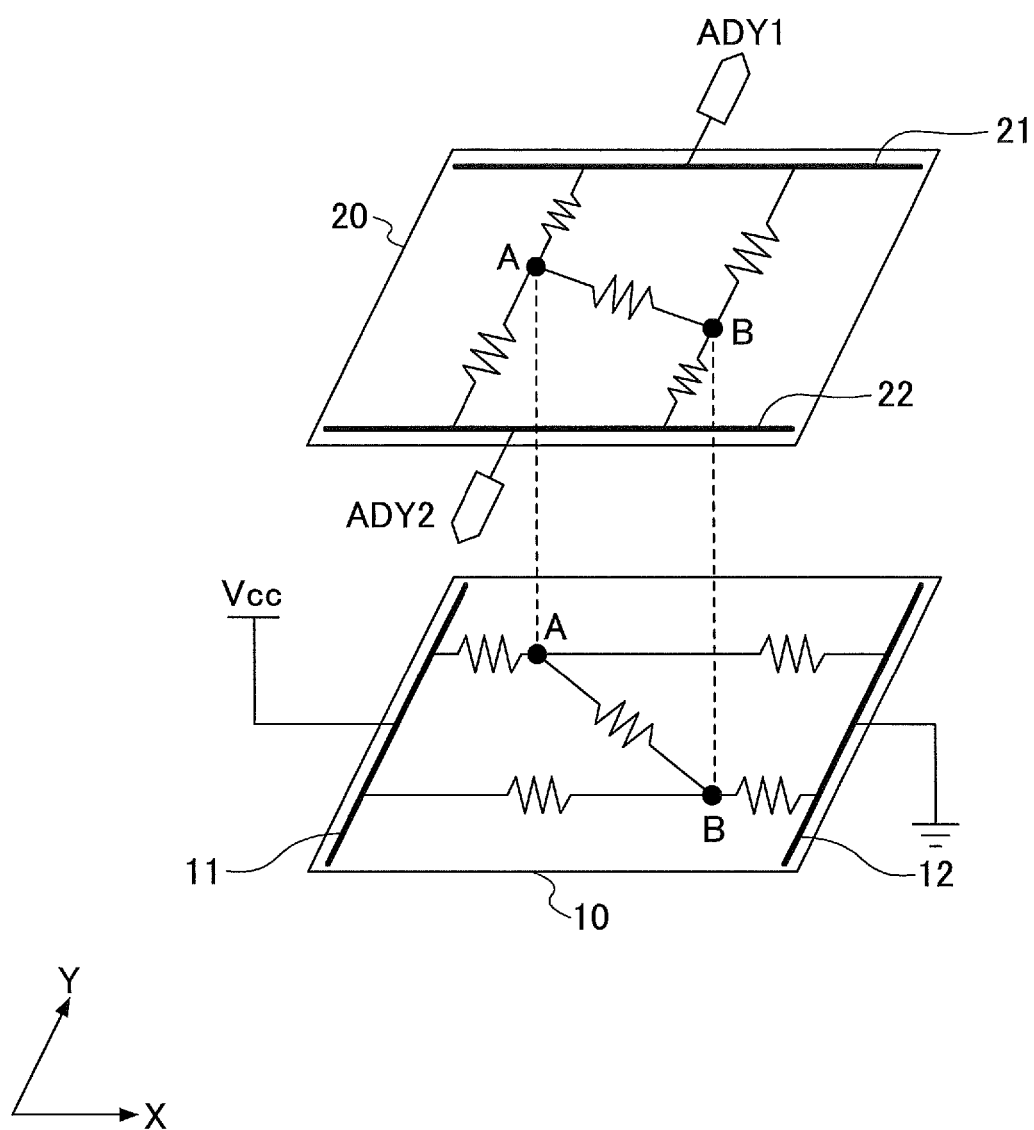
FIG. 18 is a diagram illustrating the position detecting method of the touchscreen panel according to the first embodiment of the present invention.
Figure 19B:
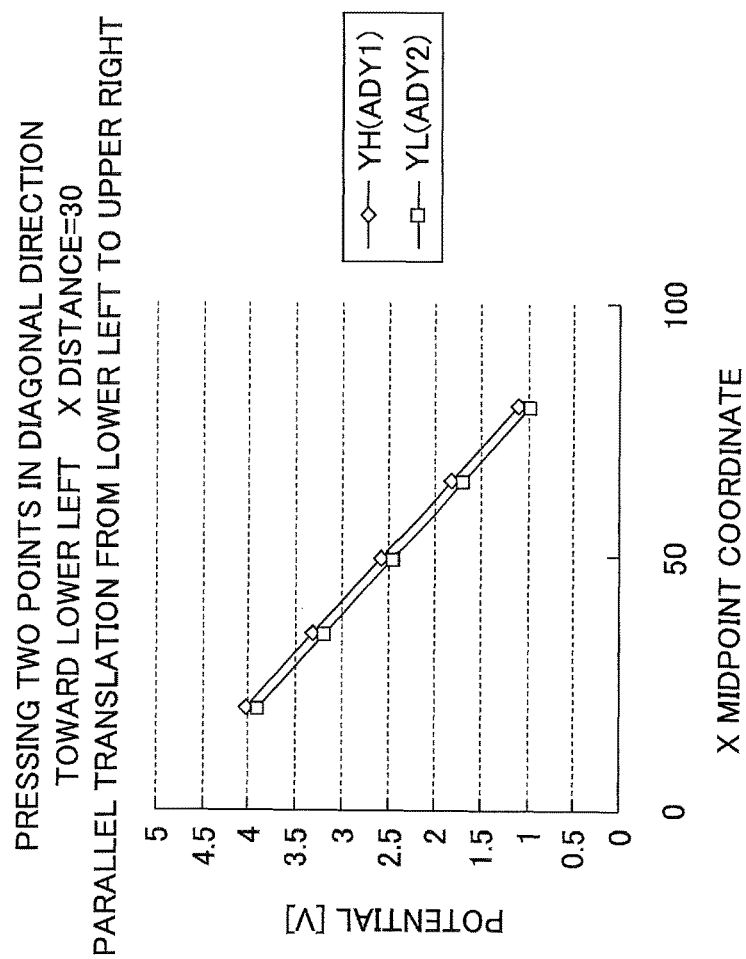
FIGS. 19A and 19B are diagrams illustrating a finite element analysis of the touchscreen panel according to the first embodiment of the present invention.

On the other hand, in step S110, the potential detected at the potential detecting part ADY2 is lower than the potential detected at the potential detecting part ADY1 as illustrated in FIG. 19B if, of the two contact points A and B on the touchscreen panel, the point A is closer to both of the XH electrode 11 and the YH electrode 21 than is the point B as illustrated in FIG. 18.

Figure 19A:
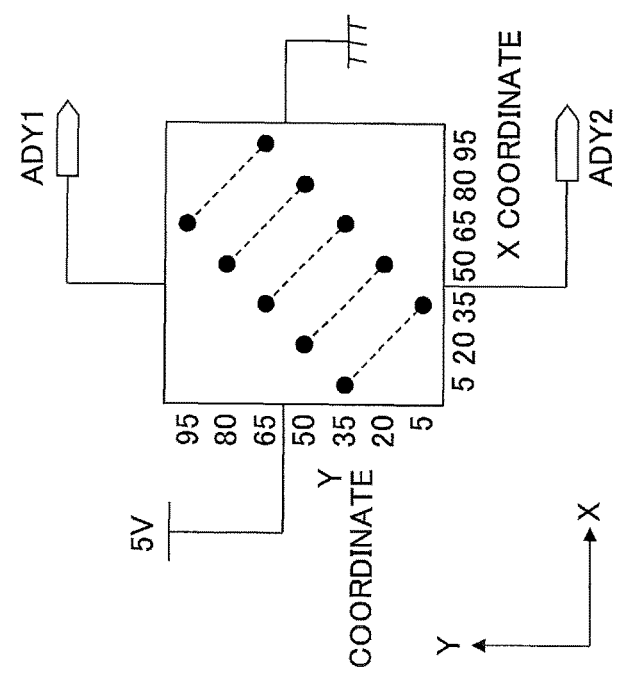

FIGS. 19A and 19B illustrate the case of changing the two contact positions on the touchscreen panel so that the two contact positions are in lower right-to-upper left straight lines at regular intervals in the case of applying voltage in the X-axis direction, that is, applying a voltage of 5 V to the XH electrode 11 and grounding the XL electrode 12. FIG. 19A illustrates the coordinate positions of the two contact points on the touchscreen panel in this case. FIG. 19B illustrates the relationship between the X coordinate position at the midpoint between the two points and the potentials detected in the potential detecting parts ADY1 and ADY2.

It is presumed that the point A, which is close to the XH electrode 11 to which a potential of 5 V is applied in the first resistive film 10, is heavily affected by this so that a relatively high potential is likely to be detected at the potential detecting part ADY1 connected to the YH electrode 21, which is close to the point A, in the second resistive film 20, while the point B, which is close to the grounded XL electrode 12 in the first resistive film 10, is heavily affected by this so that a relatively low potential is likely to be detected at the potential detecting part ADY2 connected to the YL electrode 22, which is close to the point B, in the second resistive film 20.

This makes it possible to determine whether the slope of the line connecting the two contact points on the touchscreen panel is toward upper right or toward upper left.

Further, it is also possible to determine, based on the potentials detected in step S110, whether the two contact points are parallel to the X-axis direction or the Y-axis direction.

Specifically, the values of the potentials detected at the potential detecting parts ADY1 and ADY2 are equal as described below if the two contact points are at positions parallel to the X-axis direction in which voltage is applied or parallel to the Y-axis direction perpendicular to the direction in which voltage is applied. Therefore, if the values of the potentials detected at the potential detecting parts ADY1 and ADY2 are equal, it may be determined that the two contact positions on the touchscreen panel are parallel to the X-axis direction or the Y-axis direction.

Figure 20A:
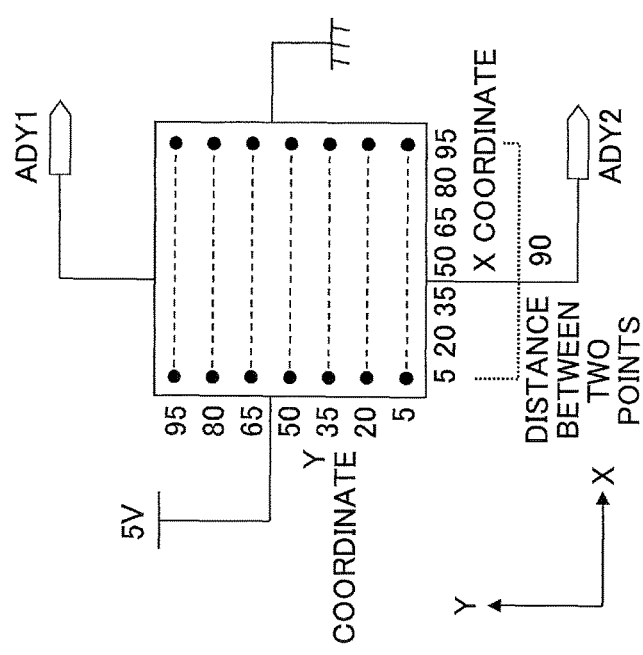
FIGS. 20A and 20B are diagrams illustrating a finite element analysis of the touchscreen panel according to the first embodiment of the present invention.
Figure 20B:
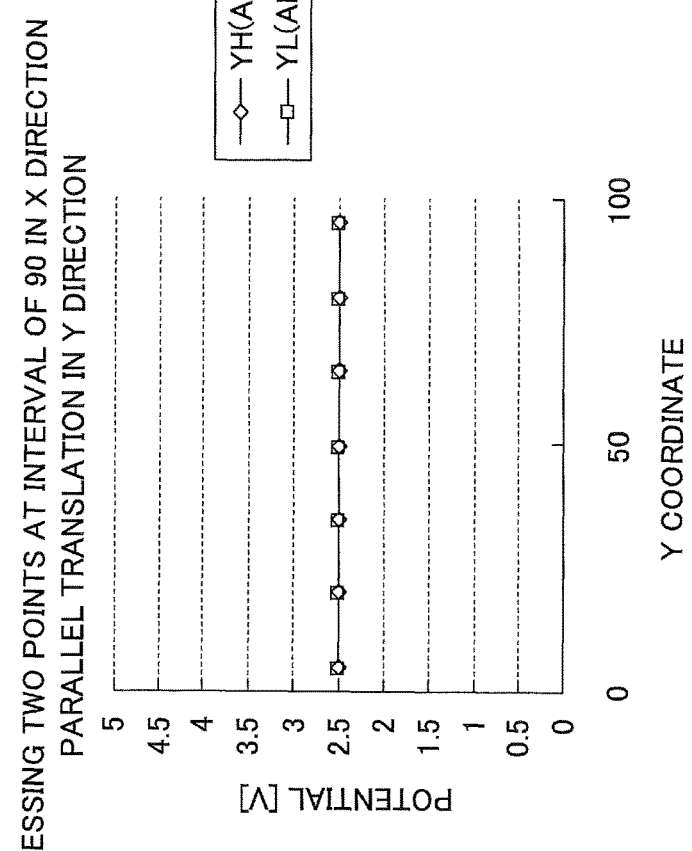

FIGS. 20A and 20B illustrate the case of changing the Y coordinate position of the two contact positions having the same Y coordinate and having a constant interval of 90 in the X-axis direction (between the X coordinate positions of 5 and 95) on the touchscreen panel in the case of applying voltage in the X-axis direction, that is, applying a voltage of 5 V to the XH electrode 11 and grounding the XL electrode 12. FIG. 20A illustrates the coordinate positions of the two contact points on the touchscreen panel in this case. FIG. 20B illustrates the relationship between the Y coordinate position at the contact points and the potentials detected in the potential detecting parts ADY1 and ADY2.

Figure 21B:
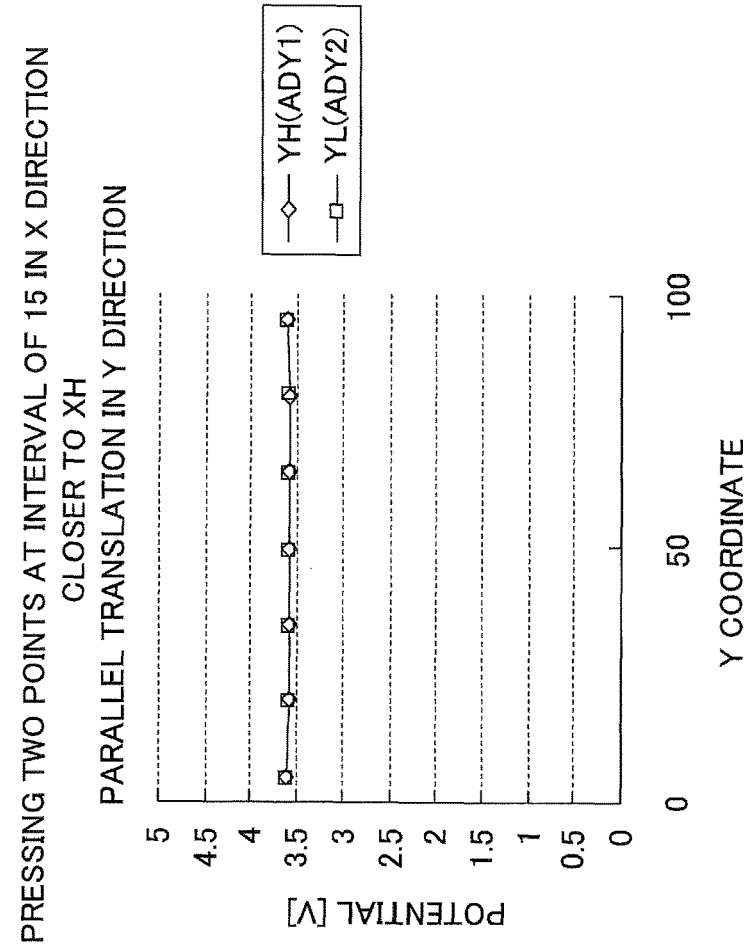
FIGS. 21A and 21B are diagrams illustrating a finite element analysis of the touchscreen panel according to the first embodiment of the present invention.
Figure 21A:
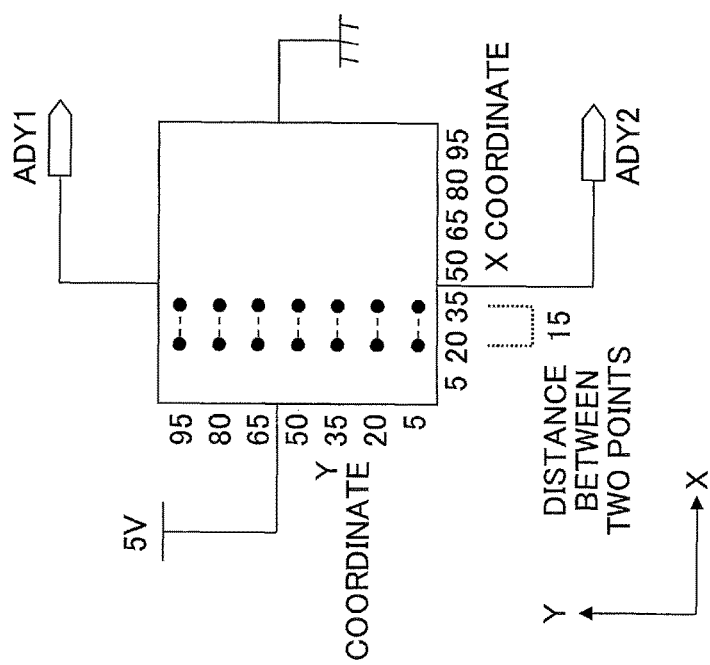

Further, FIGS. 21A and 21B illustrate the case of changing the Y coordinate position of the two contact positions having the same Y coordinate and having a constant interval of 15 in the X-axis direction (between the X coordinate positions of 20 and 35) on the touchscreen panel in the case of applying voltage in the X-axis direction, that is, applying a voltage of 5 V to the XH electrode 11 and grounding the XL electrode 12. FIG. 21A illustrates the coordinate positions of the two contact points on the touchscreen panel in this case. FIG. 213 illustrates the relationship between the Y coordinate position at the contact points and the potentials detected in the potential detecting parts ADY1 and ADY2.

Figure 22B:
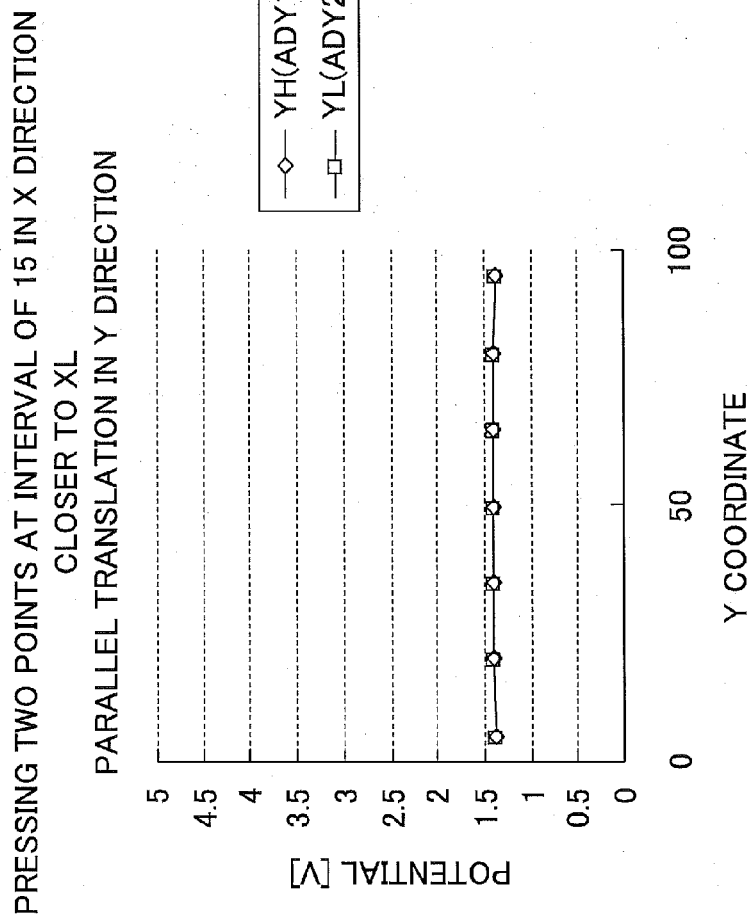
FIGS. 22A and 22B are diagrams illustrating a finite element analysis of the touchscreen panel according to the first embodiment of the present invention.
Figure 22A:
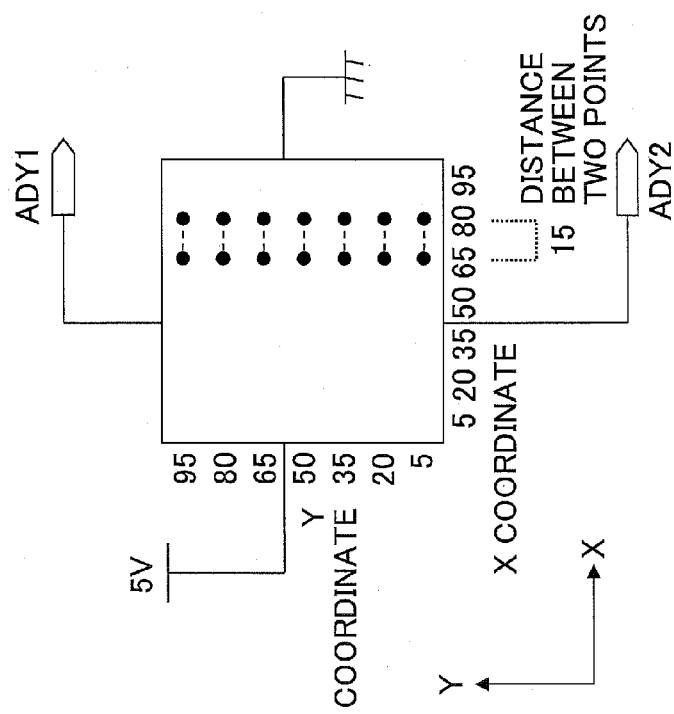

Further, FIGS. 22A and 22B illustrate the case of changing the Y coordinate position of the two contact positions having the same Y coordinate and having a constant interval of 15 in the X-axis direction (between the X coordinate positions of 65 and 80) on the touchscreen panel in the case of applying voltage in the X-axis direction, that is, applying a voltage of 5 V to the XH electrode 11 and grounding the XL electrode 12. FIG. 22A illustrates the coordinate positions of the two contact points on the touchscreen panel in this case. FIG. 22B illustrates the relationship between the Y coordinate position at the contact points and the potentials detected in the potential detecting parts ADY1 and ADY2.

As illustrated in FIG. 20A through FIG. 22B, if the Y coordinates of the two contact positions are at the same position, the potentials detected at the potential detecting parts ADY1 and ADY2 have the same value, which is a potential corresponding to the midpoint between the point A and the point B. For example, in the case of FIGS. 20A and 20B, the position of the X coordinate of the midpoint is the position of 50. Therefore, a value of 2.5 V, which is half of the potential of the applied voltage of 5V, is detected at the potential detecting parts ADY1 and ADY2. Further, in the case of FIGS. 21A and 21B, the position of the X coordinate of the midpoint is a position corresponding to 27.5, and a potential corresponding to this position is detected at the potential detecting parts ADY1 and ADY2. Further, in the case of FIGS. 22A and 22B, the position of the X coordinate of the midpoint is a position corresponding to 72.5, and a potential corresponding to this position is detected at the potential detecting parts ADY1 and ADY2.

Figure 23A:
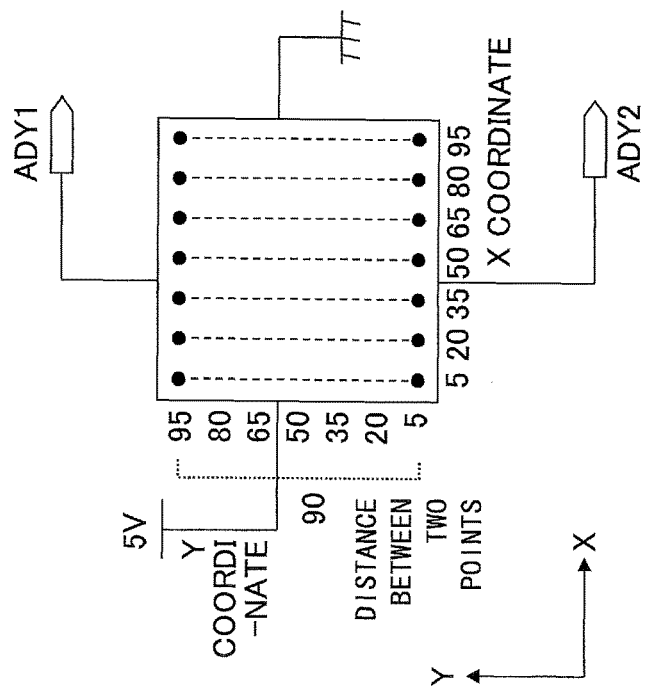
FIGS. 23A and 23B are diagrams illustrating a finite element analysis of the touchscreen panel according to the first embodiment of the present invention.
Figure 23B:
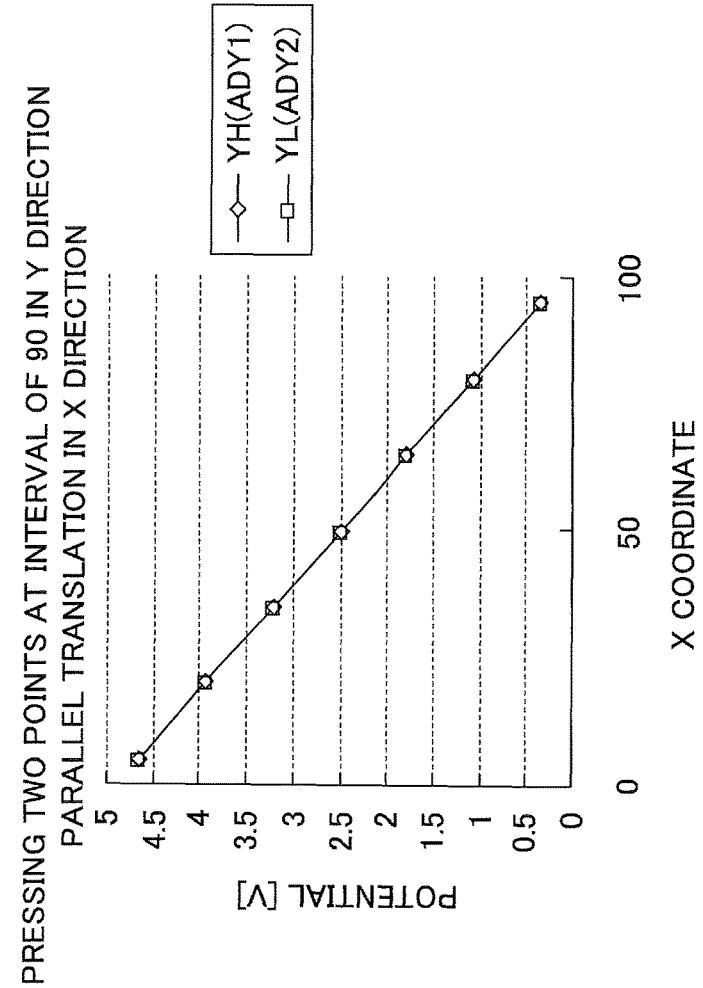

FIGS. 23A and 23B illustrate the case of changing the X coordinate position of the two contact positions having the same X coordinate and having a constant interval of 90 in the Y-axis direction (between the Y coordinate positions of 5 and 95) on the touchscreen panel in the case of applying voltage in the X-axis direction, that is, applying a voltage of 5 V to the XH electrode 11 and grounding the XL electrode 12. FIG. 23A illustrates the coordinate positions of the two contact points on the touchscreen panel in this case. FIG. 23B illustrates the relationship between the X coordinate position at the contact points and the potentials detected in the potential detecting parts ADY1 and ADY2.

Figure 24A:
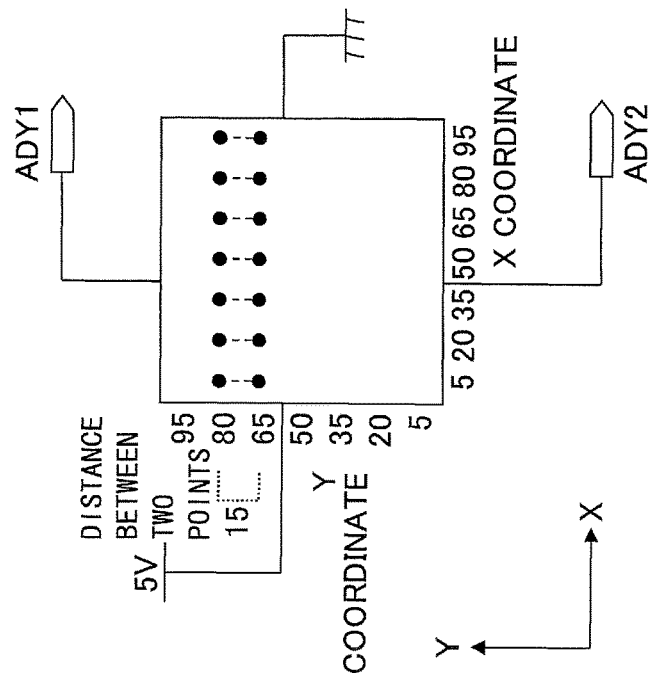
FIGS. 24A and 24B are diagrams illustrating a finite element analysis of the touchscreen panel according to the first embodiment of the present invention.
Figure 24B:
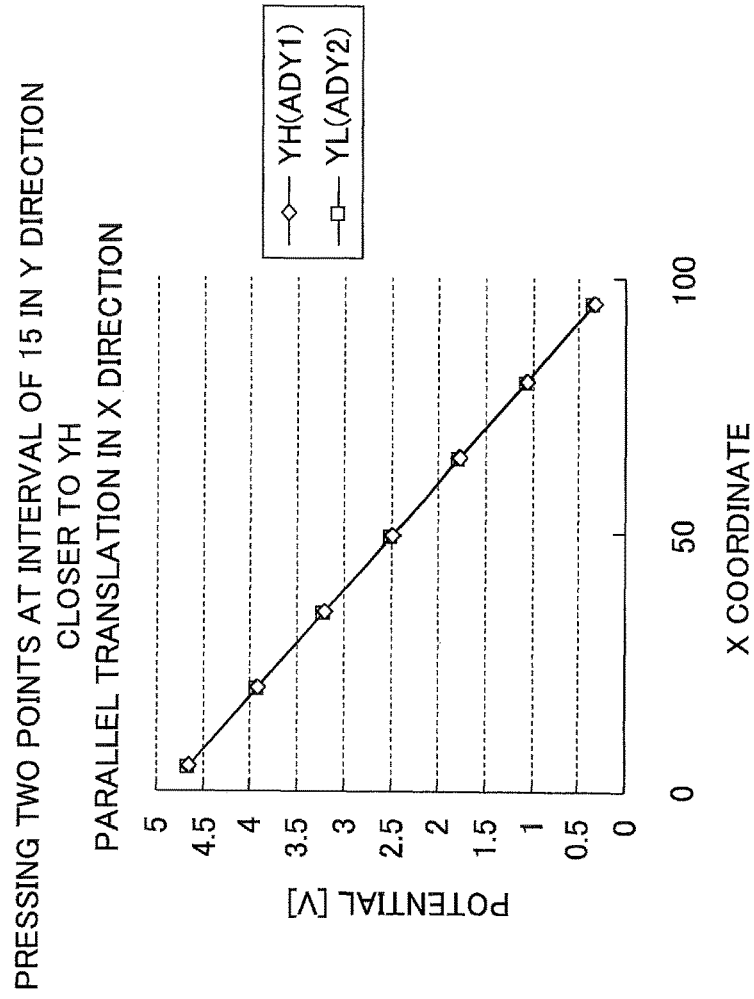

Further, FIGS. 24A and 24B illustrate the case of changing the X coordinate position of the two contact positions having the same X coordinate and having a constant interval of 15 in the Y-axis direction (between the Y coordinate positions of 65 and 80) on the touchscreen panel in the case of applying voltage in the X-axis direction, that is, applying a voltage of 5 V to the XH electrode 11 and grounding the XL electrode 12. FIG. 24A illustrates the coordinate positions of the two contact points on the touchscreen panel in this case. FIG. 243 illustrates the relationship between the X coordinate position at the contact points and the potentials detected in the potential detecting parts ADY1 and ADY2.

Figure 25A:
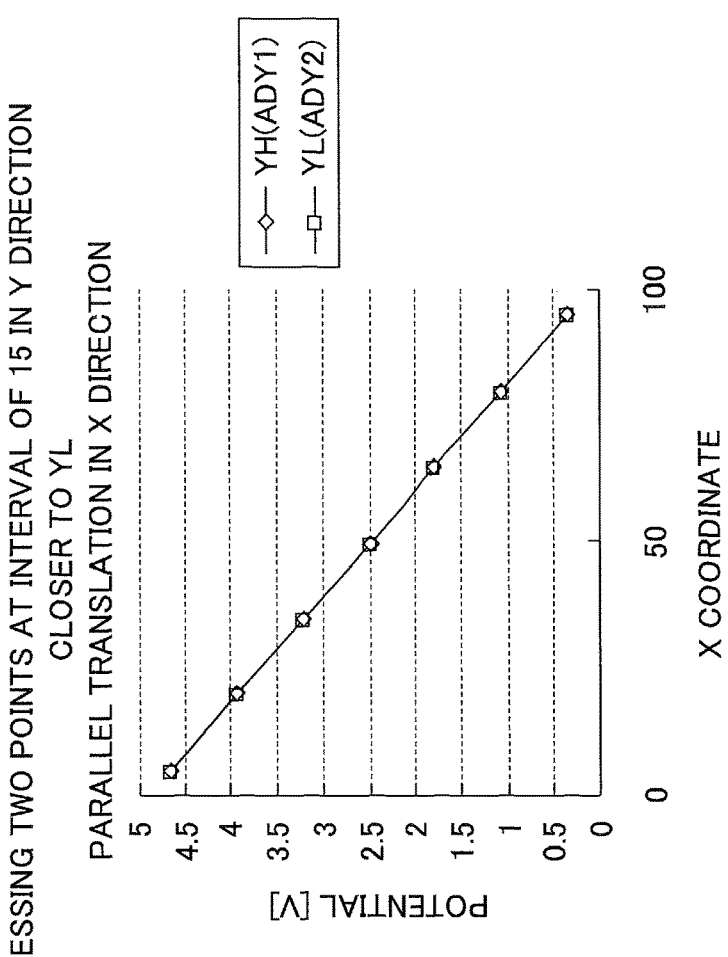
FIGS. 25A and 25B are diagrams illustrating a finite element analysis of the touchscreen panel according to the first embodiment of the present invention.
Figure 25B:
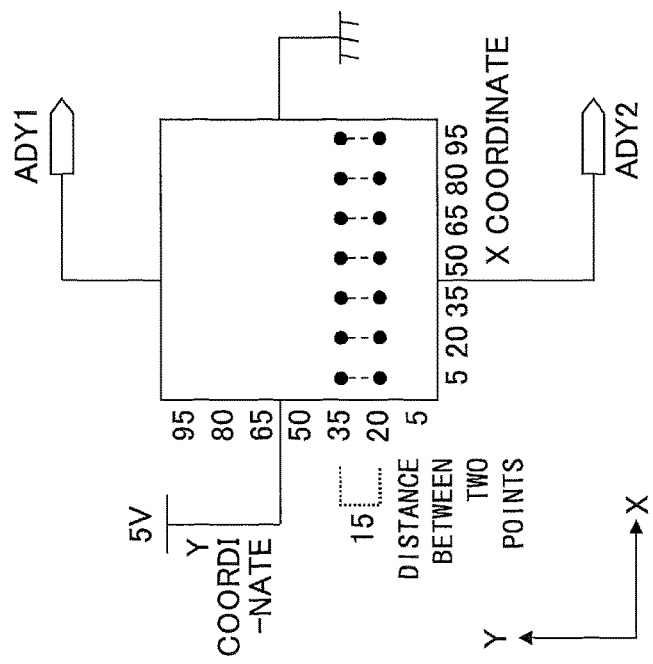

Further, FIGS. 25A and 25B illustrate the case of changing the X coordinate position of the two contact positions having the same X coordinate and having a constant interval of 15 in the Y-axis direction (between the Y coordinate positions of 20 and 35) on the touchscreen panel in the case of applying voltage in the X-axis direction, that is, applying a voltage of 5 V to the XH electrode 11 and grounding the XL electrode 12. FIG. 25A illustrates the coordinate positions of the two contact points on the touchscreen panel in this case. FIG. 25B illustrates the relationship between the X coordinate position at the contact points and the potentials detected in the potential detecting parts ADY1 and ADY2.

As illustrated in FIG. 23A through FIG. 25B, if the X coordinates of the two contact positions are at the same coordinate position, the potentials detected at the potential detecting parts ADY1 and ADY2 have the same value, and a potential corresponding to the X coordinate at the point A and the point B is detected. That is, if the two contact points are in a direction parallel to the Y-axis direction, a potential corresponding to the X coordinates of the point A and the point B is detected at the potential detecting parts ADY1 and ADY2 irrespective of the interval between the point A and the point B.

A description is given above of the case of applying voltage in the X-axis direction, while it is possible to determine whether or not the line connecting two contact points on the touchscreen panel is parallel to the X-axis direction or the Y-axis direction by the same method in the case of applying voltage in the Y-axis direction as well.

Thus, it is possible to determine, based on the potential detected in the potential detecting part ADX1 in step S102 and the potential detected in the potential detecting part ADY1 in step S104, whether or not the two contact points on the touchscreen panel are parallel to the X-axis direction or the Y-axis direction. Further, it is possible to determine, based on the magnitude relationship between the potential detected at the potential detecting parts ADY1 and ADY2, whether the slope of the line connecting the two contact points is a so-called "right up" slope (in a diagonal direction toward upper right) or "left up" slope (in a diagonal direction toward upper left).

That is, if the potential detected at the potential detecting part ADY1 is lower than the potential detected at the potential detecting part ADY2, it is determined that the slope of the line connecting the two points is toward upper right. Further, if the potential detected at the potential detecting part ADY1 is higher than the potential detected at the potential detecting part ADY2, it is determined that the slope of the line connecting the two points is toward upper left. Further, if the potential detected at the potential detecting part ADY1 and the potential detected at the potential detecting part ADY2 are equal, it is determined that the slope of the line connecting the two points is parallel to either the X-axis direction or the Y-axis direction.

A description is given above of the case where it is determined whether the two contact points on the touchscreen panel are parallel to the X-axis direction or the Y-axis direction based on the potentials detected in steps S110 and S112, that is, based on the information obtained in the third measurement process and the fourth measurement process. It is also possible to make the determination based on the potentials detected in steps S102 and S104, that is, based on the information obtained in the first measurement process and the second measurement process.

Further, a description is given above of the case of applying voltage in the X-axis direction in the case of determining whether the slope of the line connecting two contact points on the touchscreen panel is so-called "right up" or "left up," while such determination may also be made in the same manner in the case of applying voltage in the Y-axis direction.

Figure 26:
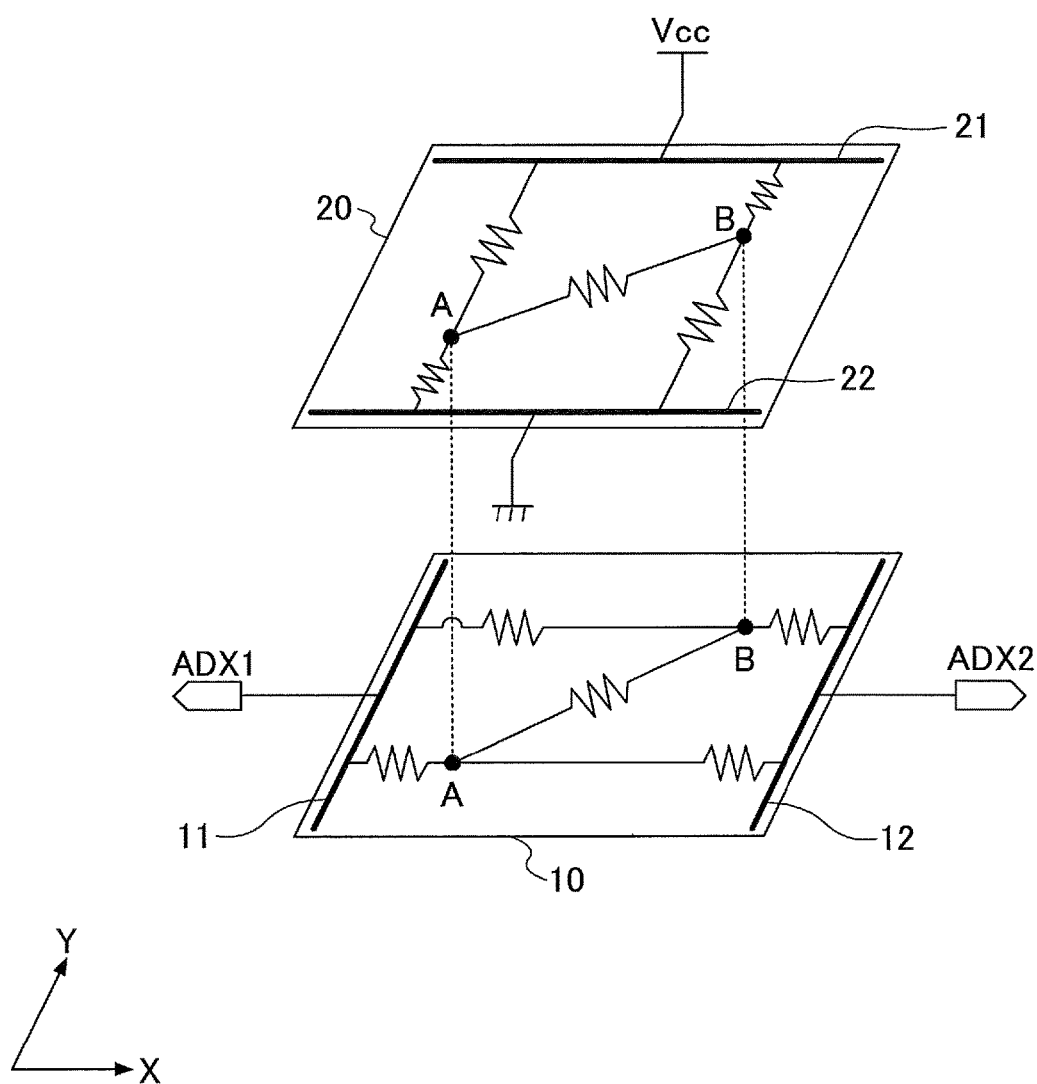
FIG. 26 is a diagram illustrating the position detecting method of the touchscreen panel according to the first embodiment of the present invention.
Figure 27:
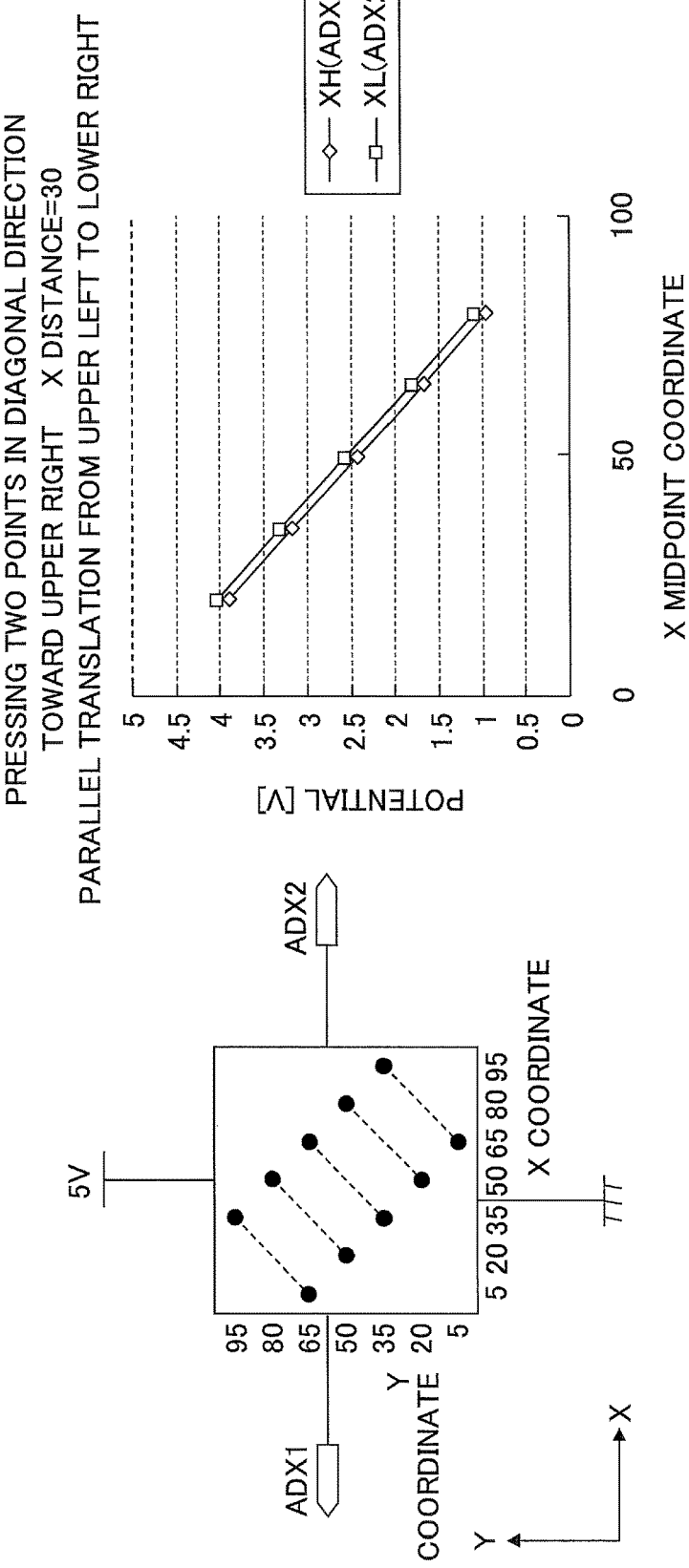
FIGS. 27A and 27B are diagrams illustrating a finite element analysis of the touchscreen panel according to the first embodiment of the present invention.

Specifically, in the case of applying a voltage of Vcc (5 V) to the YH electrode 21 and grounding the YL electrode 22 (0 V), the potential detected at the potential detecting part ADX2 is higher than the potential detected at the potential detecting part ADX1 as illustrated in FIG. 27B if, of the two contact points A and B on the touchscreen panel, the point A is closer to the XH electrode 11 and the YL electrode 22 than is the point B as illustrated in FIG. 26.

FIGS. 27A and 27B illustrate the case of changing the two contact positions on the touchscreen panel so that the two contact positions are in lower left-to-upper right straight lines at regular intervals in the case of applying voltage in the Y-axis direction, that is, applying a voltage of 5 V to the YH electrode 21 and grounding the YL electrode 22. FIG. 27A illustrates the coordinate positions of the two contact points on the touchscreen panel in this case. FIG. 27B illustrates the relationship between the X coordinate position at the midpoint between the two points and the potentials detected in the potential detecting parts ADX1 and ADX2.

It is presumed that the point A, which is close to the grounded YL electrode 22 in the second resistive film 20, is heavily affected by this so that a relatively low potential is likely to be detected at the potential detecting part ADX1 connected to the XH electrode 11, which is close to the point A, in the first resistive film 10, while the point B, which is close to the YH electrode 21 to which a voltage of 5 V is applied in the second resistive film 20, is heavily affected by this so that a relatively high potential is likely to be detected at the potential detecting part ADX2 connected to the XL electrode 12, which is close to the point B, in the first resistive film 10.

Figure 28:
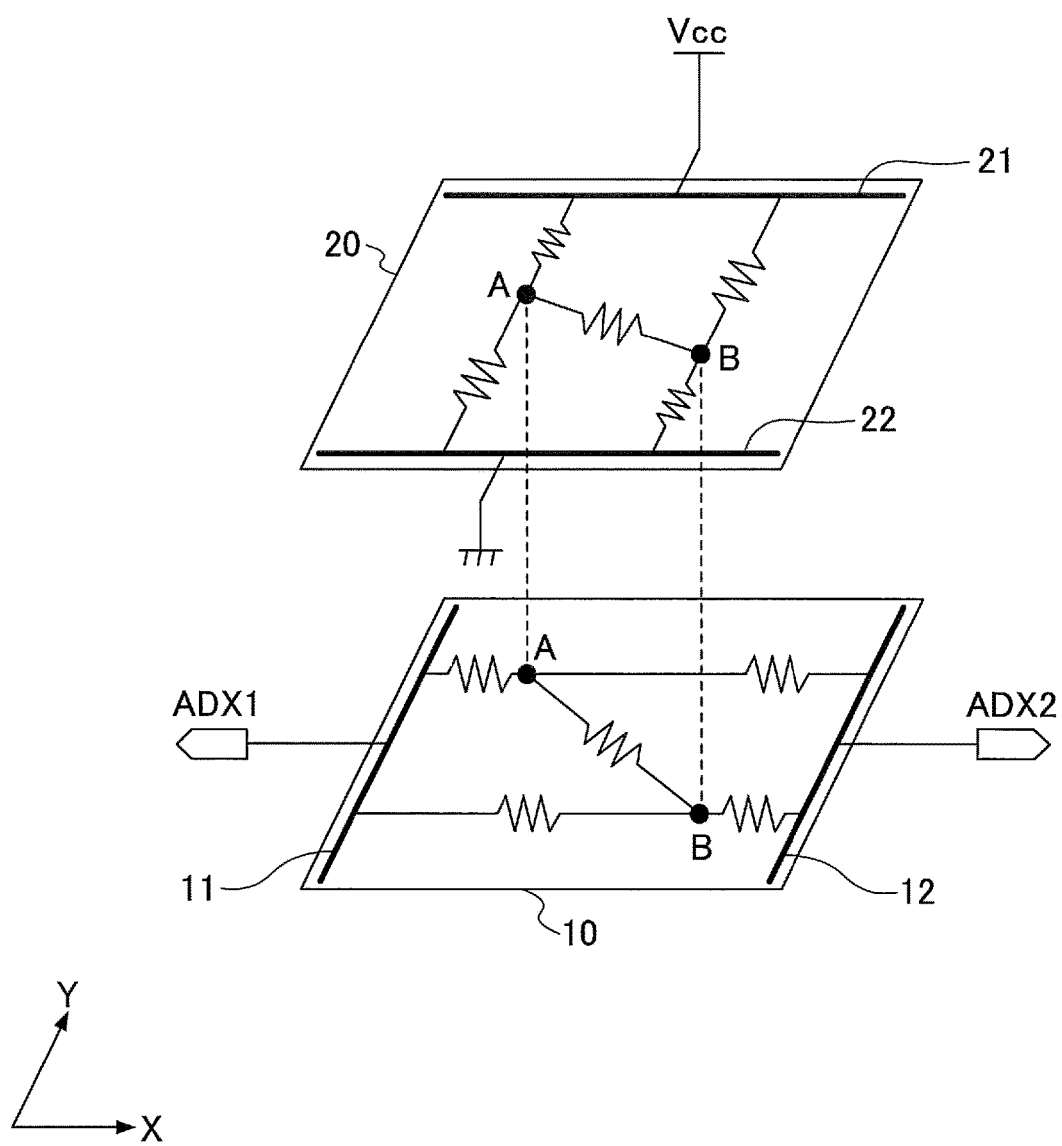
FIG. 28 is a diagram illustrating the position detecting method of the touchscreen panel according to the first embodiment of the present invention.

Further, in the case of applying a voltage of Vcc (5 V) to the YH electrode 21 and grounding the YL electrode 22 (0 V), the potential detected at the potential detecting part ADX2 is lower than the potential detected at the potential detecting part ADX1 as illustrated in FIG. 29B if, of the two contact points A and B on the touchscreen panel, the point A is closer to the XH electrode 11 and the YH electrode 21 than is the point B as illustrated in FIG. 28.

FIGS. 29A and 29B illustrate the case of changing the two contact positions on the touchscreen panel so that the two contact positions are in lower right-to-upper left straight lines at regular intervals in the case of applying voltage in the Y-axis direction, that is, applying a voltage of 5 V to the YH electrode 21 and grounding the YL electrode 22. FIG. 29A illustrates the coordinate positions of the two contact points on the touchscreen panel in this case. FIG. 29B illustrates the relationship between the X coordinate position at the midpoint between the two points and the potentials detected in the potential detecting parts ADX1 and ADX2.

It is presumed that the point A, which is close to the YH electrode 21 to which a potential of 5 V is applied in the second resistive film 20, is heavily affected by this so that a relatively high potential is likely to be detected at the potential detecting part ADX1 connected to the XH electrode 11, which is close to the point A, in the first resistive film 10, while the point B, which is close to the grounded YL electrode 22 in the second resistive film 20, is heavily affected by this so that a relatively low potential is likely to be detected at the potential detecting part ADX2 connected to the XL electrode 12, which is close to the point B, in the first resistive film 10.

Thus, in the case of applying voltage in the Y-axis direction as well, it is possible to determine whether the line connecting two contact points on the touchscreen panel is in a diagonal (or oblique) direction toward upper right or upper left in the same manner.

Next, referring back to FIG. 2, in step S116, the midpoint between the two contact points on the touchscreen panel is calculated. Specifically, the midpoints of the coordinates of the two contact points on the touchscreen panel are calculated by calculating the midpoint of the potentials measured in step S110 (the third measurement process) and the midpoint of the potentials measured in step S112 (the fourth measurement process).

A description is given of this process based on FIGS. 30A and 30B and FIGS. 31A and 31B.

Figure 30A:
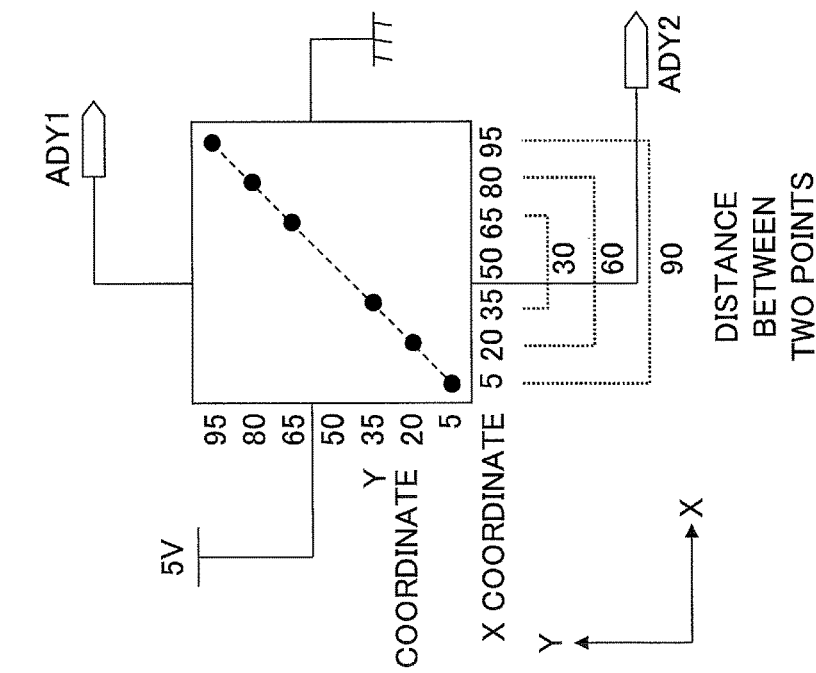
FIGS. 30A and 30B are diagrams illustrating a finite element analysis of the touchscreen panel according to the first embodiment of the present invention.
Figure 30B:
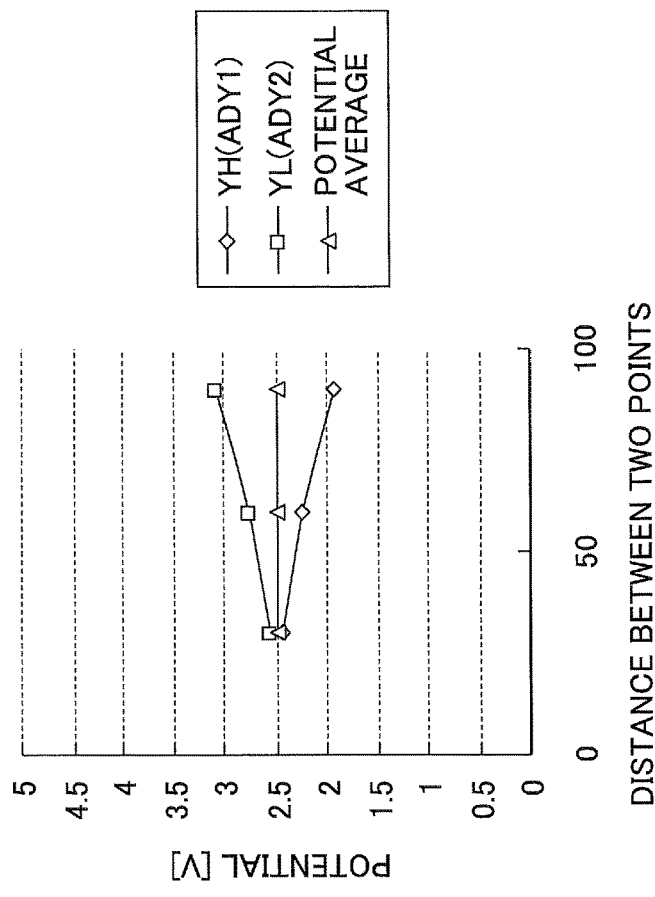

FIGS. 30A and 30B illustrate a case where the two contact points on the touchscreen panel, which are on a straight line in a diagonal (or oblique) direction toward upper right, have their interval caused to change with the midpoint between the two contact points at a position of 50 in the case of applying voltage in the X-axis direction, that is, applying a voltage of 5 V to the XH electrode 11 and grounding the XL electrode 12. FIG. 30A illustrates the coordinate positions of the two contact points on the touchscreen panel in this case. FIG. 30B illustrates the relationship between the distance between the two points in the X coordinates (or the distance between the two points in Y coordinates) and the potentials detected at the potential detecting parts ADY1 and ADY2 and their average.

Figure 31B:
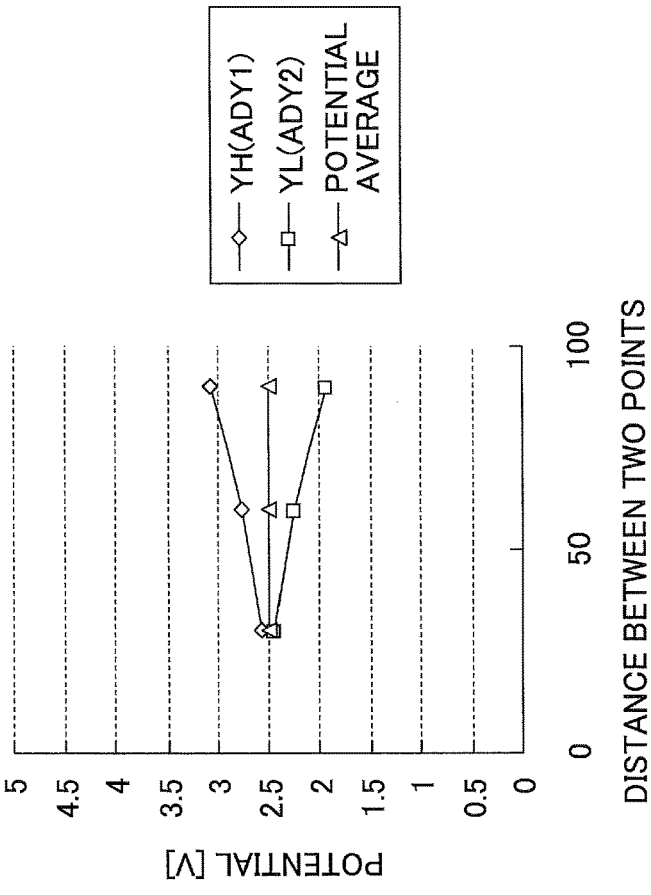
FIGS. 31A and 31B are diagrams illustrating a finite element analysis of the touchscreen panel according to the first embodiment of the present invention.
Figure 31A:
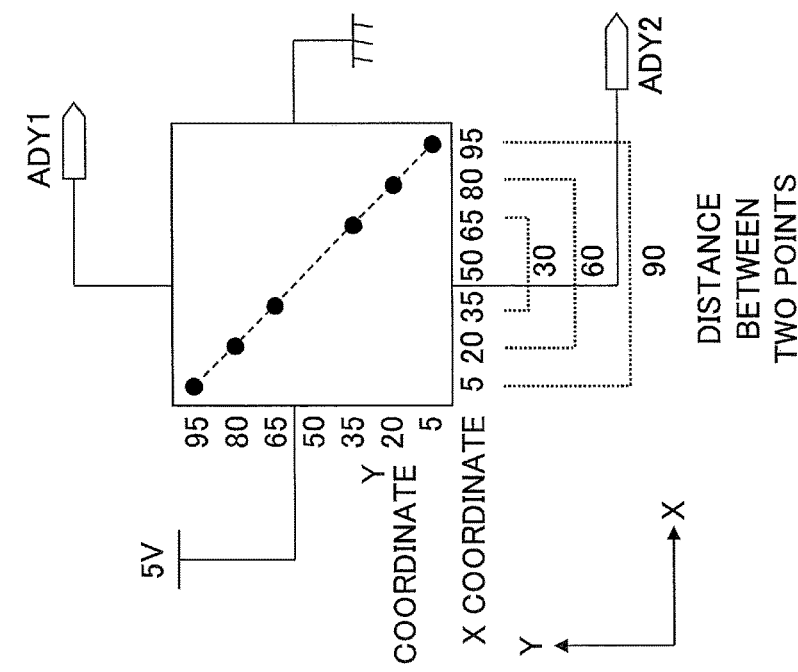

FIGS. 31A and 31B illustrate a case where the two contact points on the touchscreen panel, which are on a straight line in a diagonal (or oblique) direction toward upper left, have their interval caused to change with the midpoint between the two contact points at a position of 50 in the case of applying voltage in the X-axis direction, that is, applying a voltage of 5 V to the XH electrode 11 and grounding the XL electrode 12. FIG. 31A illustrates the coordinate positions of the two contact points on the touchscreen panel in this case. FIG. 31B illustrates the relationship between the distance between the two points in X coordinates (or the distance between the two points in Y coordinates) and the potentials detected at the potential detecting parts ADY1 and ADY2 and their average.

As illustrated in FIGS. 30A and 30B and FIGS. 31A and 31B, the difference between the potential detected at the potential detecting part ADY1 and the potential detected at the potential detecting part ADY2 tends to increase as the interval between the two points increases. However, the average of the potential detected at the potential detecting part ADY1 and the potential detected at the potential detecting part ADY2 is a constant value, which indicates the (X coordinate) value of the midpoint of the two contact points on the touchscreen panel.

Therefore, by calculating the average value of the potential detected at the potential detecting part ADY1 and the potential detected at the potential detecting part ADY2, it is possible to determine a potential corresponding to the X coordinate of the midpoint between the two contact points on the touchscreen panel and to determine the X coordinate of the midpoint based on this potential.

FIGS. 30A and 30B and FIGS. 31A and 31B illustrate the case of calculating the X coordinate of the midpoint between the two contact points on the touchscreen panel. Likewise, in the case of applying voltage in the Y-axis direction, that is, applying a voltage of 5 V to the YH electrode 21 and grounding the YL electrode 22, by detecting potentials at the potential detecting parts ADX1 and ADX2, it is possible to determine the Y coordinate of the midpoint between the two contact points on the touchscreen panel based on the detected potentials.

Thereby, it is possible to determine the coordinates of the midpoint between the two contact points on the touchscreen panel.

Next, in step S118, the distance between the two contact points on the touchscreen panel are calculated (in the X-axis direction and the Y-axis direction). Specifically, the distance between the two contact points on the touchscreen panel is calculated based on the potentials measured in step S102 and step S104 (the potentials measured in the first measurement process and the second measurement process).

Figure 32:
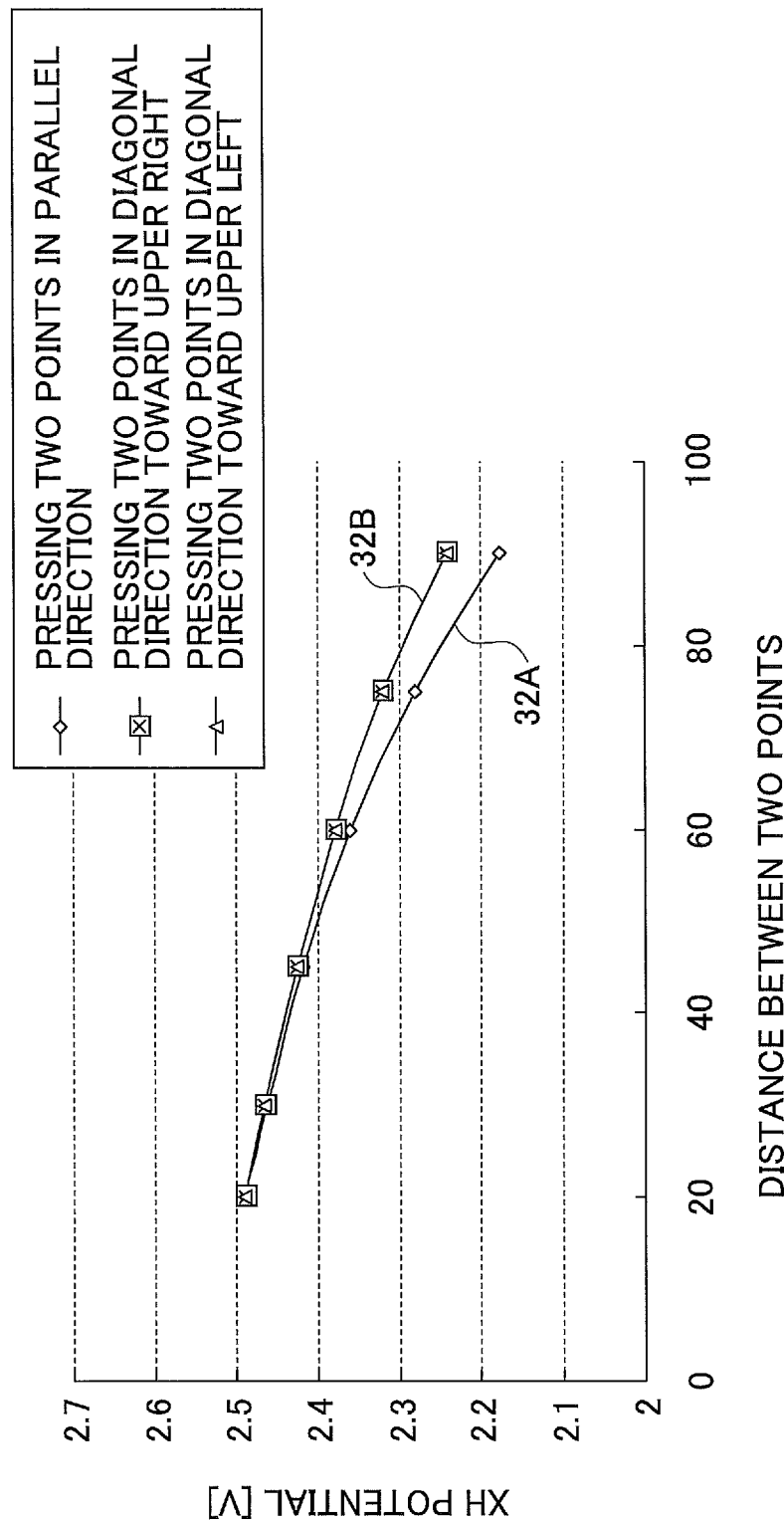
FIG. 32 is a correlation diagram of the distance between two points in an axial direction and a potential in an XH electrode according to the first embodiment of the present invention.

A description is given of this based on FIG. 32. FIG. 32 illustrates the relationship between the distance between two points in X coordinates in the state of step S102, that is, the state illustrated in FIG. 5, and the potential detected at the potential detecting part ADX1 connected to the XH electrode 11. As graphically illustrated, as the distance between two points increases, the value of the potential detected at the potential detecting part ADX1 decreases. Further, the relationship between the distance between two points and the potential detected at the potential detecting part ADX1 differs between the case where the two points are present in a direction parallel to the direction in which voltage is applied, that is, a direction parallel to the X-axis direction, and the case where the two points are not present in a direction parallel to the X-axis direction, that is, the case where the two points are present in a direction toward upper right or in a direction toward upper left.

Therefore, a relationship between the distance between two points and the potential detected at the potential detecting part ADX1 in step S102 as illustrated in FIG. 32 is selected in accordance with the positional relationship between the two contact points on the touchscreen panel detected in step S114, that is, whether the two points are present in a direction parallel to the X-axis direction, and the distance between the two contact points in the X-axis direction may be determined based on the selected relationship.

Specifically, if the two contact points on the touchscreen panel are on a straight line in a direction parallel to the X-axis direction, the distance between the two contact points in the X-axis direction may be calculated based on the potential detected at the potential detecting part ADX1 in step S102 using a curve 32A in FIG. 32. Further, if the two contact points on the touchscreen panel are not on a straight line in a direction parallel to the X-axis direction, that is, if the two contact points on the touchscreen panel are on a straight line extending in a direction toward upper right or upper left, the distance between the two contact points in the X-axis direction, etc., may be calculated based on the potential detected at the potential detecting part ADX1 in step S102 using a curve 32B in FIG. 32.

Figure 33:
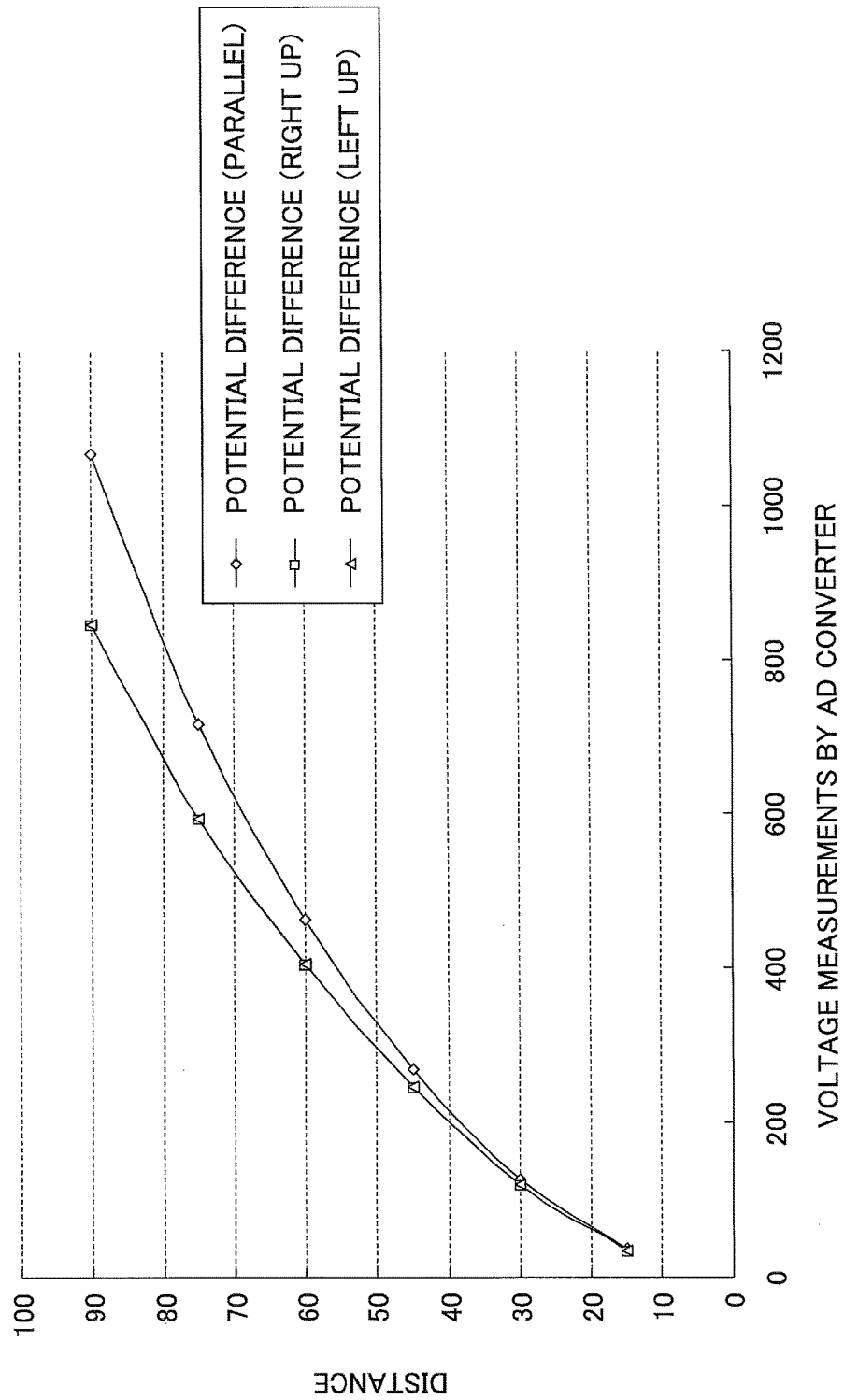
FIG. 33 is a correlation diagram of the distance between two points in an axial direction and (reference potential−measured potential) according to the first embodiment of the present invention.

FIG. 33 illustrates the relationship between the difference between 2.5 V and the potential detected in the potential detecting part ADX1 or the like and the distance between two points in the X-axis direction. Likewise, based on this correlation, the distance in the X-axis direction may be determined from the difference between 2.5 V and the potential detected in the potential detecting part ADX1 or the like.

It is also possible to determine the distance in the Y-axis direction based on the potential detected in the potential detecting part ADY1 in step S104 in the same manner as described above.

The relationship between a voltage difference V from 2.5 V and each of distances $L_1$ through $L_4$ in respective axial directions (which may be expressed as an X-axis distance Lx or a Y-axis distance Ly) is illustrated as follows (Eqs. (1)):

$L_1 = \alpha_1 V^2 + \beta_1 V + \gamma_1$, parallel direction approximation equation:

$L_2 = \alpha_2 V^2 + \beta_2 V + \gamma_2$, diagonal X direction approximation equation:

$L_3 = \alpha_3 V^2 + \beta_3 V + \gamma_3$, perpendicular direction approximation equation:

$L_4 = \alpha_4 V^2 + \beta_4 V + \gamma_4$, diagonal Y direction approximation equation:

where $\alpha_1$ through $\alpha_4$, $\beta_1$ through $\beta_4$, and $\gamma_1$ through $\gamma_4$ may be calculated in advance based on FIG. 32 or FIG. 33 or determined by an experiment or the like. These values may also be contained in the control part 30, for example, in the memory 32 (FIG. 1). Distances L in the respective axial directions may be calculated using these equations.

The distances L may also be calculated using the following cubic equations (Eqs. (2)):

$L_1 = \delta_5 V^3 + \alpha_5 V^2 + \beta_5 V + \gamma_5$, parallel direction approximation equation:

$L_2 = \delta_6 V^3 + \alpha_6 V^2 + \beta_6 V + \gamma_6$ diagonal X direction approximation equation:

$L_3 = \delta_7 V^3 + \alpha_7 V^2 + \beta_7 V + \gamma_7$ perpendicular direction approximation equation:

$L_4 = \delta_8 V^3 + \alpha_8 V^2 + \beta_8 V + \gamma_8$ diagonal Y direction approximation equation:

where $\alpha_5$ through $\alpha_8$, $\beta_5$ through $\beta_8$, $\gamma_5$ through $\gamma_8$, and $\delta_5$ through $\delta_8$ may be calculated in advance based on FIG. 32 or FIG. 33 or determined by an experiment or the like. These values may also be contained in the control part 30, for example, in the memory 32 (FIG. 1).

Next, in step S120, the position coordinates of the two contact points on the touchscreen panel are calculated.

Specifically, the position coordinates of the two contact points on the touchscreen panel are calculated based on the positional relationship between the two contact points on the touchscreen panel, the position of the midpoint between the two contact points, and the distances between the two contact points in the X-axis direction and the Y-axis direction.

For example, in the case where the distance in the X-axis direction and the distance in the Y-axis direction between the two contact points on the touchscreen panel are calculated as Lx and Ly, respectively, and the position of the midpoint between the two contact points is calculated as (Xc, Yc), the coordinates of the two contact points are expressed (determined) as:

(Xc+Lx/2, Yc+Ly/2), (Xc−Lx/2, Yc−Ly/2) if the two contact points are present on a slope toward upper right, (Xc+Lx/2, Yc−Ly/2), (Xc−Lx/2, Yc+Ly/2) if the two contact points are present on a slope toward upper left, (Xc+Lx/2, Yc), (Xc−Lx/2, Yc) if the two contact points are parallel to the X-axis direction, or (Xc, Yc+Ly/2), (Xc, Yc−Ly/2) if the two contact points are parallel to the Y-axis direction.

Thereby, the method of detecting a position on the touchscreen panel according to this embodiment ends. According to the method of detecting a position on the touchscreen panel of this embodiment, in the case where the touchscreen panel is contacted at two points as well, it is possible to calculate (determine) the coordinate positions of the two contact points with ease and accuracy.

Second Embodiment

Next, a description is given of a second embodiment. This embodiment, which is directed to a method of detecting a position on the touchscreen panel, has a process that is partially different from that of the first embodiment.

Figure 34:
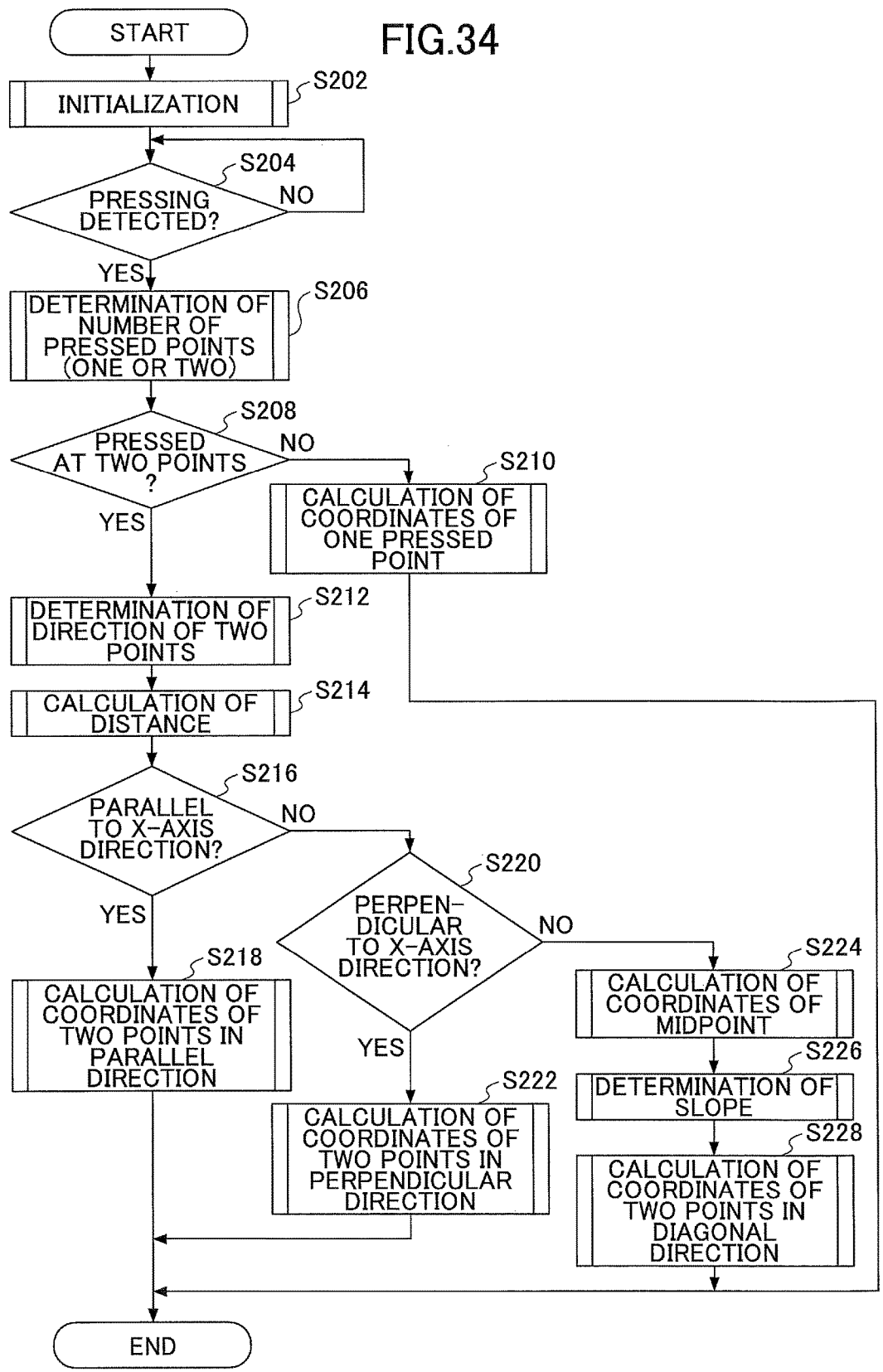
FIG. 34 is a flowchart of a position detecting method according to a second embodiment of the present invention.

A description is given, with reference to FIG. 34, of a method of detecting a position on the touchscreen panel according to this embodiment.

First, in step S202, initialization is performed. A description is given below of the details of this initialization.

Next, in step S204, it is determined whether the touchscreen panel is touched (contacted) with a finger or the like. If a finger contact or the like is detected on the touchscreen panel (YES in step S204), the process proceeds to step S206. If no finger contact or the like is detected on the touchscreen panel (NO in step S204), step S204 is repeated until there is a finger contact or the like on the touchscreen panel. Specifically, if a potential is detected via the second resistive film 20 with voltage being applied to the first resistive film 10 or if a potential is detected via the first resistive film 10 with voltage being applied to the second resistive film 20, it is determined that there is a finger contact or the like on the touchscreen panel, and the process proceeds to step S206.

Next, in step S206, a process for identifying the number of contact points (one or two) is performed. This process is described in detail below.

Next, in step S208, it is determined whether the touchscreen panel is pressed (contacted) at two points. Specifically, it is determined whether the touchscreen panel is pressed at one point or two points based on the information as to whether the number of contact points is one or two obtained in step S206. In the case of pressing at one point (NO in step S208), the process proceeds to step S210. In the case of pressing at two points (YES in step S208), the process proceeds to step S212.

Next, in step S210, the position coordinates are calculated. Specifically, since it is determined in step S208 that the touchscreen panel is pressed (contacted) at one point, the coordinate position of the single pressed point is calculated according to the conventional method of detecting a position on the four-wire touchscreen panel. Thereafter, this position detecting method ends.

On the other hand, in step S212, the direction (slope) of the line connecting the two pressed (contact) points on the touchscreen panel is determined. A detailed description of this process is given below.

Next, in step S214, the distance between the two pressed points on the touchscreen panel is calculated.

Next, in step S216, it is determined whether the line connecting the two pressed points is parallel to the X-axis direction. Specifically, it is determined whether the line connecting the two pressed points is parallel to the X-axis direction based on the information obtained in step S212. If it is determined that the line connecting the two pressed points is (in a direction) parallel to the X-axis direction (YES in step S216), the process proceeds to step S216. If it is determined that the line connecting the two pressed points is not parallel to the X-axis direction (NO in step S216), the process proceeds to step S220.

In step S218, the coordinate positions of the two pressed points in the parallel direction are calculated, and thereafter, this position detecting method ends. A description is given in detail below of this process.

In step S220, it is determined whether the line connecting the two pressed points is perpendicular to the X-axis direction. Specifically, it is determined whether the line connecting the two pressed points is perpendicular to the X-axis direction based on the information obtained in step S212. If it is determined that the line connecting the two pressed points is (in a direction) perpendicular to the X-axis direction (YES in step S220), the process proceeds to step S222. If it is determined that the line connecting the two pressed points is not perpendicular to the X-axis direction (NO in step S220), the process proceeds to step S224.

In step S222, the coordinate positions of the two pressed points in the perpendicular direction are calculated, and thereafter, this position detecting method ends. A description is given in detail below of this process.

In step S224, the coordinates of the midpoint between the two pressed points on the touchscreen panel are detected. A description is given in detail below of this process.

Next, in step S226, the slope direction of the line connecting the two pressed points on the touchscreen panel is detected. A description is given in detail below of this process.

Next, in step S228, the position coordinates of the two pressed points on the touchscreen panel are calculated. A description is given in detail below of this process.

Thereby, the method of detecting a position on the touchscreen panel according to this embodiment ends.

Figure 35:
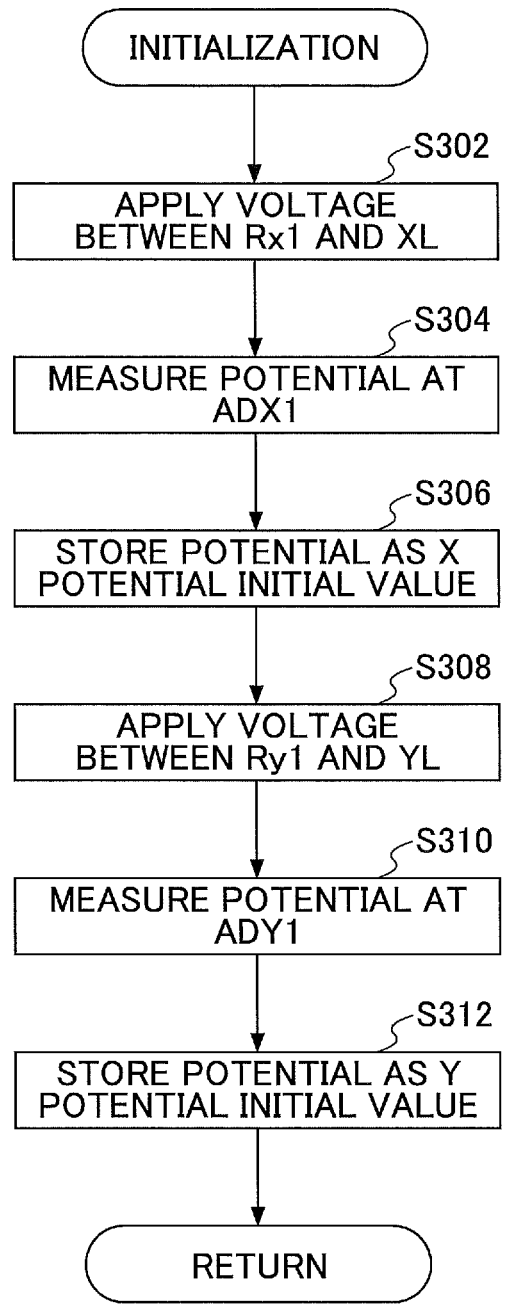
FIG. 35 is a flowchart of a subroutine of the position detecting method according to the second embodiment of the present invention.

Next, a description is given, with reference to FIG. 35, of the initialization subroutine of step S202 (FIG. 34).

First, in step S302, supply voltage is applied with the resistor Rx1, the XH electrode 11, the first resistive film 10, and the XL electrode 12 being connected in series. That is, as illustrated in FIG. 3, a supply voltage Vcc is applied to the XH electrode 11 via the resistor Rx1, and the XL electrode is grounded. In this state, the touchscreen panel is contacted at no or one point.

Next, in step S304, a potential is detected with the potential detecting part ADX1 connected to the XH electrode 11.

Next, in step S306, the potential detected with the potential detecting part ADX1 is stored in the memory 32 or the like in the control part 30 (FIG. 1) as an X-axial initial potential.

Next, in step S308, supply voltage is applied with the resistor Ry1, the YH electrode 21, the second resistive film 20, and the YL electrode 22 being connected in series. That is, as illustrated in FIG. 4, the supply voltage Vcc is applied to the YH electrode 21 via the resistor Ry1, and the YL electrode is grounded. In this state, the touchscreen panel is contacted at no or one point.

Next, in step S310, a potential is detected with the potential detecting part ADY1 connected to the YH electrode 21.

Next, in step S312, the potential detected with the potential detecting part ADY1 is stored in the memory 32 or the like in the control part 30 (FIG. 1) as a Y-axial initial potential.

The process of steps S302 through S306 and the process of steps S308 through S312 may be reversed in order.

Thereby, this subroutine ends.

Figure 36:
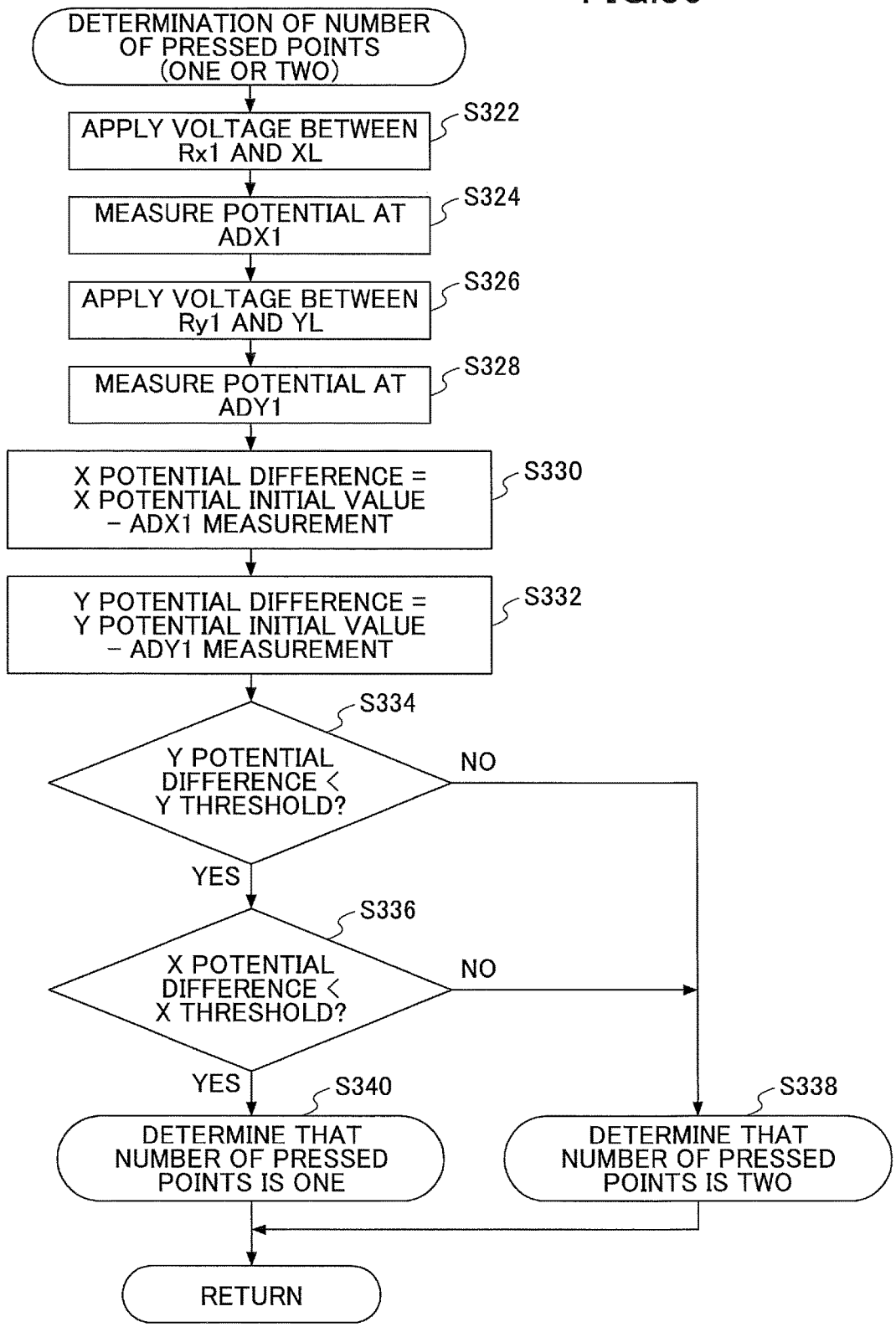
FIG. 36 is a flowchart of a subroutine of the position detecting method according to the second embodiment of the present invention.

Next, a description is given, with reference to FIG. 36, of the subroutine of step S206 (FIG. 34) for identifying the number of pressed (contact) points.

First, in step S322, supply voltage is applied with the resistor Rx1, the XH electrode 11, the first resistive film 10, and the XL electrode 12 being connected in series. That is, as illustrated in FIG. 3 or FIG. 5, a supply voltage Vcc is applied to a first end of the resistor Rx1, which is opposite to a second end of the resistor Rx1 connected to the XH electrode 11, and the XL electrode 12 is grounded. In this state, the touchscreen panel is contacted at one or two points.

Next, in step S324, a potential is detected with the potential detecting part ADX1 connected to the XH electrode 11.

Next, in step S326, supply voltage is applied with the resistor Ry1, the YH electrode 21, the second resistive film 20, and the YL electrode 22 being connected in series. That is, as illustrated in FIG. 4 or FIG. 6, the supply voltage Vcc is applied to a first end of the resistor Ry1, which is opposite to a second end of the resistor Ry1 connected to the YH electrode 21, and the YL electrode 22 is grounded. In this state, the touchscreen panel is contacted at one or two points.

Next, in step S328, a potential is detected with the potential detecting part ADY1 connected to the YH electrode 21.

Next, in step S330, an X potential difference, which is the difference between the X-axial initial potential determined in the initialization and the potential detected in step S324, is calculated.

Next, in step S332, a Y potential difference, which is the difference between the Y-axial initial potential determined in the initialization and the potential detected in step S328, is calculated.

Next, in step S334, the Y potential difference calculated in step S332 is less than a predetermined Y threshold. If the Y potential difference is less than a predetermined Y threshold (YES in step S334), the process proceeds to step S336, If the Y potential difference is not less than a predetermined Y threshold (NO in step S334), the process proceeds to step S338. The Y threshold, which is a preset value for determining whether the number of contact points on the touchscreen panel is one or two, takes an error into consideration.

Next, in step S336, the X potential difference calculated in step S330 is less than a predetermined X threshold. If the X potential difference is less than a predetermined X threshold (YES in step S336), the process proceeds to step S340. If the X potential difference is not less than a predetermined X threshold (NO in step S336), the process proceeds to step S338. The X threshold, which is a preset value for determining whether the number of contact points on the touchscreen panel is one or two, takes an error into consideration.

In step S338, it is determined that the touchscreen panel is contacted with fingers or the like at two points, and this information is stored in the memory 32 in the control part 30 or the like.

In step S340, it is determined that the touchscreen panel is contacted with a finger or the like at one point, and this information is stored in the memory 32 in the control part 30 or the like.

Thereby, this subroutine ends.

Figure 37:
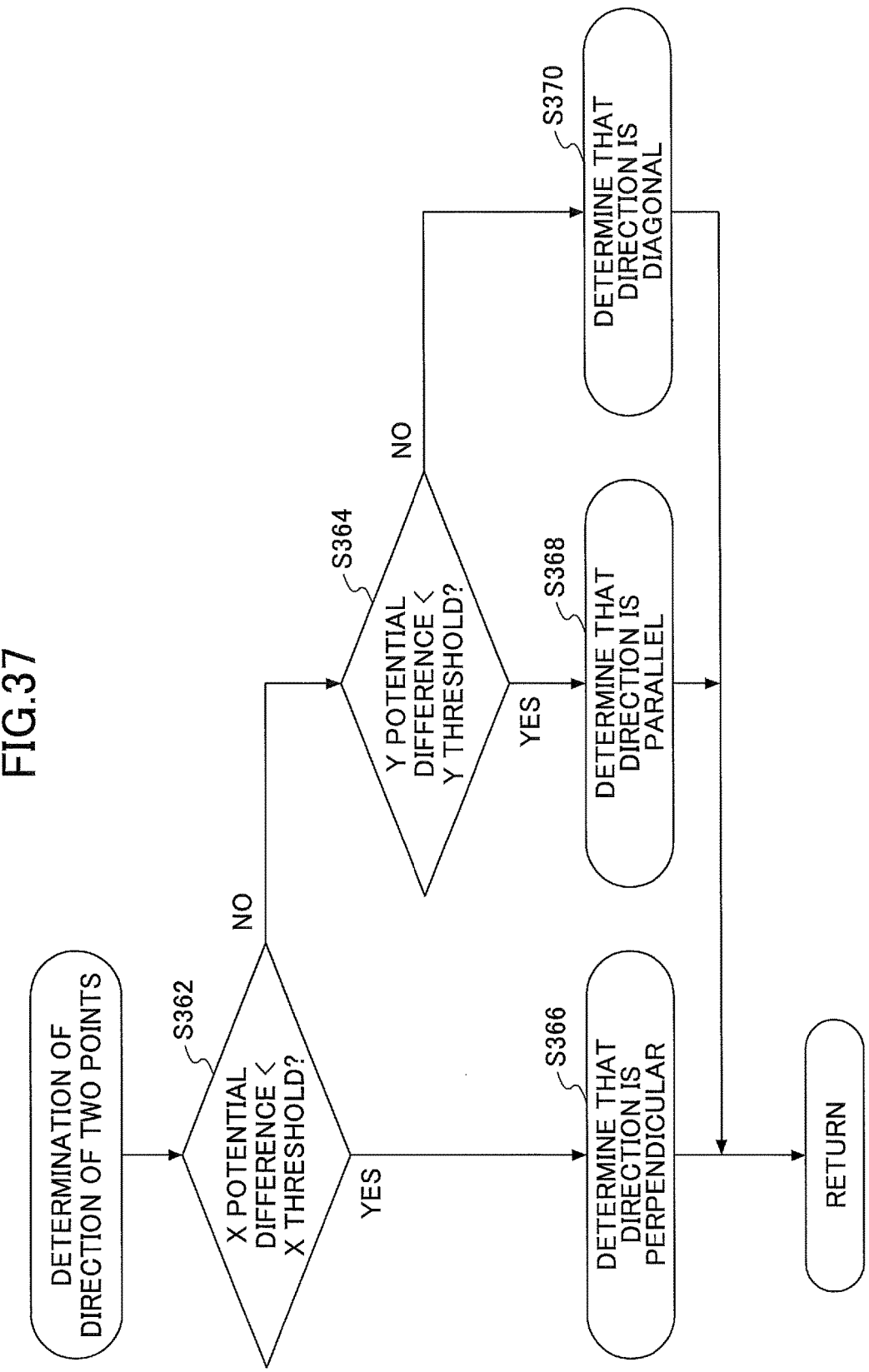
FIG. 37 is a flowchart of a subroutine of the position detecting method according to the second embodiment of the present invention.

Next, a description is given, with reference to FIG. 37, of the subroutine of step S212 (FIG. 34) for determining the direction (slope) of the line connecting two pressed (contact) points on the touchscreen panel.

First, in step S362, it is determined whether the X potential difference calculated in step S330 (FIG. 36) is less than the predetermined X threshold. If the X potential difference is less than the predetermined X threshold (YES in step S362), the process proceeds to step S366. If the X potential difference is not less than the predetermined X threshold (NO in step S362), the process proceeds to step S364.

In step S364, it is determined whether the Y potential difference calculated in step S332 (FIG. 36) is less than the predetermined Y threshold. If the Y potential difference is less than the predetermined Y threshold (YES in step S364), the process proceeds to step S368. If the Y potential difference is not less than the predetermined Y threshold (NO in step S364), the process proceeds to step S370.

In step S366, it is determined that the two points at which the touchscreen panel is contacted with fingers or the like are on a straight line parallel to the Y-axis direction perpendicular to the X-axis direction, so that it is determined that the two points are in a direction perpendicular to the X-axis direction. This information is stored in the memory 32 in the control part 30 (FIG. 1) or the like.

In step S368, it is determined that the two points at which the touchscreen panel is contacted with fingers or the like are on a straight line parallel to the X-axis direction (perpendicular to the Y-axis direction), so that it is determined that the two points are in a direction parallel to the X-axis direction. This information is stored in the memory 32 in the control part 30 (FIG. 1) or the like.

In step S370, it is determined that the two points at which the touchscreen panel is contacted with fingers or the like are on a straight line in a diagonal (oblique) direction, which is neither parallel nor perpendicular to the X-axis direction, so that it is determined that the two points are in a diagonal direction (a direction at an angle to the X-axis direction). This information is stored in the memory 32 in the control part 30 (FIG. 1) or the like.

Thereby, this subroutine ends.

Figure 38:
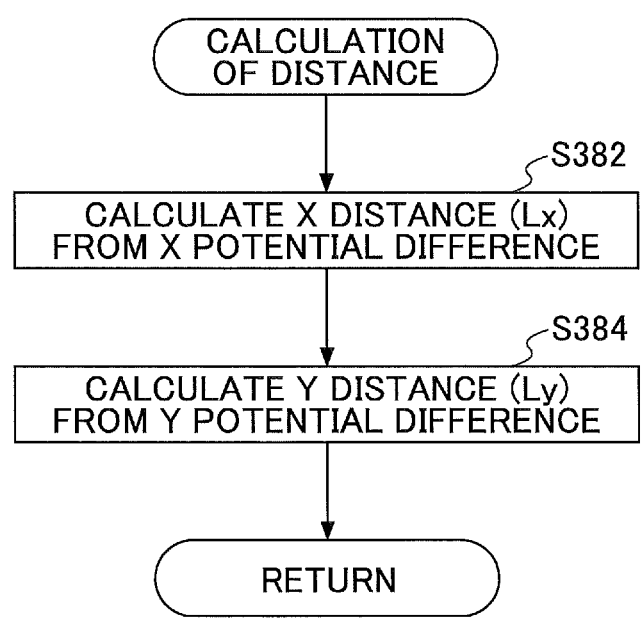
FIG. 38 is a flowchart of a subroutine of the position detecting method according to the second embodiment of the present invention.

Next, a description is given, with reference to FIG. 38, of the subroutine of step S214 (FIG. 34) for calculating the distance between the two contact points.

First, in step S382, the distance between the two contact points in X coordinates, that is, the difference between the X coordinates of the two contact points, on the touchscreen panel is calculated. Specifically, based on the relationship illustrated in FIG. 32 or 33 or Eqs. (1) or (2), the distance Lx in X coordinates corresponding to the X potential difference calculated in step S330 (FIG. 36) is calculated.

Next, in step S384, the distance between the two contact points in Y coordinates, that is, the difference between the Y coordinates of the two contact points, on the touchscreen panel is calculated. Specifically, based on the relationship illustrated in FIG. 32 or 33 or Eqs. (1) or (2), the distance Ly in Y coordinates corresponding to the Y potential difference calculated in step S332 (FIG. 36) is calculated.

Thereby, this subroutine ends.

Figure 39:
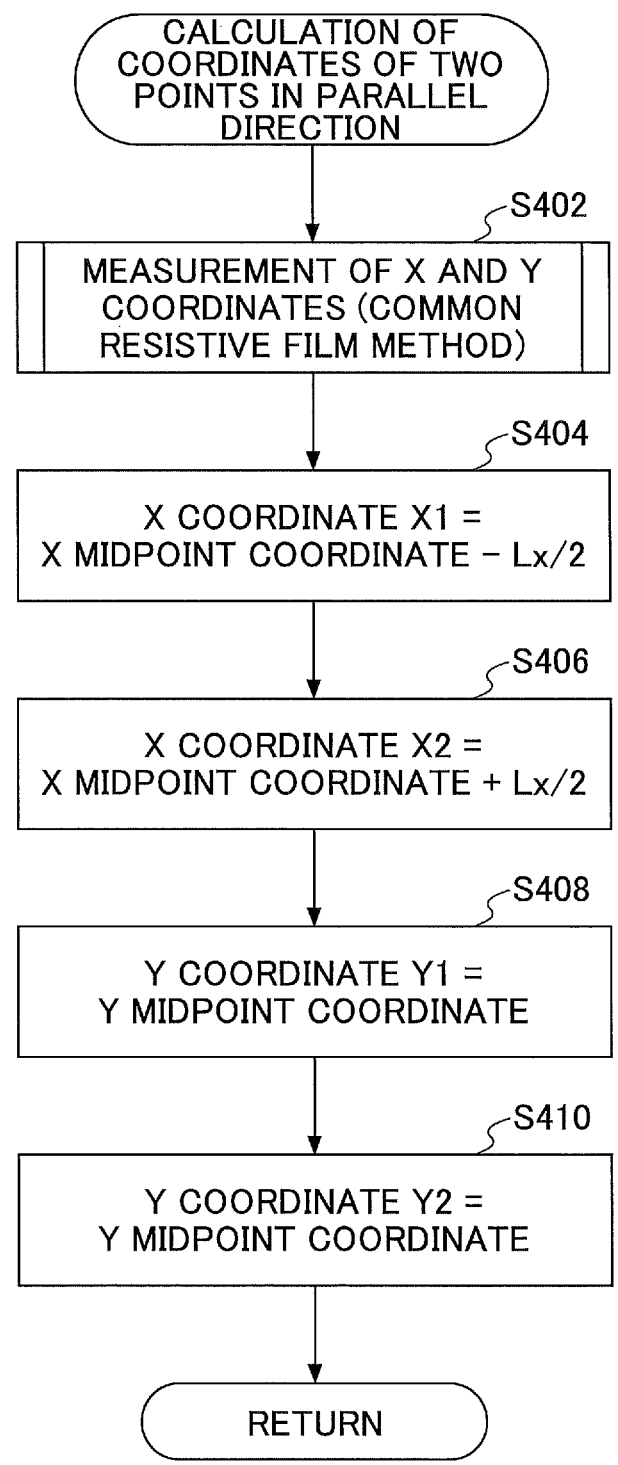
FIG. 39 is a flowchart of a subroutine of the position detecting method according to the second embodiment of the present invention.

Next, a description is given, with reference to FIG. 39, of the subroutine of step S218 (FIG. 34) for calculating the position coordinates of the two contact points in a parallel direction.

First, in step S402, coordinates are detected by the common four-wire position detecting method. Thereby, an X coordinate Xa and a Y coordinate Ya are obtained (determined). Here, the two pressed (contact) points are in a parallel direction, that is, in a direction parallel to the X-axis direction. Therefore, the positions of the Y coordinates of the two pressed points have the same value. Accordingly, the Y coordinate Ya serves as the Y coordinates Y1 and Y2 of the two pressed points. Further, the X coordinate Xa is the X coordinate of the midpoint between the two pressed points.

Next, in step S404, the X coordinate of one of the two pressed points on the touchscreen panel is calculated. Specifically, the X coordinate X1 of one of the two pressed points is calculated by X1=Xa−Lx/2 based on the distance Lx in X coordinates determined in step S382 (FIG. 38).

Next, in step S406, the X coordinate of the other one of the two pressed points on the touchscreen panel is calculated. Specifically, the X coordinate X2 of the other one of the two pressed points is calculated by X2=Xa+Lx/2 based on the distance Lx in X coordinates determined in step S382 (FIG. 38).

Next, in step S408, the Y coordinate Y1 of the one of the two pressed points on the touchscreen panel is determined as the coordinate Ya detected in step S402.

Next, in step S410, the Y coordinate Y2 of the other one of the two pressed points on the touchscreen panel is determined as the coordinate Ya detected in step S402.

Thereby, this subroutine ends.

Figure 40:
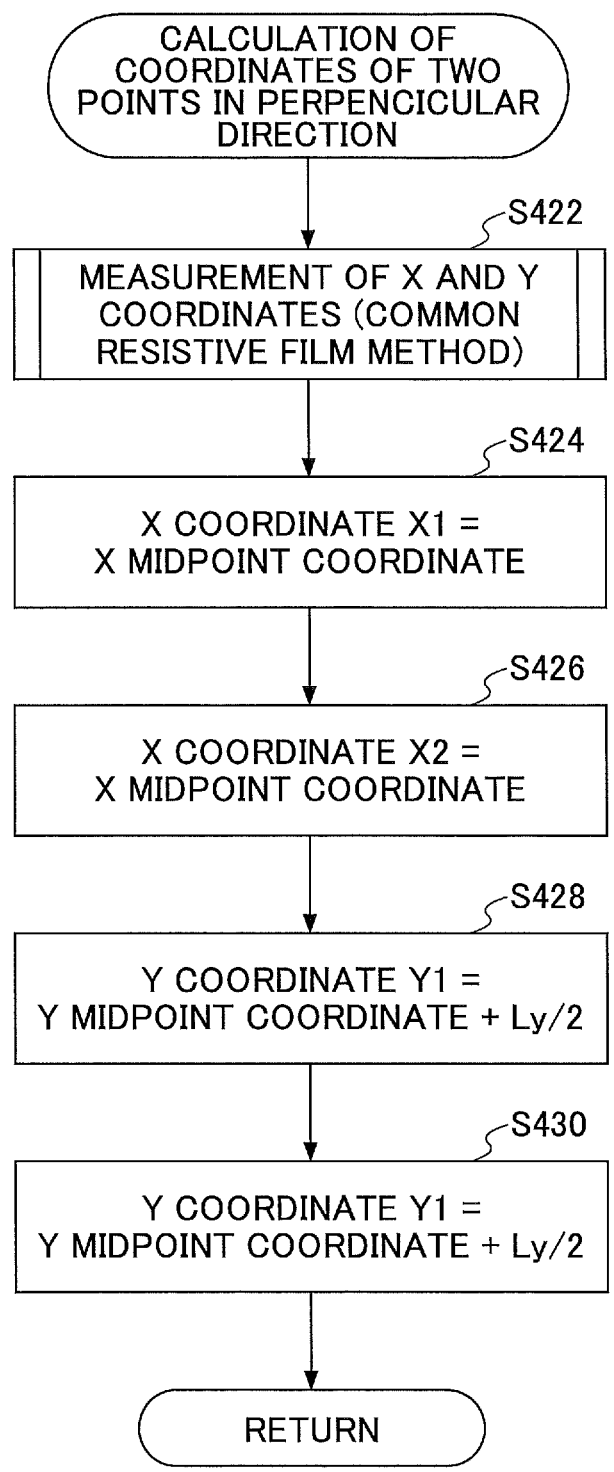
FIG. 40 is a flowchart of a subroutine of the position detecting method according to the second embodiment of the present invention.

Next, a description is given, with reference to FIG. 40, of the subroutine of step S222 (FIG. 34) for calculating the position coordinates of the two contact points in a perpendicular direction.

First, in step S422, coordinates are detected by the common four-wire position detecting method. Thereby, an X coordinate Xa and a Y coordinate Ya are obtained (determined). Here, the two pressed (contact) points are in a perpendicular direction, that is, in a direction perpendicular to the X-axis direction. Therefore, the X coordinates of the two pressed points have the same value. Accordingly, the X coordinate Xa serves as the X coordinates X1 and X2 of the two pressed points. Further, the Y coordinate Ya is the Y coordinate of the midpoint between the two pressed points.

Next, in step S424, the X coordinate X1 of one of the two pressed points on the touchscreen panel is determined as the coordinate Xa detected in step S422.

Next, in step S426, the X coordinate X2 of the other one of the two pressed points on the touchscreen panel is determined as the coordinate Xa detected in step S422.

Next, in step S428, the Y coordinate of the one of the two pressed points on the touchscreen panel is calculated. Specifically, the Y coordinate Y1 of the one of the two pressed points is calculated by Y1=Ya+Ly/2 based on the distance Ly in Y coordinates determined in step S384 (FIG. 38).

Next, in step S430, the Y coordinate of the other one of the two pressed points on the touchscreen panel is calculated. Specifically, the Y coordinate Y2 of the other one of the two pressed points is calculated by Y2=Ya−Ly/2 based on the distance Ly in Y coordinates determined in step S384 (FIG. 38).

Thereby, this subroutine ends.

Figure 41:
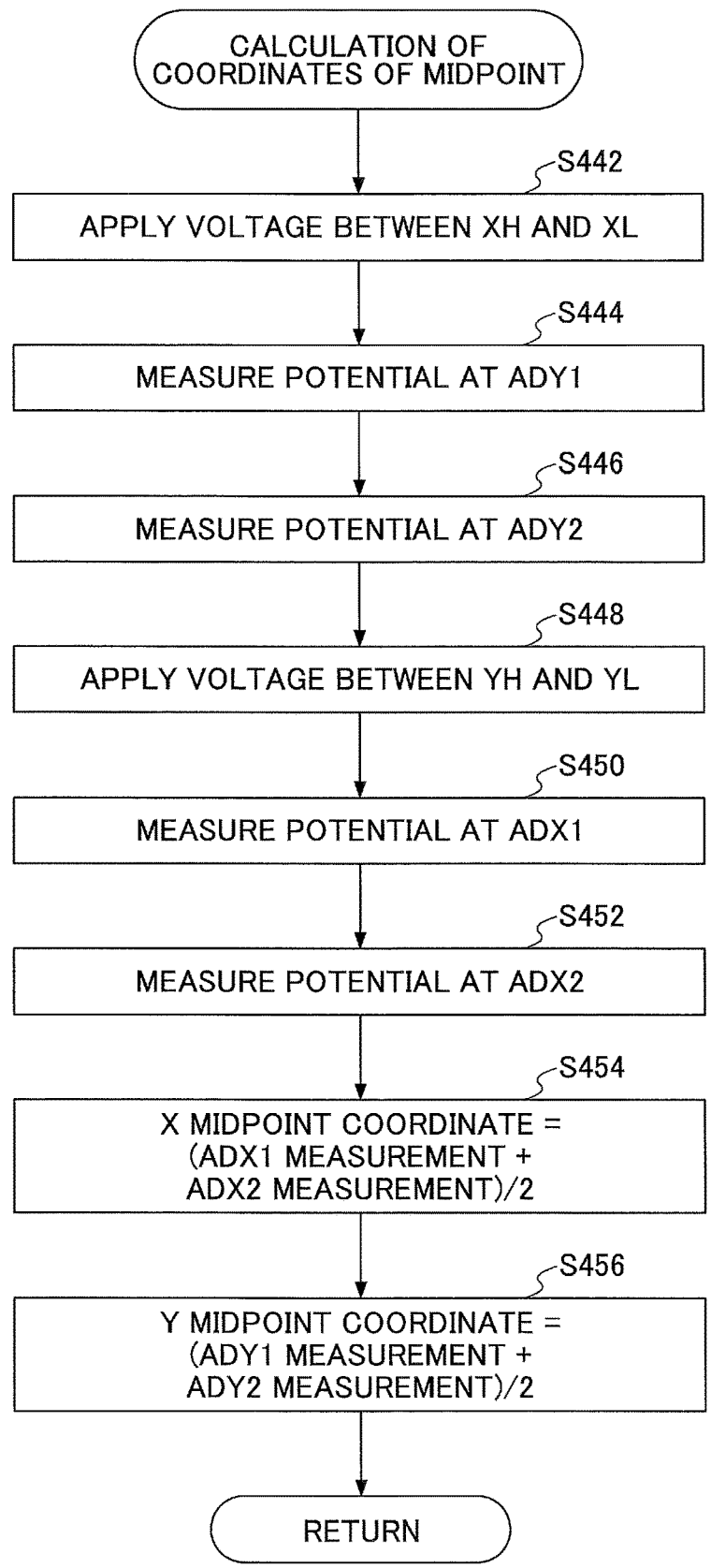
FIG. 41 is a flowchart of a subroutine of the position detecting method according to the second embodiment of the present invention.

Next, a description is given, with reference to FIG. 41, of the subroutine of step S224 (FIG. 34) for calculating midpoint coordinates in the case where the number of contact points is two.

First, in step S442, supply voltage is applied to the first resistive film 10 between the XH electrode 11 and the XL electrode 12. That is, as illustrated in FIG. 16 or FIG. 18, a supply voltage Vcc is applied to the XH electrode 11 and the XL electrode 12 is grounded.

Next, in step S444, a potential is detected at the potential detecting part ADY1 connected to the YH electrode 21 of the second resistive film 20.

Next, in step S446, a potential is detected at the potential detecting part ADY2 connected to the YL electrode 22 of the second resistive film 20.

Next, in step S448, supply voltage is applied to the second resistive film 20 between the YH electrode 21 and the YL electrode 22. That is, as illustrated in FIG. 26 or FIG. 28, the supply voltage Vcc is applied to the YH electrode 21 and the YL electrode 22 is grounded.

Next, in step S450, a potential is detected at the potential detecting part ADX1 connected to the XH electrode 11 of the first resistive film 10.

Next, in step S452, a potential is detected at the potential detecting part ADX2 connected to the XL electrode 12 of the first resistive film 10.

Next, in step S454, the average of the potential detected at the potential detecting part ADX1 in step S450 and the potential detected at the potential detecting part ADX2 in step S452 is calculated, and the X coordinate Xc of the midpoint is calculated based on the value of this average.

Next, in step S456, the average of the potential detected at the potential detecting part ADY1 in step S444 and the potential detected at the potential detecting part ADY2 in step S446 is calculated, and the Y coordinate Yc of the midpoint is calculated based on the value of this average.

Thereby, this subroutine ends.

Figure 42:
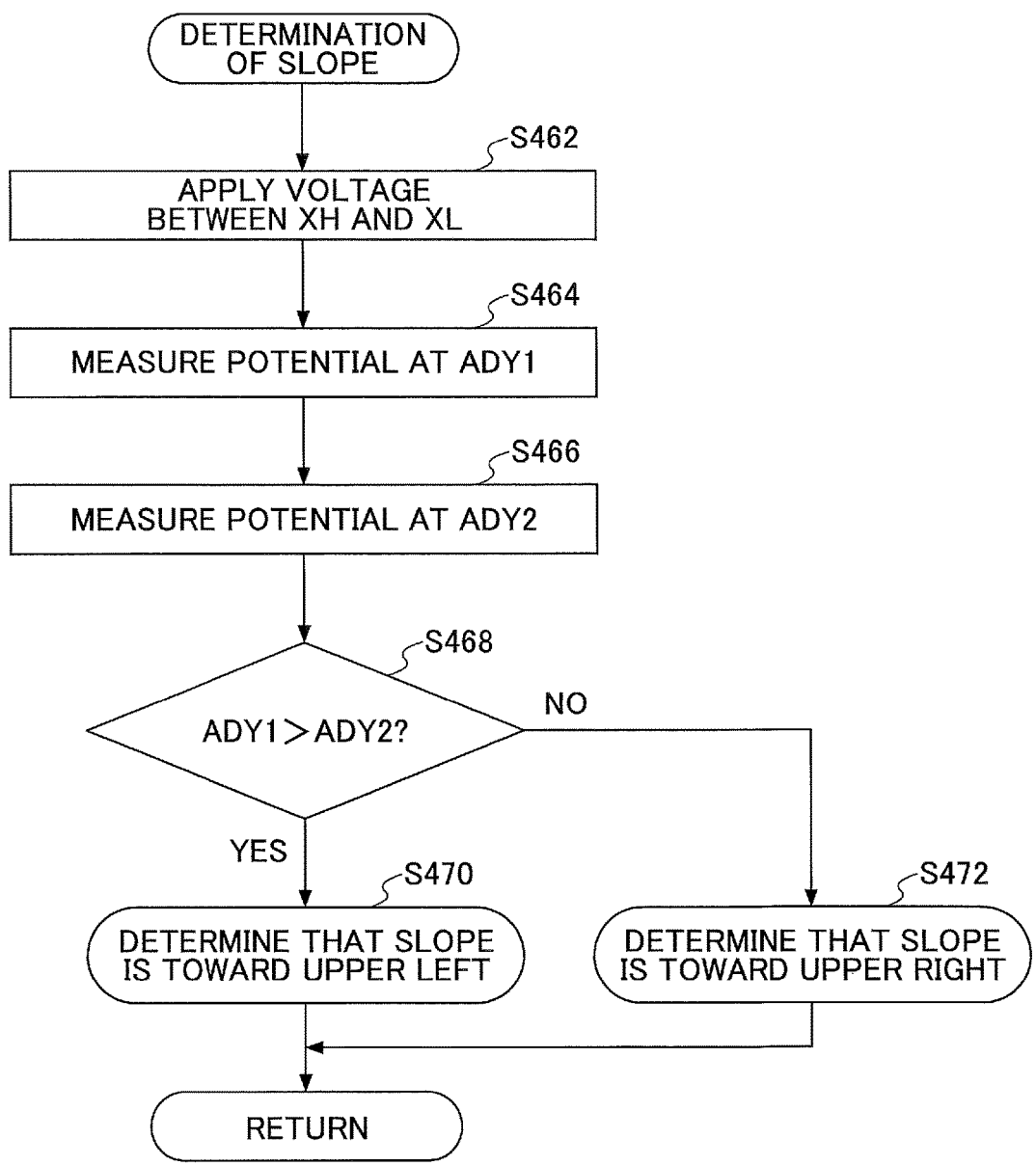
FIG. 42 is a flowchart of a subroutine of the position detecting method according to the second embodiment of the present invention.

Next, a description is given, with reference to FIG. 42, of the subroutine of step S226 (FIG. 34) for determining the direction (slope) of the line connecting the two contact points.

First, in step S462, supply voltage is applied to the first resistive film 10 between the XH electrode 11 and the XL electrode 12. That is, as illustrated in FIG. 16 or FIG. 18, a supply voltage Vcc is applied to the XH electrode 11 and the XL electrode 12 is grounded.

Next, in step S464, a potential is detected at the potential detecting part ADY1 connected to the YH electrode 21 of the second resistive film 20.

Next, in step S466, a potential is detected at the potential detecting part ADY2 connected to the YL electrode 22 of the second resistive film 20.

Next, in step S468, it is determined whether the potential detected at the potential detecting part ADY1 is greater than the potential detected at the potential detecting part ADY2. If the potential detected at the potential detecting part ADY1 is greater than the potential detected at the potential detecting part ADY2 (YES in step S468), the process proceeds to step S470. If the potential detected at the potential detecting part ADY1 is not greater than the potential detected at the potential detecting part ADY2 (NO in step S468), the process proceeds to step S472.

In step S470, it is determined that the line connecting the two contact points is in a direction toward upper left. Therefore, the information that the line connecting the two contact points is in a direction toward upper left is stored in the memory 32 in the control part 30 (FIG. 1).

In step S472, it is determined that the line connecting the two contact points is in a direction toward upper right. Therefore, the information that the line connecting the two contact points is in a direction toward upper right is stored in the memory 32 in the control part 30 (FIG. 1).

Thereby, this subroutine ends. Steps S462 through S466 of this subroutine overlap the subroutine illustrated in FIG. 41. Therefore, the potential detected at the potential detecting part ADY1 and the potential detecting at the potential detecting part ADY2 may be stored in the memory 32 in the control part 30 or the like in the subroutine illustrated in FIG. 41, and steps S468 through S472 of FIG. 42 may be performed based on the stored information.

Figure 43:
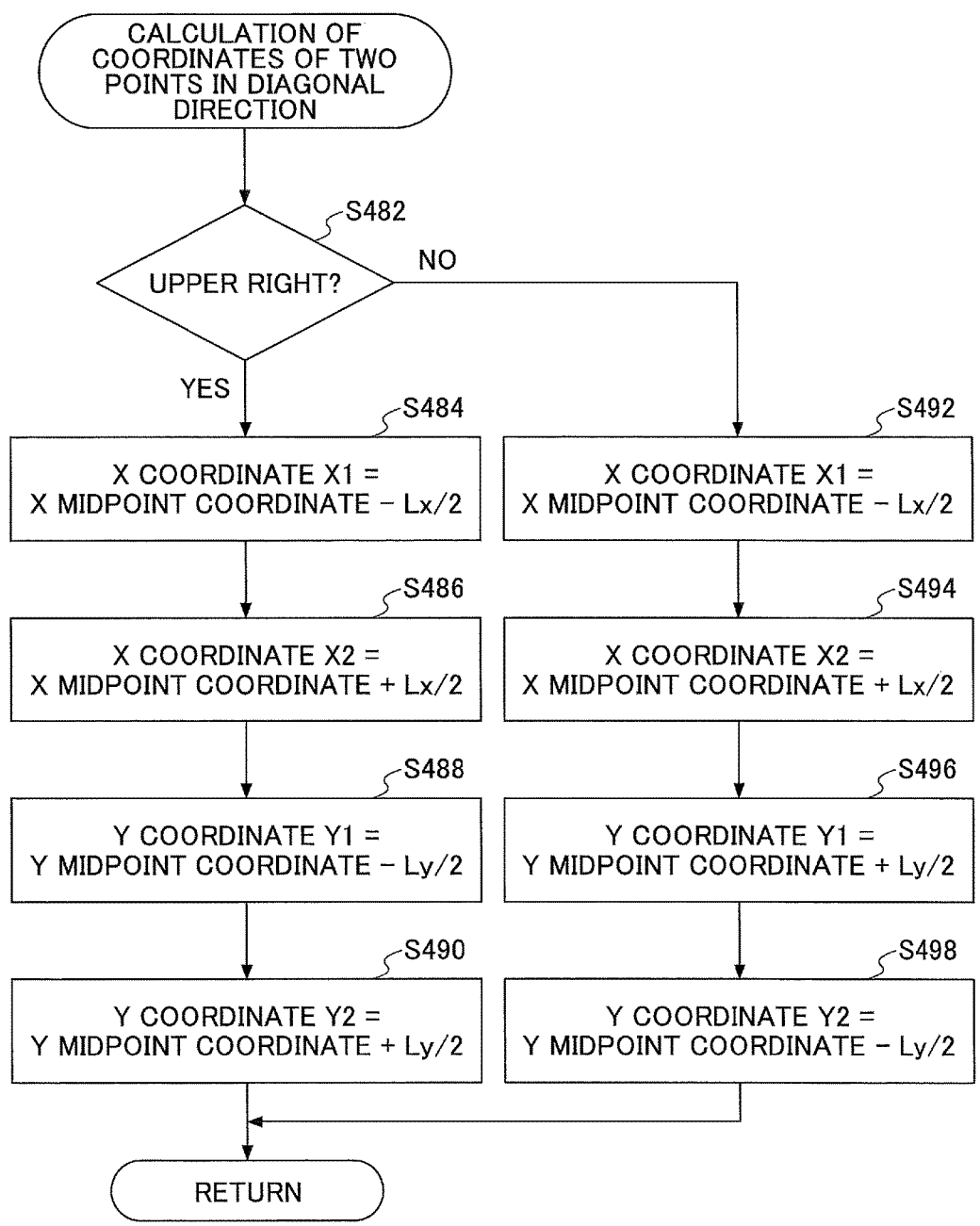
FIG. 43 is a flowchart of a subroutine of the position detecting method according to the second embodiment of the present invention.

Next, a description is given, with reference to FIG. 43, of the subroutine of step S228 (FIG. 34) for calculating the position coordinates of the two contact points.

First, in step S482, it is determined whether the line connecting the two contact points is in a direction toward upper right based on the information stored in the memory 32. If it is determined that the slope is in a direction toward upper right (YES in step S482), the process proceeds to step S484. If it is determined that the slope is not in a direction toward upper right (NO in step S482), the process proceeds to step S492.

In step S484, the X coordinate X1 of one of the two pressed (contact) points on the touchscreen panel is calculated. Specifically, the X coordinate X1 of one of the two pressed points is calculated by X1=Xc−Lx/2 based on the X coordinate Xc of the midpoint between the two contact points obtained in step S454 (FIG. 41) and the distance Lx in X coordinates obtained in step S382 (FIG. 38).

Next, in step S486, the X coordinate X2 of the other one of the two pressed (contact) points on the touchscreen panel is calculated. Specifically, the X coordinate X2 of the other one of the two pressed points is calculated by X2=Xc+Lx/2 based on the X coordinate Xc of the midpoint between the two contact points obtained in step S454 (FIG. 41) and the distance Lx in X coordinates obtained in step S382 (FIG. 38).

Next, in step S488, the Y coordinate Y1 of the one of the two pressed (contact) points on the touchscreen panel is calculated. Specifically, the Y coordinate Y1 of the one of the two pressed points is calculated by Y1=Yc−Ly/2 based on the Y coordinate Yc of the midpoint between the two contact points obtained in step S456 (FIG. 41) and the distance Ly in Y coordinates obtained in step S384 (FIG. 38).

Next, in step S490, the Y coordinate Y2 of the other one of the two pressed (contact) points on the touchscreen panel is calculated. Specifically, the Y coordinate Y2 of the other one of the two pressed points is calculated by Y2=Yc+Ly/2 based on the Y coordinate Yc of the midpoint between the two contact points obtained in step S456 (FIG. 41) and the distance Ly in Y coordinates obtained in step S384 (FIG. 38).

On the other hand, in step S492, the X coordinate X1 of one of the two pressed (contact) points on the touchscreen panel is calculated. Specifically, the X coordinate X1 of one of the two pressed points is calculated by X1=Xc−Lx/2 based on the X coordinate Xc of the midpoint between the two contact points obtained in step S454 (FIG. 41) and the distance Lx in X coordinates obtained in step S382 (FIG. 38).

Next, in step S494, the X coordinate X2 of the other one of the two pressed (contact) points on the touchscreen panel is calculated. Specifically, the X coordinate X2 of the other one of the two pressed points is calculated by X2−Xc+Lx/2 based on the X coordinate Xc of the midpoint between the two contact points obtained in step S454 (FIG. 41) and the distance Lx in X coordinates obtained in step S382 (FIG. 38).

Next, in step S496, the Y coordinate Y1 of the one of the two pressed (contact) points on the touchscreen panel is calculated. Specifically, the Y coordinate Y1 of the one of the two pressed points is calculated by Y1=Yc+Ly/2 based on the Y coordinate Yc of the midpoint between the two contact points obtained in step S456 (FIG. 41) and the distance Ly in Y coordinates obtained in step S384 (FIG. 38).

Next, in step S498, the Y coordinate Y2 of the other one of the two pressed (contact) points on the touchscreen panel is calculated. Specifically, the Y coordinate Y2 of the other one of the two pressed points is calculated by Y2=Yc−Ly/2 based on the Y coordinate Yc of the midpoint between the two contact points obtained in step S456 (FIG. 41) and the distance Ly in Y coordinates obtained in step S384 (FIG. 38).

Thereby, this subroutine ends.

Figure 44:
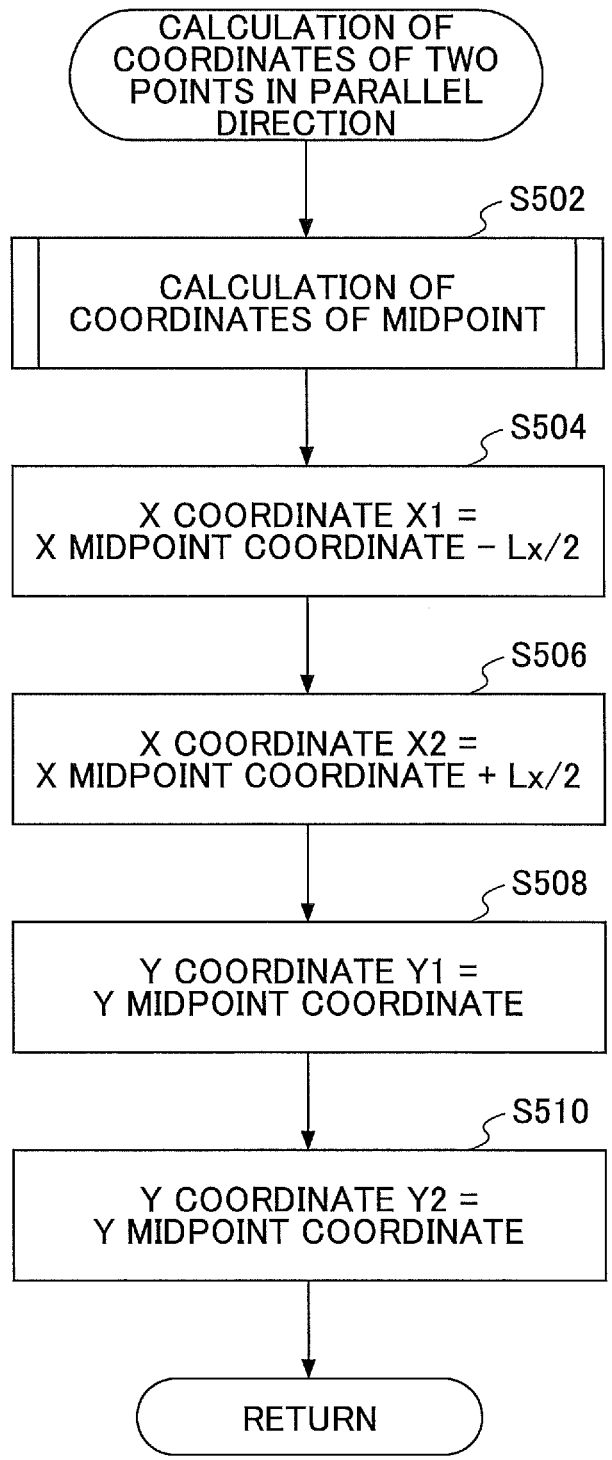
FIG. 44 is a flowchart of a subroutine of the position detecting method according to the second embodiment of the present invention.
Figure 45:
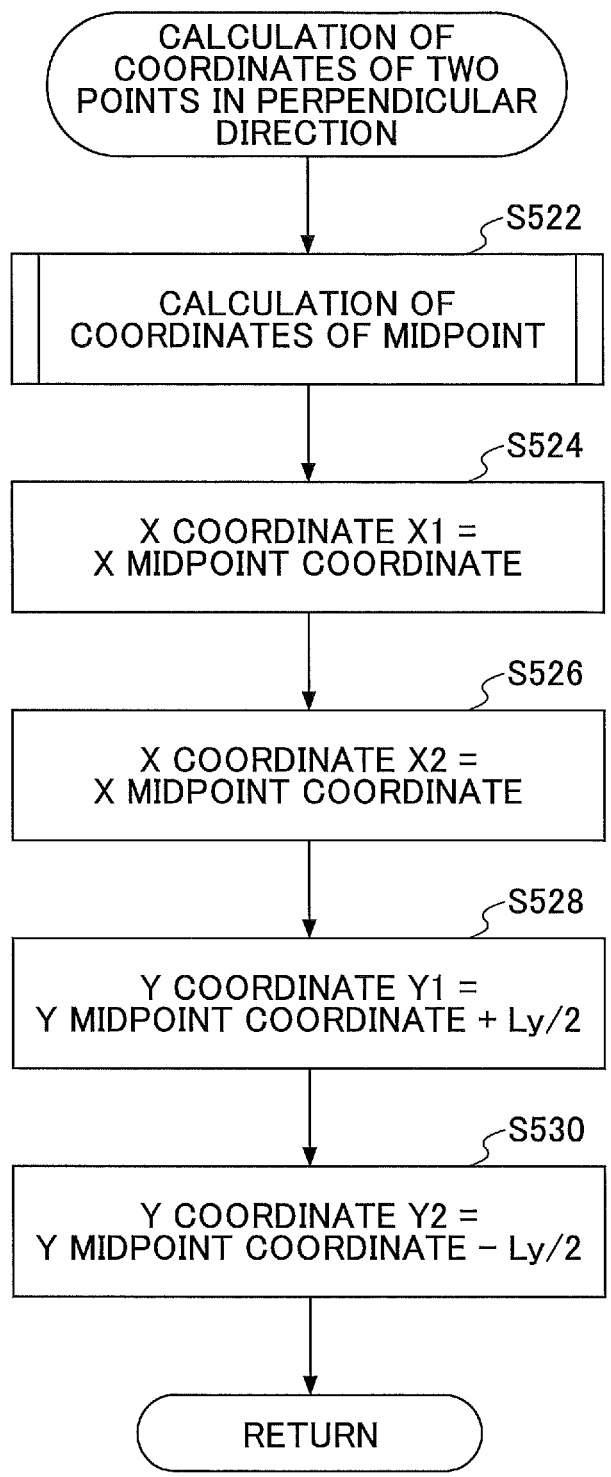
FIG. 45 is a flowchart of a subroutine of the position detecting method according to the second embodiment of the present invention.

The subroutines illustrated in FIG. 39 and FIG. 40 in step S218 and step S222 (FIG. 34) may be replaced with the subroutines illustrated in FIG. 44 and FIG. 45, respectively.

A specific description is given, with reference to FIG. 44, of another subroutine for calculating the position coordinates of the two contact points in a parallel direction in step S218.

First, in step S502, the subroutine illustrated in FIG. 41 is performed for detecting a midpoint in the case where there are two contact points on the touchscreen panel. Thereby, the X coordinate Xc and the Y coordinate Yc are obtained (determined). Here, the two pressed (contact) points are in a parallel direction, that is, in a direction parallel to the X-axis direction. Therefore, the two pressed points have the same Y coordinate value. Therefore, the Y coordinate Yc serves as the Y coordinates Y1 and Y2 of the two pressed points. Further, the X coordinate Xc is the X coordinate of the midpoint between the two pressed points.

Next, in step S504, the X coordinate of one of the two pressed points on the touchscreen panel is calculated. Specifically, the X coordinate X1 of one of the two pressed points is calculated by X1=Xc−Lx/2 based on the distance Lx in X coordinates determined in step S382 (FIG. 38).

Next, in step S506, the X coordinate of the other one of the two pressed points on the touchscreen panel is calculated. Specifically, the X coordinate X2 of the other one of the two pressed points is calculated by X2=Xc+Lx/2 based on the distance Lx in X coordinates determined in step S382 (FIG. 38).

Next, in step S508, the Y coordinate Y1 of the one of the two pressed points on the touchscreen panel is determined as the coordinate Yc detected in step S502.

Next, in step S510, the Y coordinate Y2 of the other one of the two pressed points on the touchscreen panel is determined as the coordinate Yc detected in step S502.

Thereby, this subroutine ends.

A specific description is given, with reference to FIG. 45, of another subroutine for calculating the position coordinates of the two contact points in a perpendicular direction in step S222.

First, in step S522, the subroutine illustrated in FIG. 41 is performed for detecting a midpoint in the case where there are two contact points on the touchscreen panel. Thereby, the X coordinate Xc and the Y coordinate Yc are obtained (determined). Here, the two pressed (contact) points are in a perpendicular direction, that is, in a direction perpendicular to the X-axis direction. Therefore, the two pressed points have the same X coordinate value. Therefore, the X coordinate Xc serves as the X coordinates X1 and X2 of the two pressed points. Further, the Y coordinate Yc is the Y coordinate of the midpoint between the two pressed points.

Next, in step S524, the X coordinate X1 of one of the two pressed points on the touchscreen panel is determined as the coordinate Xc detected in step S522.

Next, in step S526, the X coordinate X2 of the other one of the two pressed points on the touchscreen panel is determined as the coordinate Xc detected in step S522.

Next, in step S528, the Y coordinate of the one of the two pressed points on the touchscreen panel is calculated. Specifically, the Y coordinate Y1 of the one of the two pressed points is calculated by Y1=Yc+Ly/2 based on the distance Ly in Y coordinates determined in step S384 (FIG. 38).

Next, in step S530, the Y coordinate of the other one of the two pressed points on the touchscreen panel is calculated. Specifically, the Y coordinate Y2 of the other one of the two pressed points is calculated by Y2=Yc−Ly/2 based on the distance Ly in Y coordinates determined in step S384 (FIG. 38).

Thereby, this subroutine ends.

According to the method of detecting a position on the touchscreen panel of this embodiment, in the case where the touchscreen panel is contacted at two points as well, it is possible to detect a position with accuracy in a simple manner the same as in the first embodiment.

The second embodiment is the same as the first embodiment except for the above-described process.

Third Embodiment

Next, a description is given of a third embodiment. This embodiment relates to a touchscreen panel, and more particularly to a touchscreen panel so structured as to be suitably used in the position detecting methods of the first embodiment and the second embodiment.

First, a description is given of the relationship between the first and second resistive films 10 and 20 and the resistors Rx1 and Ry1 in the touchscreen panel illustrated in FIG. 1. In the touchscreen panel, a greater difference between a potential detected in the case of pressing at one point and a potential detected in the case of pressing at two points makes it easier to determine whether the touchscreen panel is contacted at one point or two points.

A description is given of a first touchscreen panel. According to the first touchscreen panel, each of the first resistive film 10 and the second resistive film 20 is 91.0 mm long in the X-axis direction and 75.0 mm long in the Y-axis direction in the touchscreen panel illustrated in FIG. 1. The value of the resistance between the XH electrode 11 and the XL electrode 12 in the first resistive film 10 is 351.4Ω, and the value of the resistance between the YH electrode 21 and the YL electrode 22 in the second resistive film 20 is 210.0Ω. A description is given of the results of studying the values of the resistors Rx1 and Ry1 and the potentials detected in the case of pressing at one point and in the case of pressing at two points in this first touchscreen panel.

Table 1 illustrates the values of the resistors Rx1 and Ry1, the ratio of the resistance value of the resistor Rx1/Ry1 to the resistance value of the inter-electrode resistance in each of the first and second resistive films 10 and 20, the potentials detected in the case of pressing at one point and in the case of pressing at two points, and the difference between the detected potentials. It is assumed that Vcc is 5 V.

TABLE 1

| RATIO OF RESISTANCE VALUE OF | X-AXIS DIRECTION VOLTAGE VALUE (V) | | |
| --- | --- | --- | --- |
| RESISTOR TO RESISTANCE | POTEN- TIAL | POTEN- TIAL | POTEN- |

TABLE 1-continued

| VALUE OF RESISTIVE FILM | Rx1 (Ω) | Ry1 (Ω) | OF ONE-POINT PRESSING | OF TWO-POINT PRESSING | TIAL DIFFER-ENCE |
|---|---|---|---|---|---|
| APPROX. ⅛ | 43 | 27 | 4.49 | 4. 2 | 0.29 |
| APPROX. ¼ | 91 | 51 | 4.04 | 3.60 | 0.44 |
| APPROX. ½ | 180 | 100 | 3.36 | 2.80 | 0.56 |
| APPROX. ¾ | 270 | 160 | 2.88 | 2.28 | 0.60 |
| APPROX. 1 TIME | 360 | 220 | 2.50 | 1.90 | 0.60 |
| APPROX. 1.5 TIMES | 510 | 330 | 2.08 | 1.51 | 0.57 |
| APPROX. 2 TIMES | 680 | 430 | 1.72 | 1.22 | 0.50 |
| APPROX. 3 TIMES | 1K | 620 | 1.32 | 0.96 | 0.36 |
| APPROX. 4 TIMES | 1.5K | 820 | 0.96 | 0.65 | 0.31 |

| RATIO OF RESISTANCE VALUE OF RESISTOR TO | Y-AXIS DIRECTION VOLTAGE VALUE (V) | | |
|---|---|---|---|
| RESISTANCE VALUE OF RESISTIVE FILM | POTENTIAL OF ONE-POINT PRESSING | POTENTIAL OF TWO-POINT PRESSING | POTENTIAL DIFFERENCE |
| APPROX. ⅛ | 4.44 | 4.27 | 0.17 |
| APPROX. ¼ | 4.08 | 3.84 | 0.24 |
| APPROX. ½ | 3.44 | 3.12 | 0.32 |
| APPROX. ¾ | 2.92 | 2.52 | 0.40 |
| APPROX. 1 TIME | 2.48 | 2.12 | 0.36 |
| APPROX. 1.5 TIMES | 1.92 | 1.60 | 0.32 |
| APPROX. 2 TIMES | 1.68 | 1.38 | 0.30 |
| APPROX. 3 TIMES | 1.25 | 1.03 | 0.22 |
| APPROX. 4 TIMES | 0.63 | 0.42 | 0.21 |

Figure 46:
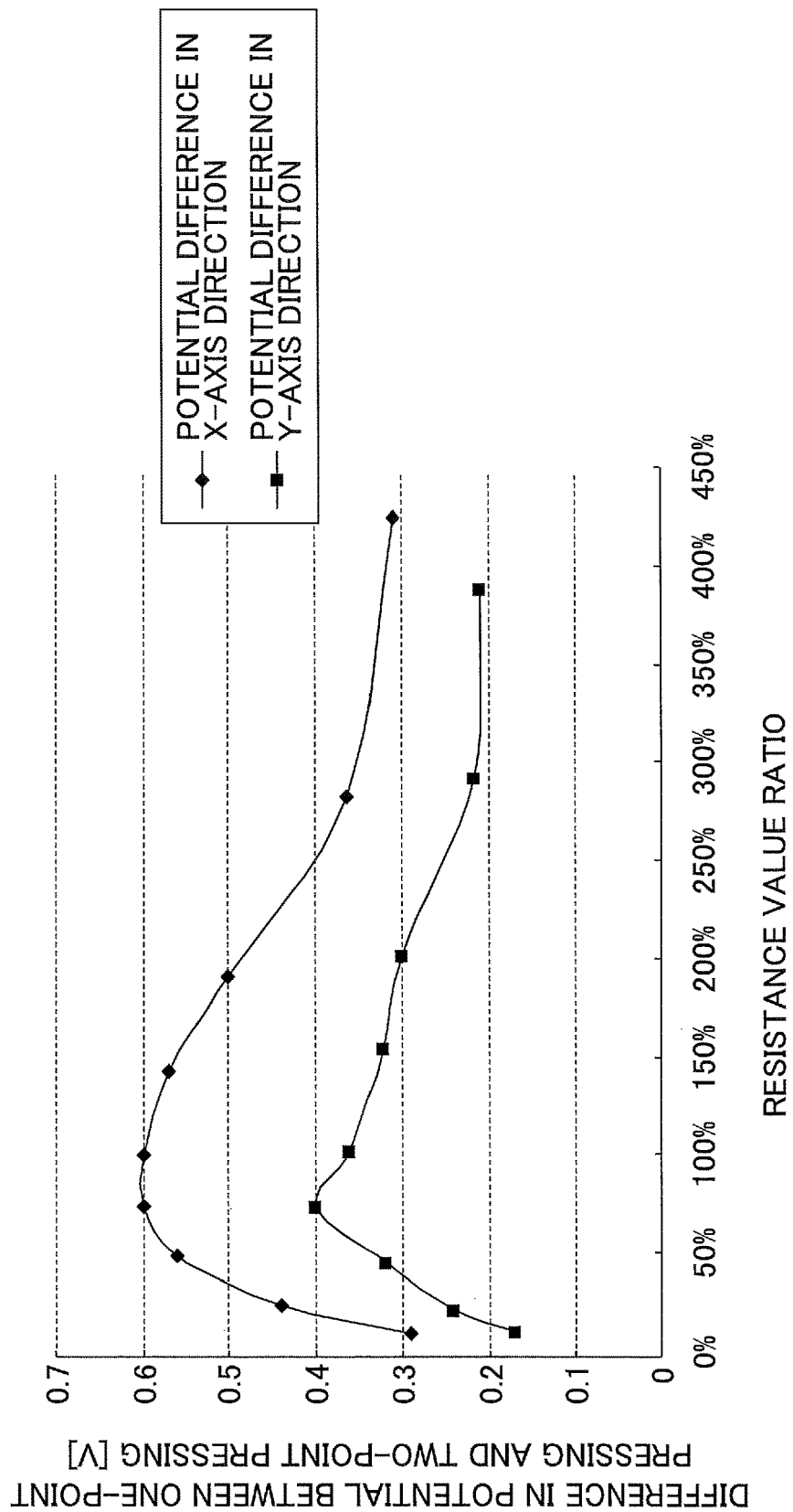
FIG. 46 is a graph illustrating the relationship between the ratio of the value of connected resistance and a potential difference in a first touchscreen panel according to a third embodiment of the present invention.

FIG. 46 illustrates the relationship between the ratio of the resistance value of the resistor Rx1/Ry1 to the inter-electrode resistance value in each of the first and second resistive films 10 and 20 and the difference in potential between the case of pressing at one point and the case of pressing at two points based on the results of Table 1. In the X-axis direction, the difference in detected potential between the case of pressing at one point and the case of pressing at two points is maximized to be approximately 0.6 V when the resistance value of the resistor Rx1 is approximately 75% to approximately 100% of the resistance value of the first resistive film 10. Further, in the Y-axis direction, the difference in detected potential between the case of pressing at one point and the case of pressing at two points is maximized to be approximately 0.4 V when the resistance value of the resistor Ry1 is approximately 75% of the resistance value of the second resistive film 20.

If the difference in potential between the case of pressing at one point and the case of pressing at two points is more than or equal to 0.2 V, it is possible to determine whether the number of contact (pressed) points on the touchscreen panel is one or two with ease. Therefore, according to the first touchscreen panel, it is preferable that the values of the resistors Rx1 and Rx2 be more than or equal to 25% and less than or equal to 400% of the resistance values of the first and second resistive films 10 and 20 of the touchscreen panel. In order to further ensure the determination as to whether the number of pressed points is one or two, the difference in potential is preferably more than or equal to 0.3 V. In this case, it is preferable that the values of the resistors Rx1 and Rx2 be more than or equal to 50% and less than or equal to 200% of the resistance values of the first and second resistive films 10 and 20 of the touchscreen panel.

Next, a description is given of a second touchscreen panel. According to the second touchscreen panel, each of the first resistive film 10 and the second resistive film 20 is 164.0 mm long in the X-axis direction and 101.0 mm long in the Y-axis direction in the touchscreen panel illustrated in FIG. 1. The value of the resistance between the XH electrode 11 and the XL electrode 12 in the first resistive film 10 is 866.0Ω, and the value of the resistance between the YH electrode 21 and the YL electrode 22 in the second resistive film 20 is 247.5Ω. A description is given of the results of studying the values of the resistors Rx1 and Ry1 and the potentials detected in the case of pressing at one point and in the case of pressing at two points in this second touchscreen panel.

Table 2 illustrates the values of the resistors Rx1 and Ry1, the ratio of the resistance value of the resistor Rx1/Ry1 to the resistance value of the inter-electrode resistance in each of the first and second resistive films 10 and 20, the potentials detected in the case of pressing at one point and in the case of pressing at two points, and the difference between the detected potentials. It is assumed that Vcc is 5 V.

TABLE 2

| RATIO OF RESISTANCE VALUE OF RESISTOR TO | | | X-AXIS DIRECTION VOLTAGE VALUE (V) | | |
|---|---|---|---|---|---|
| RESISTANCE VALUE OF RESISTIVE FILM | Rx1 (Ω) | Ry1 (Ω) | POTENTIAL OF ONE-POINT PRESSING | POTENTIAL OF TWO-POINT PRESSING | POTENTIAL DIFFERENCE |
| APPROX. ¼ | 220 | 62 | 4.08 | 3.56 | 0.52 |
| APPROX. ½ | 430 | 120 | 3.44 | 2.80 | 0.64 |
| APPROX. ¾ | 680 | 180 | 2.88 | 2.18 | 0.70 |
| APPROX. 1 TIME | 910 | 240 | 2.52 | 1.86 | 0.66 |
| APPROX. 2 TIMES | 1.8K | 510 | 1.68 | 1.18 | 0.50 |
| APPROX. 4 TIMES | 3.3K | 1.0K | 1.08 | 0.68 | 0.40 |

RATIO OF

TABLE 2-continued

| RESISTANCE VALUE OF RESISTOR TO RESISTANCE VALUE OF RESISTIVE FILM | Y-AXIS DIRECTION VOLTAGE VALUE (V) | | |
|---|---|---|---|
| | POTENTIAL OF ONE-POINT PRESSING | POTENTIAL OF TWO-POINT PRESSING | POTENTIAL DIFFERENCE |
| APPROX. ¼ | 4.02 | 3.78 | 0.24 |
| APPROX. ½ | 3.40 | 3.10 | 0.30 |
| APPROX. ¾ | 2.92 | 2.58 | 0.34 |
| APPROX. 1 TIME | 2.56 | 2.26 | 0.30 |
| APPROX. 2 TIMES | 1.60 | 1.34 | 0.26 |
| APPROX. 4 TIMES | 0.96 | 0.74 | 0.22 |

Figure 47:
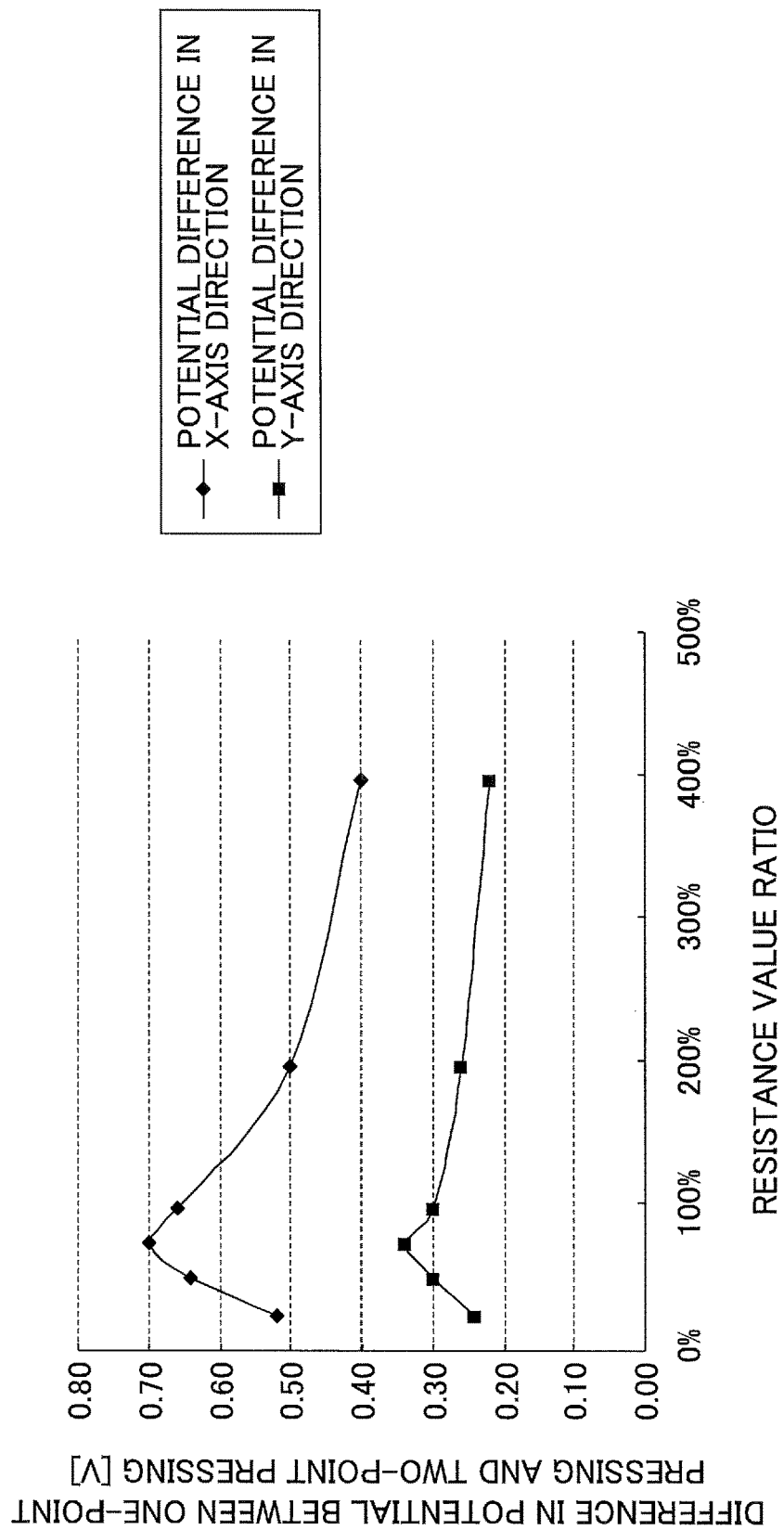
FIG. 47 is a graph illustrating the relationship between the ratio of the value of connected resistance and a potential difference in a second touchscreen panel according to the third embodiment of the present invention.

FIG. 47 illustrates the relationship between the ratio of the resistance value of the resistor Rx1/Ry1 to the inter-electrode resistance value in each of the first and second resistive films 10 and 20 and the difference in potential between the case of pressing at one point and the case of pressing at two points based on the results of Table 2. In the X-axis direction, the difference in detected potential between the case of pressing at one point and the case of pressing at two points is maximized to be approximately 0.7 V when the resistance value of the resistor Rx1 is approximately 75% of the resistance value of the first resistive film 10. Further, in the Y-axis direction, the difference in detected potential between the case of pressing at one point and the case of pressing at two points is maximized to be approximately 0.34 V when the resistance value of the resistor Ry1 is approximately 75% of the resistance value of the second resistive film 20.

If the difference in potential between the case of pressing at one point and the case of pressing at two points is more than or equal to 0.2 V, it is possible to determine whether the number of contact (pressed) points on the touchscreen panel is one or two with ease. Therefore, according to the second touchscreen panel, it is preferable that the values of the resistors Rx1 and Rx2 be more than or equal to 25% and less than or equal to 400% of the resistance values of the first and second resistive films 10 and 20 of the touchscreen panel. In order to further ensure the determination as to whether the number of pressed points is one or two, the difference in potential is preferably more than or equal to 0.3 V. In this case, it is preferable that the values of the resistors Rx1 and Rx2 be more than or equal to 50% and less than or equal to 100% of the resistance values of the first and second resistive films 10 and 20 of the touchscreen panel.

Next, a description is given of a third touchscreen panel. According to the third touchscreen panel, each of the first resistive film 10 and the second resistive film 20 is 183.0 mm long in the X-axis direction and 143.0 mm long in the Y-axis direction in the touchscreen panel illustrated in FIG. 1. The value of the resistance between the XH electrode 11 and the XL electrode 12 in the first resistive film 10 is 580.0Ω, and the value of the resistance between the YH electrode 21 and the YL electrode 22 in the second resistive film 20 is 360.0Ω. A description is given of the results of studying the values of the resistors Rx1 and Ry1 and the potentials detected in the case of pressing at one point and in the case of pressing at two points in this third touchscreen panel.

Table 3 illustrates the value of the resistor Rx1, the ratio of the value of the resistor Rx1 to the resistance value of the inter-electrode resistance in the first resistive film 10, the potentials detected in the case of pressing at one point and in the case of pressing at two points, and the difference between the detected potentials. It is assumed that Vcc is 5 V. Table 4 illustrates the value of the resistor Ry1, the ratio of the value of the resistor Ry1 to the resistance value of the inter-electrode resistance in the second resistive film 20, the potentials detected in the case of pressing at one point and in the case of pressing at two points, and the difference between the detected potentials. It is assumed that Vcc is 5 V.

TABLE 3

| RATIO OF RESISTANCE VALUE OF RESISTOR TO | | X-AXIS DIRECTION VOLTAGE VALUE (V) | | |
|---|---|---|---|---|
| RESISTANCE VALUE OF RESISTIVE FILM | Rx1 (Ω) | POTENTIAL OF ONE-POINT PRESSING | POTENTIAL OF TWO-POINT PRESSING | POTENTIAL DIFFERENCE |
| APPROX. 0.17 | 100 | 4.39 | 4.28 | 0.11 |
| APPROX. 0.41 | 240 | 3.64 | 3.39 | 0.25 |
| APPROX. 0.47 | 270 | 3.50 | 3.23 | 0.27 |
| APPROX. 0.57 | 330 | 3.28 | 3.00 | 0.28 |
| APPROX. 0.74 | 430 | 2.96 | 2.64 | 0.32 |
| APPROX. 0.97 | 560 | 2.60 | 2.31 | 0.29 |
| APPROX. 1.31 | 760 | 2.23 | 1.97 | 0.26 |
| APPROX. 1.71 | 990 | 1.91 | 1.67 | 0.24 |

TABLE 4

| RATIO OF RESISTANCE VALUE OF RESISTOR TO | | Y-AXIS DIRECTION VOLTAGE VALUE (V) | | |
|---|---|---|---|---|
| RESISTANCE VALUE OF RESISTIVE FILM | Ry1 (Ω) | POTENTIAL OF ONE-POINT PRESSING | POTENTIAL OF TWO-POINT PRESSING | POTENTIAL DIFFERENCE |
| APPROX. 0.28 | 100 | 4.03 | 3.84 | 0.19 |
| APPROX. 0.67 | 240 | 3.09 | 2.87 | 0.22 |
| APPROX. 0.75 | 270 | 2.93 | 2.69 | 0.24 |
| APPROX. 0.92 | 330 | 2.66 | 2.43 | 0.23 |
| APPROX. 1.19 | 430 | 2.33 | 2.11 | 0.22 |
| APPROX. 1.56 | 560 | 2.00 | 1.79 | 0.21 |
| APPROX. 2.11 | 760 | 1.65 | 1.45 | 0.20 |
| APPROX. 2.75 | 990 | 1.36 | 1.19 | 0.17 |

Figure 48:
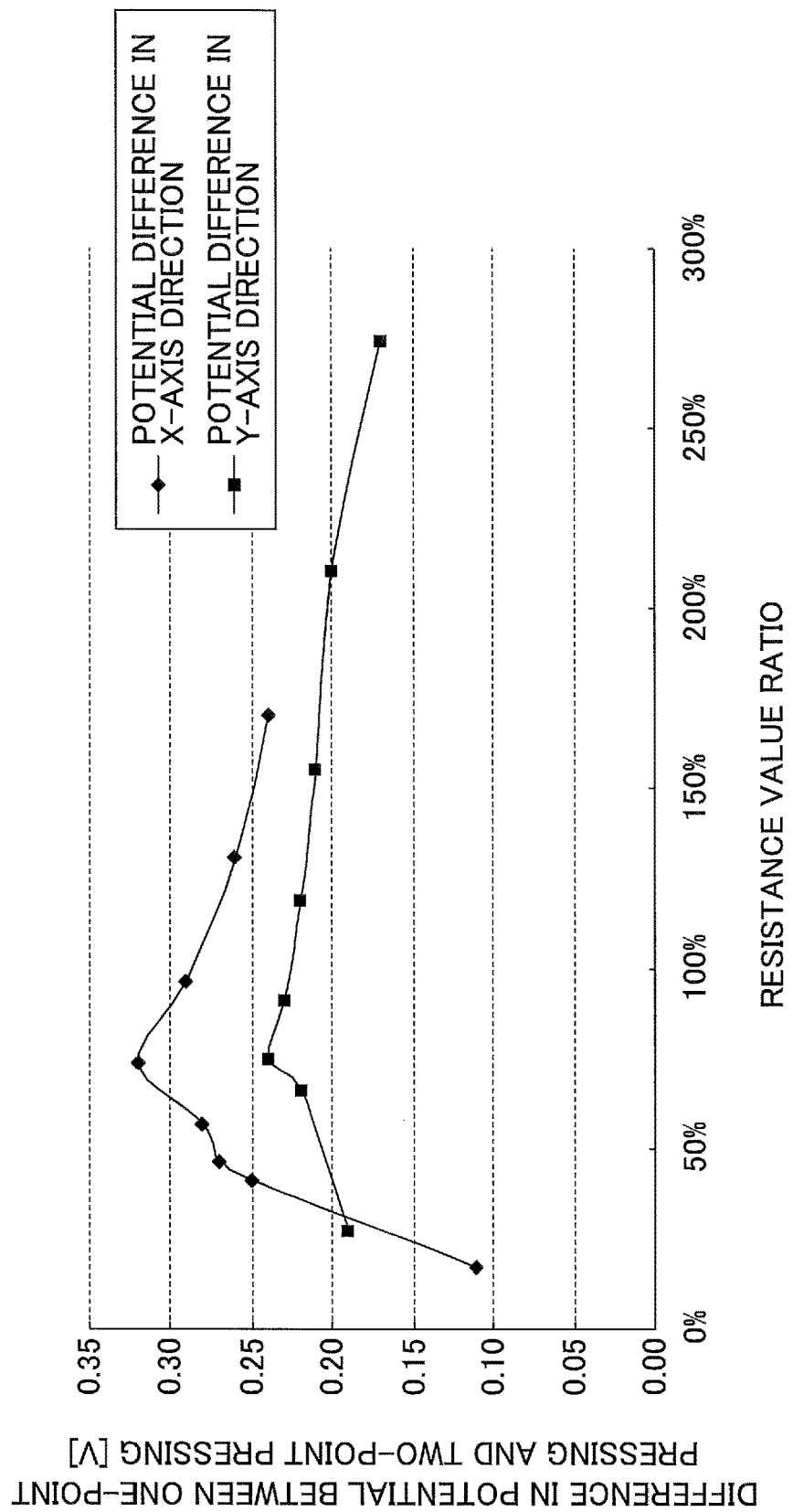
FIG. 48 is a graph illustrating the relationship between the ratio of the value of connected resistance and a potential difference in a third touchscreen panel according to the third embodiment of the present invention.

FIG. 48 illustrates the relationship between the ratio of the resistance value of the resistor Rx1/Ry1 to the inter-electrode resistance value in each of the first and second resistive films 10 and 20 and the difference in potential between the case of pressing at one point and the case of pressing at two points based on the results of Table 3 and Table 4. In the X-axis direction, the difference in detected potential between the case of pressing at one point and the case of pressing at two points is maximized to be approximately 0.32 V when the resistance value of the resistor Rx1 is approximately 75% of the resistance value of the first resistive film 10. Further, in the Y-axis direction, the difference in detected potential between the case of pressing at one point and the case of pressing at two points is maximized to be approximately 0.24 V when the resistance value of the resistor Ry1 is approximately 75% of the resistance value of the second resistive film 20.

If the difference in potential between the case of pressing at one point and the case of pressing at two points is more than or equal to 0.2 V, it is possible to determine whether the number of contact (pressed) points on the touchscreen panel is one or two with ease. Therefore, according to the third touchscreen panel, it is preferable that the values of the resistors Rx1 and Rx2 be more than or equal to 50% and less than or equal to 200% of the resistance values of the first and second resistive films 10 and 20 of the touchscreen panel.

Thus, according to the touchscreen panel of this embodiment, the values of the resistors Rx1 and Rx2 are more than or equal to 25% and less than or equal to 400%, preferably more than or equal to 50% and less than or equal to 200%, more preferably more than or equal to 50% and less than or equal to 100%, and yet more preferably approximately 75%, of the resistance values of the first and second resistive films 10 and 20.

Fourth Embodiment

Figure 49:
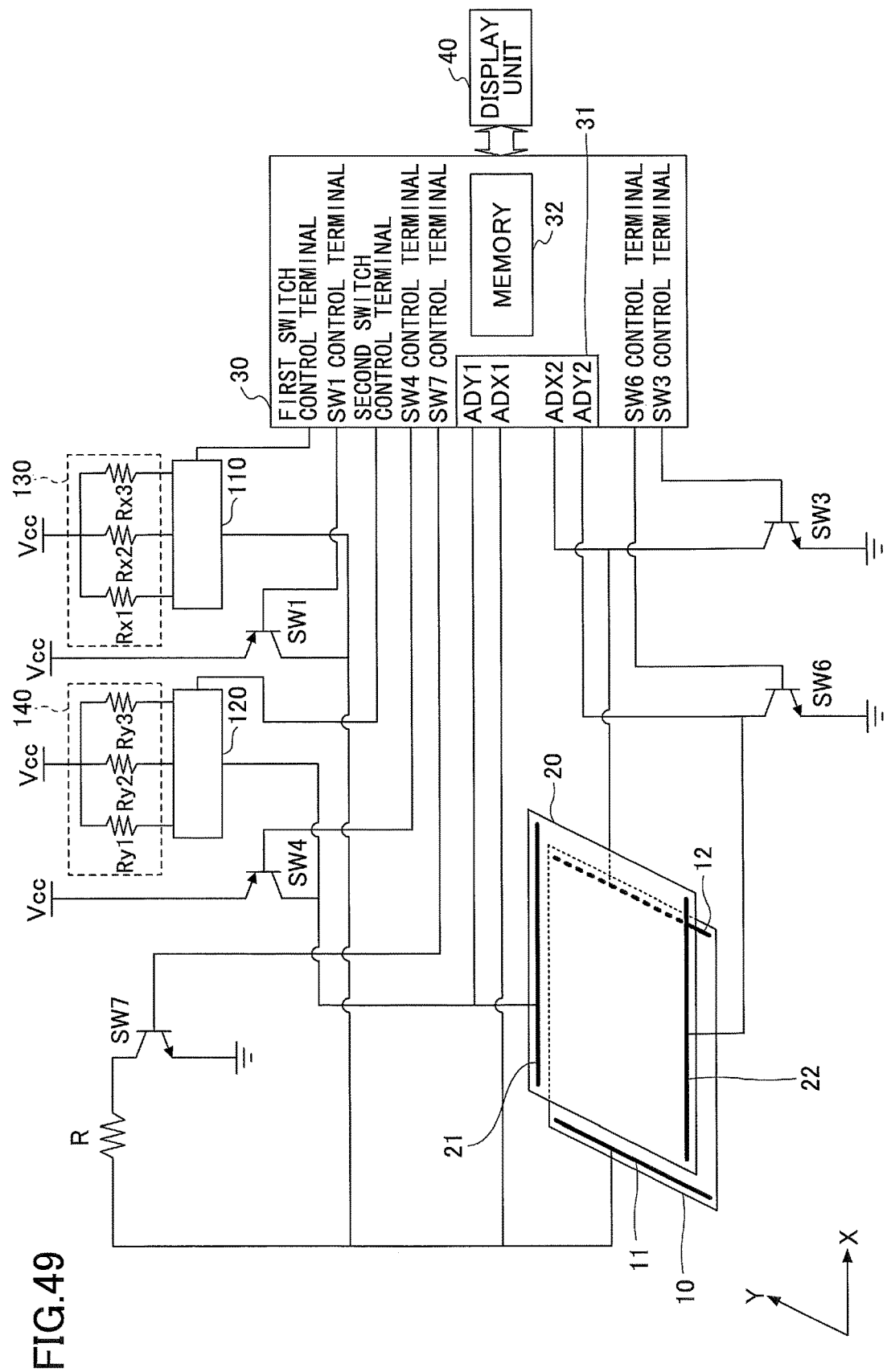
FIG. 49 is a diagram illustrating a touchscreen panel according to a fourth embodiment of the present invention.

Next, a description is given, with reference to FIG. 49, of a fourth embodiment, which relates to a touchscreen panel.

A touchscreen panel of this embodiment includes multiple resistors Rx1, Rx2, and Rx3, each of which is connectable in series to the first resistive film 10. By operating a first switch 110, one of the resistors Rx1, Rx2, and Rx3 may be selected to be connected in series to the first resistive film 10. Likewise, the touchscreen panel of this embodiment includes multiple resistors Ry1, Ry2, and Ry3, each of which is connectable in series to the second resistive film 20, and by operating a second switch 120, one of the resistors Ry1, Ry2, and Ry3 may be selected to be connected in series to the second resistive film 20. In this embodiment, the resistors Rx1, Rx2, and Rx3 may be collectively referred to as a first resistor group 130, and the resistors Ry1, Ry2, and Ry3 may be collectively referred to as a second resistor group 140. Further, the number of resistors included in each of the first resistor group 130 and the second resistor group 140 may be two or more so as to allow selection of a resistor. The first switch 110 is connected to a first switch control terminal in the control part 30 and the second switch 120 is connected to a second switch control terminal in the control part 30.

Figure 50:
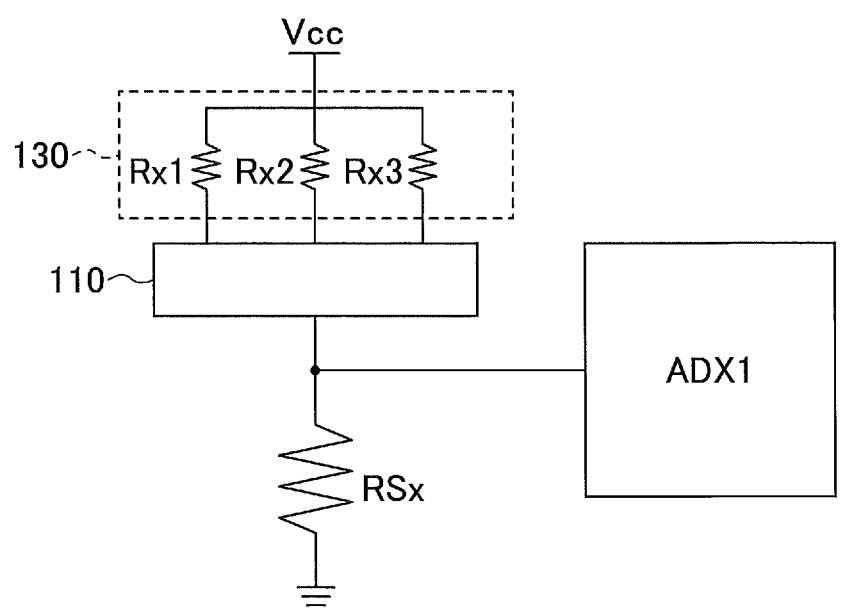
FIG. 50 is a diagram for illustrating the touchscreen panel according to the fourth embodiment of the present invention.

According to the touchscreen panel of this embodiment, it is possible to select one of the resistors Rx1, Rx2, and Rx3 which one is the most appropriate for the first resistive film 10 by operating the first switch 110. Specifically, one of the resistors Rx1, Rx2, and Rx3 is selected which one has the resistance value closest to 75% of the value of the resistance between the XH electrode 11 and the XL electrode 12 in the first resistive film 10. FIG. 50 illustrates the resistors Rx1, Rx2, and Rx3, the first switch 110, the first resistive film 10, and the potential detecting part ADX1. As illustrated in FIG. 50, letting the value of the resistance between the XH electrode 11 and the XL electrode 12 in the first resistive film 10 be RSx, by operating the first switch 110, one of the resistors Rx1, Rx2, and Rx3 which one causes the potential value detected at the potential detecting part ADX1 to be closest to approximately 0.57·Vcc, which is obtained by (RSx/(RSx+0.75·RSx)×Vcc is selected and connected to the first resistive film 10.

Likewise, one of the resistors Ry1, Ry2, and Ry3 which one is the most suitable for the second resistive film 20 is selected by operating the second switch 120. Specifically, one of the resistors Ry1, Ry2, and Ry3 is selected which one has the resistance value closest to 75% of the value of the resistance between the YH electrode 21 and the YL electrode 22 in the second resistive film 20.

According to this embodiment, the first switch 110 allows one of the resistors Rx1, Rx2, and Rx3 which one has the most suitable resistance value to be selected, and the second switch 120 allows one of the resistors Ry1, Ry2, and Ry3 which one has the most suitable resistance value to be selected. Therefore, even if there are variations in touchscreen panels with respect to the first resistive film 10 and the second resistive film 20 due to manufacturing error or the like, it is possible to optimize resistance. Further, it is also possible to optimize resistance in touchscreen panels of different shapes.

Figure 51:
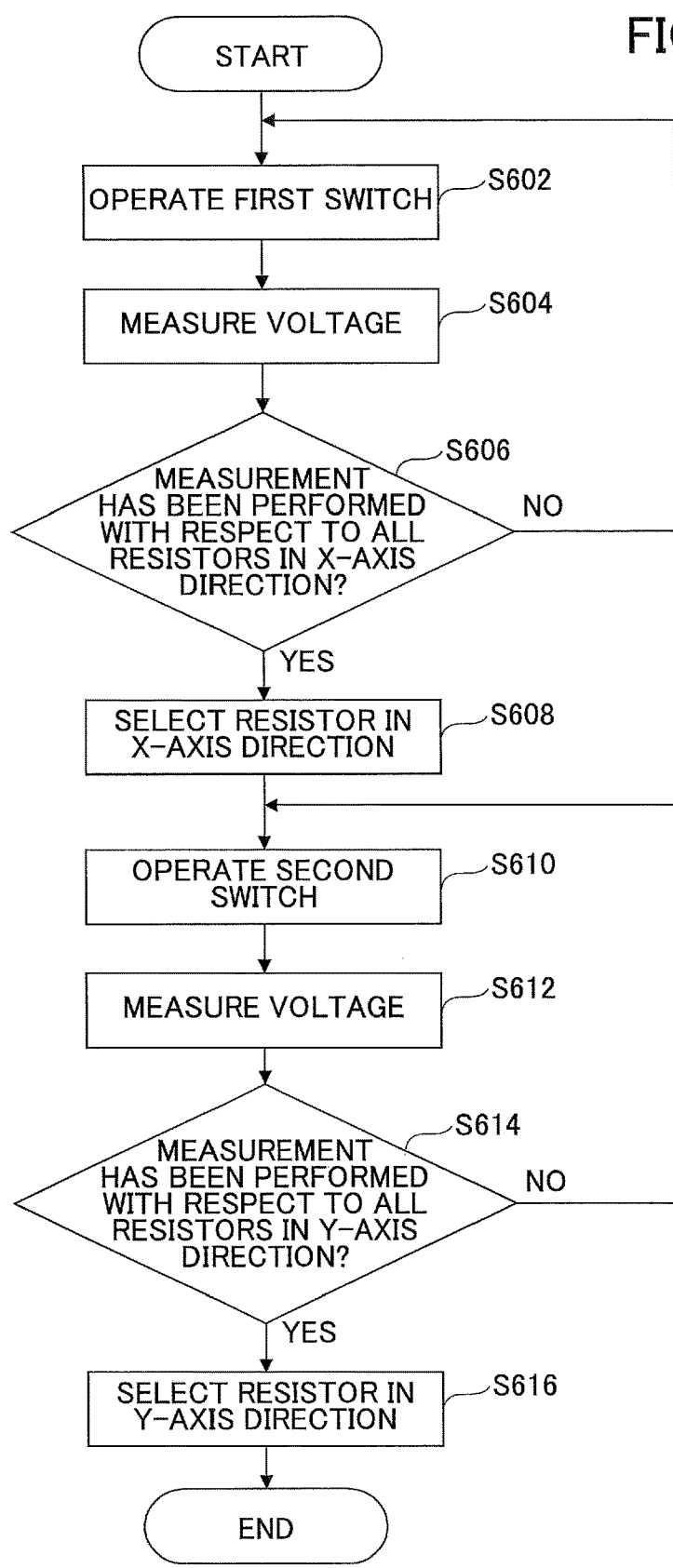
FIG. 51 is a flowchart of a method of setting a resistance value in a touchscreen panel according to the fourth embodiment of the present invention.

Next, a description is given, with reference to FIG. 51, of a method of selecting resistors to be connected to the first resistive film 10 and the second resistive film 20 in a touchscreen panel according to this embodiment. All or part of the below-described control is performed based on the control in the control part 30.

First, in step S602, for example, the resistor Rx1 and the first resistive film 10 are connected in series by operating the first switch 110.

Next, in step S604, a potential is measured at the potential detecting part ADX1 with application of a supply voltage Vcc.

Next, in step S606, it is determined whether all of the resistors Rx1, Rx2, and Rx3 in the X-axis direction have been selectively connected to the first resistive film 10 and subjected to potential measurement at the potential detecting part ADX1. If all of the resistors Rx1, Rx2, and Rx3 in the X-axis direction have been selectively connected to the first resistive film 10 and subjected to potential measurement at the potential detecting part ADX1 (YES in step S606), the process proceeds to step S608. On the other hand, if all of the resistors Rx1, Rx2, and Rx3 in the X-axis direction have not been selectively connected to the first resistive film 10 and subjected to potential measurement at the potential detecting part ADX1 (NO in step S606), the process proceeds to step S602. In this case, in step S602, the next resistor Rx2 or Rx3 is connected to the first resistive film 10 by operating the first switch 110.

Next, in step S608, one of the resistors Rx1, Rx2, and Rx3 in the X-axis direction for which one the potential detected at the potential detecting part ADX1 is the closest to 0.57·Vcc is selected and connected in series to the first resistive film 10 via the first switch 110.

Next, in step S610, for example, the resistor Ry1 and the second resistive film 20 are connected in series by operating the second switch 120.

Next, in step S612, a potential is measured at the potential detecting part ADY1 with application of the supply voltage Vcc.

Next, in step S614, it is determined whether all of the resistors Ry1, Ry2, and Ry3 in the Y-axis direction have been selectively connected to the second resistive film 20 and subjected to potential measurement at the potential detecting part ADY1. If all of the resistors Ry1, Ry2, and Ry3 in the Y-axis direction have been selectively connected to the second resistive film 20 and subjected to potential measurement at the potential detecting part ADY1 (YES in step S614), the process proceeds to step S616. On the other hand, if all of the resistors Ry1, Ry2, and Ry3 in the Y-axis direction have not been selectively connected to the second resistive film 20 and subjected to potential measurement at the potential detecting part ADY1 (NO in step S614), the process proceeds to step S610. In this case, in step S610, the next resistor Ry2 or Ry3 is connected to the second resistive film 20 by operating the second switch 120.

Next, in step S616, one of the resistors Ry1, Ry2, and Ry3 in the Y-axis direction for which one the potential detected at the potential detecting part ADY1 is the closest to 0.57·Vcc is selected and connected in series to the second resistive film 20 via the second switch 120.

Fifth Embodiment

Figure 52:
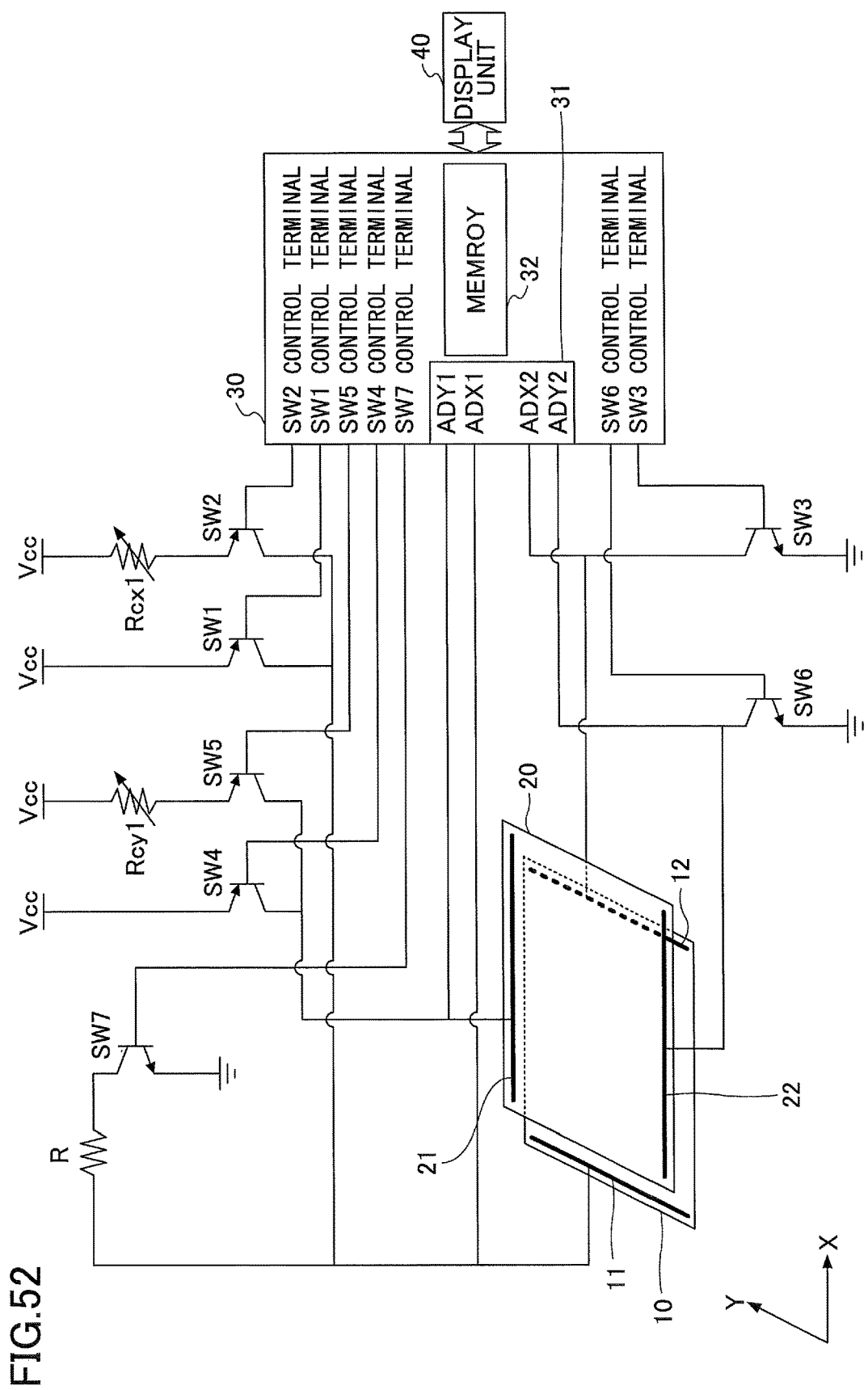
FIG. 52 is a diagram illustrating a touchscreen panel according to a fifth embodiment of the present invention.

Next, a description is given, with reference to FIG. 52, of a fifth embodiment, which relates to a touchscreen panel.

According to a touchscreen panel of this embodiment, a resistor Rcx1 connected in series to the first resistive film 10 and a resistor Rcy1 connected in series to the second resistive film 20 are varistors.

The resistance value of the resistor Rcx1 is adjusted to be closest to 75% of the value of the resistance between the XH electrode 11 and the XL electrode 12 in the first resistive film 10. Likewise, the resistance value of the resistor Rcy1 is adjusted to be closest to 75% of the value of the resistance between the YH electrode 21 and the YL electrode 22 in the second resistive film 20.

Specifically, the resistance value of the resistor Rcx1 is adjusted so that the value of the potential detected at the potential detecting part ADX1 is closest to approximately 0.57·Vcc, and likewise, the resistance value of the resistor Rcy1 is adjusted so that the value of the potential detected at the potential detecting part ADY1 is closest to approximately 0.57·Vcc.

According to this embodiment, even if there are variations in touchscreen panels with respect to the first resistive film 10 and the second resistive film 20 due to manufacturing error or the like, it is possible to optimize resistance. Further, it is also possible to optimize resistance in touchscreen panels of different shapes.

Figure 53:
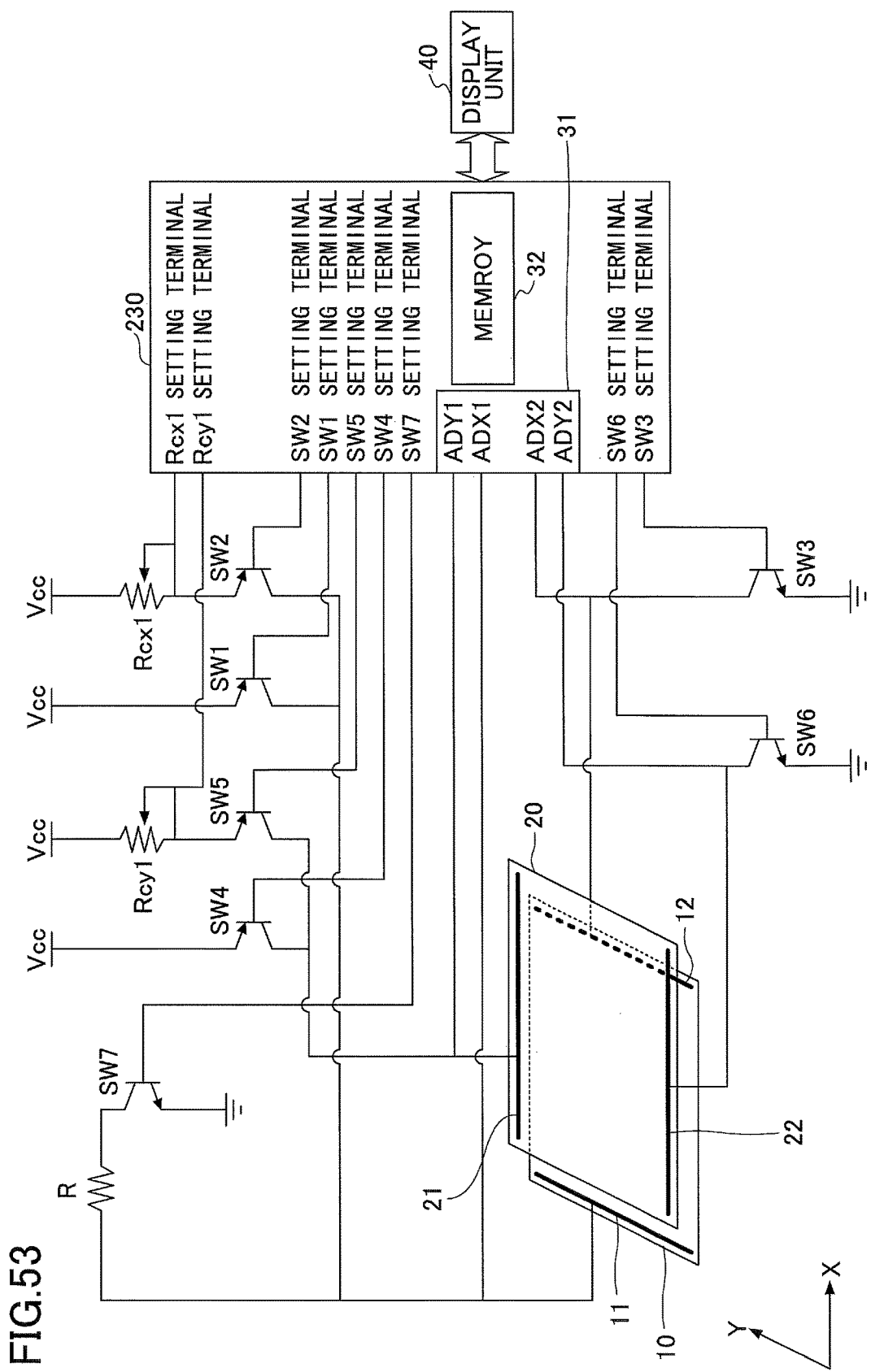
FIG. 53 is a diagram illustrating another touchscreen panel according to the fifth embodiment of the present invention.

Further, FIG. 53 illustrates another touchscreen panel according to this embodiment. The touchscreen panel illustrated in FIG. 53 allows the resistance values of the resistor Rcx1 and the resistor Rcy1 to be set (determined) via an Rcx1 setting terminal and an Rcy1 setting terminal, respectively, in a control part 230.

Figure 54:
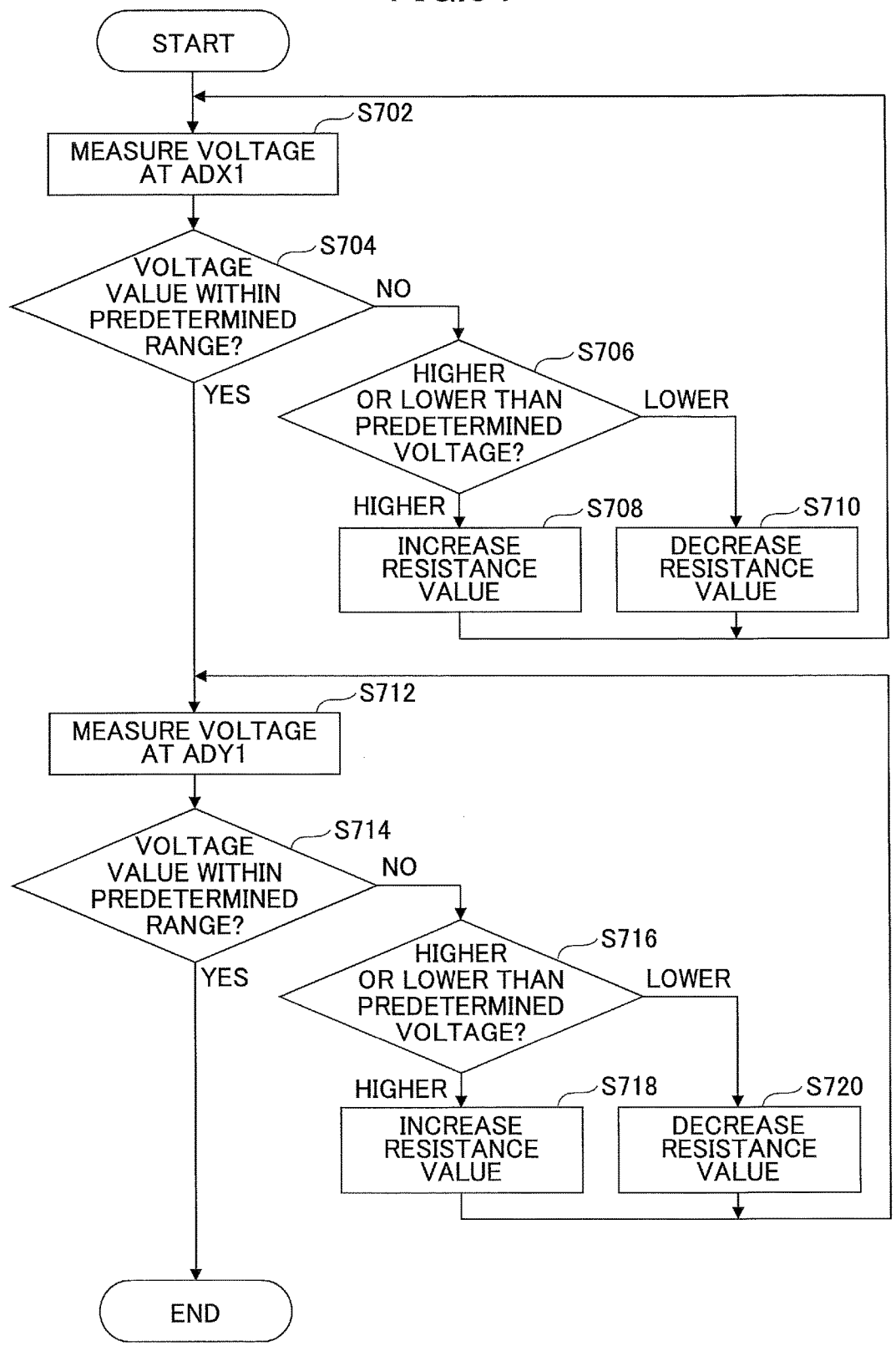
FIG. 54 is a flowchart of a method of setting a resistance value in a touchscreen panel according to the fifth embodiment of the present invention.

Next, a description is given, with reference to FIG. 54, of a method of setting (determining) the resistance values of the resistor Rcx1 and the resistor Rcy1 connected to the first resistive film 10 and the second resistive film 20, respectively, in a touchscreen panel according to this embodiment. All or part of the below-described control is performed based on the control in the control part 30.

First, in step S702, a potential is measured at the potential detecting part ADX1 with application of a supply voltage Vcc.

Next, in step S704, it is determined whether the potential measured at the potential detecting part ADX1 is a value close to 0.57·Vcc. For example, it is determined whether the potential measured at the potential detecting part ADX1 is higher than or equal to 0.2·Vcc and lower than or equal to 0.8·Vcc (in the case of setting the resistance value of the resistor Rcx1 so that the resistance value of the resistor Rcx1 is higher than or equal to 25% and lower than or equal to 400% of the resistance value in the first resistive film 10). If the potential measured at the potential detecting part ADX1 is higher than or equal to 0.2·Vcc and lower than or equal to 0.8·Vcc (YES in step S704), the process proceeds to step S712. If the potential measured at the potential detecting part ADX1 is not higher than or equal to 0.2·Vcc and lower than or equal to 0.8·Vcc (NO in step S704), the process proceeds to step S706.

In the case of setting the resistance value of the resistor Rcx1 so that the resistance value of the resistor Rcx1 is higher than or equal to 50% and lower than or equal to 200% of the resistance value in the first resistive film 10 in step S704, it may be determined whether the potential measured at the potential detecting part ADX1 is higher than or equal to 0.33·Vcc and lower than or equal to 0.67·Vcc. Further, in the case of setting the resistance value of the resistor Rcx1 so that the resistance value of the resistor Rcx1 is higher than or equal to 50% and lower than or equal to 100% of the resistance value in the first resistive film 10 in step S704, it may be determined whether the potential measured at the potential detecting part ADX1 is higher than or equal to 0.5Vcc and lower than or equal to 0.67·Vcc.

In step S706, it is determined whether the potential measured at the potential detecting part ADX1 is higher or lower than the predetermined potential range (for example, 0.2·Vcc through 0.8·Vcc). If the potential measured at the potential detecting part ADX1 is higher than the predetermined potential range (for example, higher than 0.8·Vcc), the process proceeds to step S708. If the potential measured at the potential detecting part ADX1 is lower than the predetermined potential range (for example, lower than 0.2·Vcc), the process proceeds to step S710.

In step S708, adjustment is made to increase the resistance value of the resistor Rcx1. Thereafter, the process proceeds to step S702.

In step S710, adjustment is made to decrease the resistance value of the resistor Rcx1. Thereafter, the process proceeds to step S702.

Next, in step S712, a potential is measured at the potential detecting part ADY1 with application of the supply voltage Vcc.

Next, in step S714, it is determined whether the potential measured at the potential detecting part ADY1 is a value close to 0.57·Vcc. For example, it is determined whether the potential measured at the potential detecting part ADY1 is higher than or equal to 0.2·Vcc and lower than or equal to 0.8·Vcc (in the case of setting the resistance value of the resistor Rcy1 so that the resistance value of the resistor Rcy1 is higher than or equal to 25% and lower than or equal to 400% of the resistance value in the second resistive film 20). If the potential measured at the potential detecting part ADY1 is higher than or equal to 0.2·Vcc and lower than or equal to 0.8·Vcc (YES in step S714), the process ends. If the potential measured at the potential detecting part ADY1 is not higher than or equal to 0.2·Vcc and lower than or equal to 0.8·Vcc (NO in step S714), the process proceeds to step S716.

In the case of setting the resistance value of the resistor Rcy1 so that the resistance value of the resistor Rcy1 is higher than or equal to 50% and lower than or equal to 200% of the resistance value in the second resistive film 20 in step S714, it may be determined whether the potential measured at the potential detecting part ADY1 is higher than or equal to 0.33·Vcc and lower than or equal to 0.67·Vcc. Further, in the case of setting the resistance value of the resistor Rcy1 so that the resistance value of the resistor Rcy1 is higher than or equal to 50% and lower than or equal to 100% of the resistance value in the second resistive film 20 in step S714, it may be determined whether the potential measured at the potential detecting part ADY1 is higher than or equal to 0.5Vcc and lower than or equal to 0.67·Vcc.

In step S716, it is determined whether the potential measured at the potential detecting part ADY1 is higher or lower than the predetermined potential range (for example, 0.2·Vcc through 0.8·Vcc). If the potential measured at the potential detecting part ADY1 is higher than the predetermined potential range (for example, higher than 0.8·Vcc), the process proceeds to step S718. If the potential measured at the potential detecting part ADY1 is lower than the predetermined potential range (for example, lower than 0.2·Vcc), the process proceeds to step S720.

In step S718, adjustment is made to increase the resistance value of the resistor Rcy1. Thereafter, the process proceeds to step S712.

In step S720, adjustment is made to decrease the resistance value of the resistor Rcy1. Thereafter, the process proceeds to step S712.

Thus, it is possible to set the resistance values of the resistor Rcx1 and the resistor Rcy1 to predetermined values in the touchscreen panel of this embodiment.

In the third embodiment through the fifth embodiment, the resistor Rx1, Rx2, or Rx3 and the resistor Rcx1 have their respective first ends connected to the XH electrode 11 and have their respective second ends connected to supply voltage, and the resistor Ry1, Ry2, or Ry3 and the resistor Rcy1 have their respective first ends connected to the YH electrode 21 and have their respective second ends connected to supply voltage. Alternatively, the resistor Rx1, Rx2, or Rx3 and the resistor Rcx1 may have their respective first ends connected to the XL electrode 12 and have their respective second ends grounded, and the resistor Ry1, Ry2, or Ry3 and the resistor Rcy1 may have their respective first ends connected to the YL electrode 22 and have their respective second ends grounded.

Sixth Embodiment

Next, a description is given of a sixth embodiment. According to the touchscreen panel of this embodiment, the touchscreen panel of the first embodiment, the fourth embodiment, or the fifth embodiment is modified to have the resistor Rx1 and the resistor Ry1 connected to the ground side of the touchscreen panel.

Figure 55:
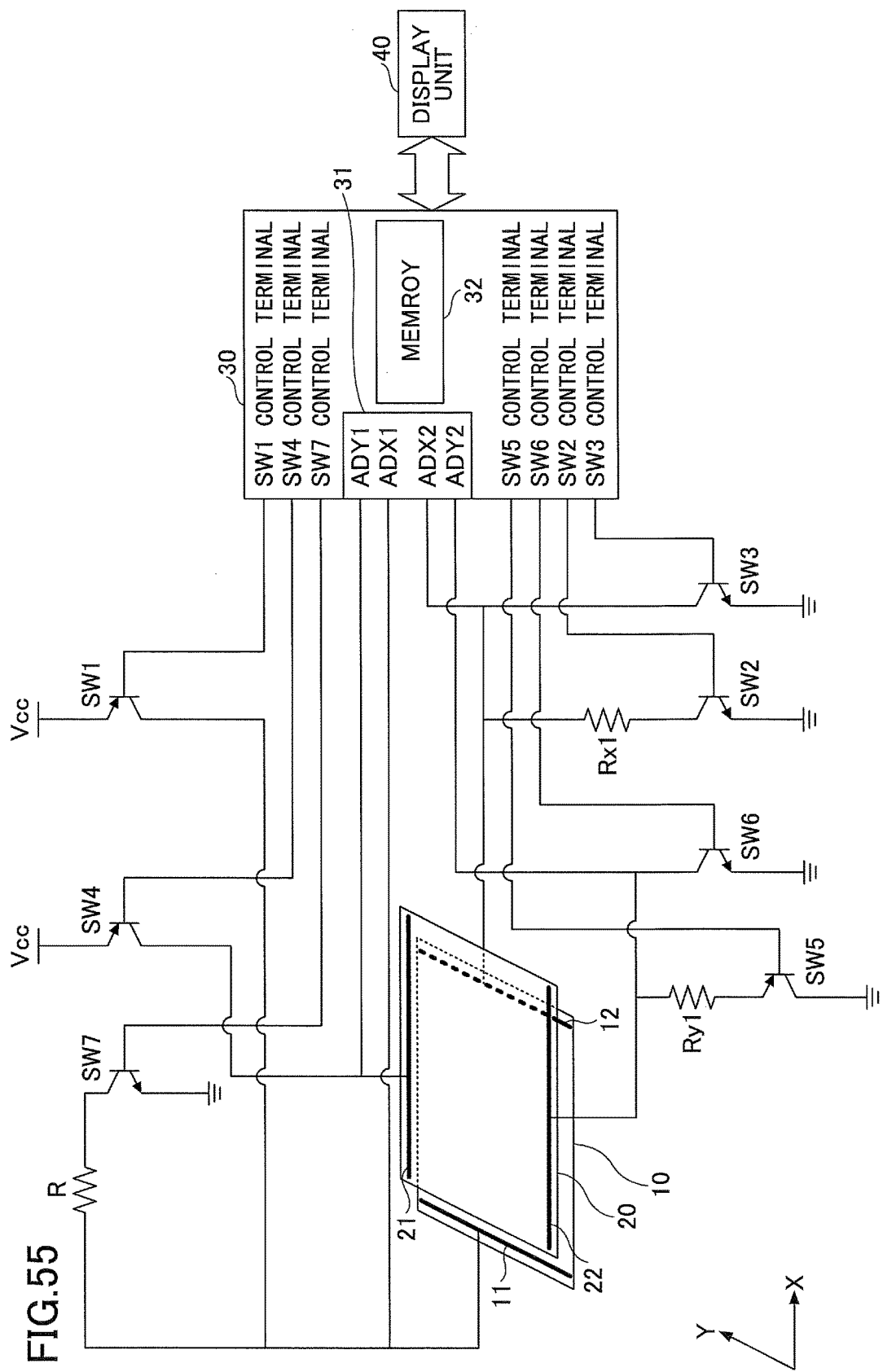
FIG. 55 is a diagram illustrating a touchscreen panel according to a sixth embodiment of the present invention.

First, FIG. 55 illustrates a touchscreen panel according to this embodiment, which corresponds to the touchscreen panel of FIG. 1. In the touchscreen panel of FIG. 55, the touchscreen panel of the first embodiment is modified to have the resistor Rx1 and the resistor Ry1 connected to the ground side. Specifically, the touchscreen panel of FIG. 55 includes the first resistive film 10 and the second resistive film 20, each of which is formed of a transparent electrically conductive film of ITO (indium tin oxide) or the like. The XH electrode 11 and the XL electrode 12 are formed along the Y-axis direction at a first end and a second end, respectively, of the first resistive film 10 in the X-axis direction. Further, the YH electrode 21 and the YL electrode 22 are formed along the X-axis direction at a first end and a second end, respectively, of the second resistive film 20 in the Y-axis direction.

The XH electrode 11, which serves as a first electrode, is connected to the switch SW1, formed of a transistor and connected to a power supply potential Vcc, and to a switch SW7, formed of a transistor and connected to a ground potential via the resistor R. The XH electrode 11 is further connected to the potential detecting part ADX1 for detecting a potential in the analog-to-digital (AD) converter 31 provided in the control part 30.

The XL electrode 12, which serves as a second electrode, is connected to the switch SW3, formed of a transistor and connected to the ground potential, and to the switch SW2, formed of a transistor and connected to the ground potential, via the resistor Rx1. The X1 electrode 12 is further connected to the potential detecting part ADX2 for detecting a potential in the AD converter 31.

The YH electrode 21, which serves as a third electrode, is connected to the switch SW4, formed of a transistor and connected to the power supply potential Vcc, and to the potential detecting part ADY1 for detecting a potential in the AD converter 31 provided in the control part 30.

The YL electrode 22, which serves as a fourth electrode, is connected to the switch SW6, formed of a transistor and connected to the ground potential, and to the switch SW5, formed of a transistor and connected to the ground potential, via the resistor Ry1. The YH electrode 21 is further connected to the potential detecting part ADY2 for detecting a potential in the AD converter 31.

The resistor Rx1, which serves as a first resistor, has a resistance value substantially equal to the value of the resistance between the XH electrode 11 and the XL electrode 12 in the first resistive film 10. The resistor Ry1, which serves as a second resistor, has a resistance value substantially equal to the value of the resistance between the YH electrode 21 and the YL electrode 22 in the second resistive film 20.

The switches SW1, SW2, SW3, SW4, SW3, SW6, and SW7 are connected to the SW1 control terminal, the SW2 control terminal, the SW3 control terminal, the SW4 control terminal, the SW5 control terminal, the SW6 control terminal, and the SW7 control terminal, respectively, provided in the control part 30.

According to the touchscreen panel of the first embodiment, the potential decreases as the distance between two points increases in FIG. 8 through FIG. 10, FIG. 14, FIG. 15, and FIG. 32. On the other hand, in the touchscreen panel having the structure illustrated in FIG. 55 according to this embodiment, the potential increases as the distance between two points increases.

Figure 56:
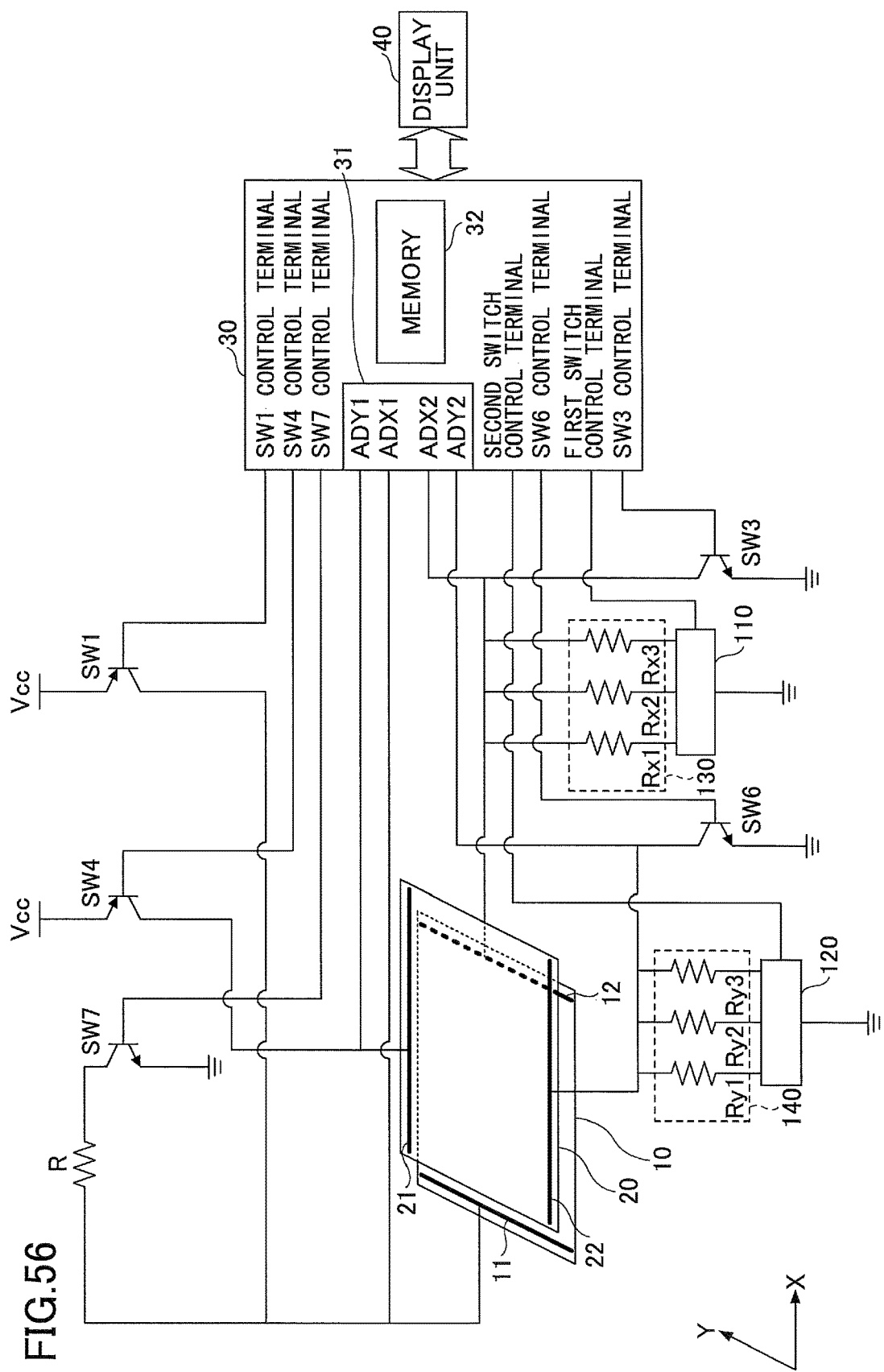
FIG. 56 is a diagram illustrating another touchscreen panel according to the sixth embodiment of the present invention.

Next, FIG. 56 illustrates a touchscreen panel according to this embodiment, which corresponds to the touchscreen panel of FIG. 49. In the touchscreen panel of FIG. 56, the touchscreen panel of the fourth embodiment is modified to have the resistor Rx1, Rx2, or Rx3 and the resistor Ry1, Ry2, or Rx3 connected to the ground side. Specifically, the touchscreen panel of FIG. 56 includes the resistors Rx1, Rx2, and Rx3, each of which is connectable in series to the XL electrode 12 side of the first resistive film 10. By operating the first switch 110, one of the resistors Rx1, Rx2, and Rx3 may be selected to be connected in series to the first resistive film 10. Likewise, the touchscreen panel of FIG. 56 includes the resistors Ry1, Ry2, and Ry3, each of which is connectable in series to the YL electrode 22 side of the second resistive film 20, and by operating the second switch 120, one of the resistors Ry1, Ry2, and Ry3 may be selected to be connected in series to the second resistive film 20. The first switch 110 and the second switch 120 are grounded.

Figure 57:
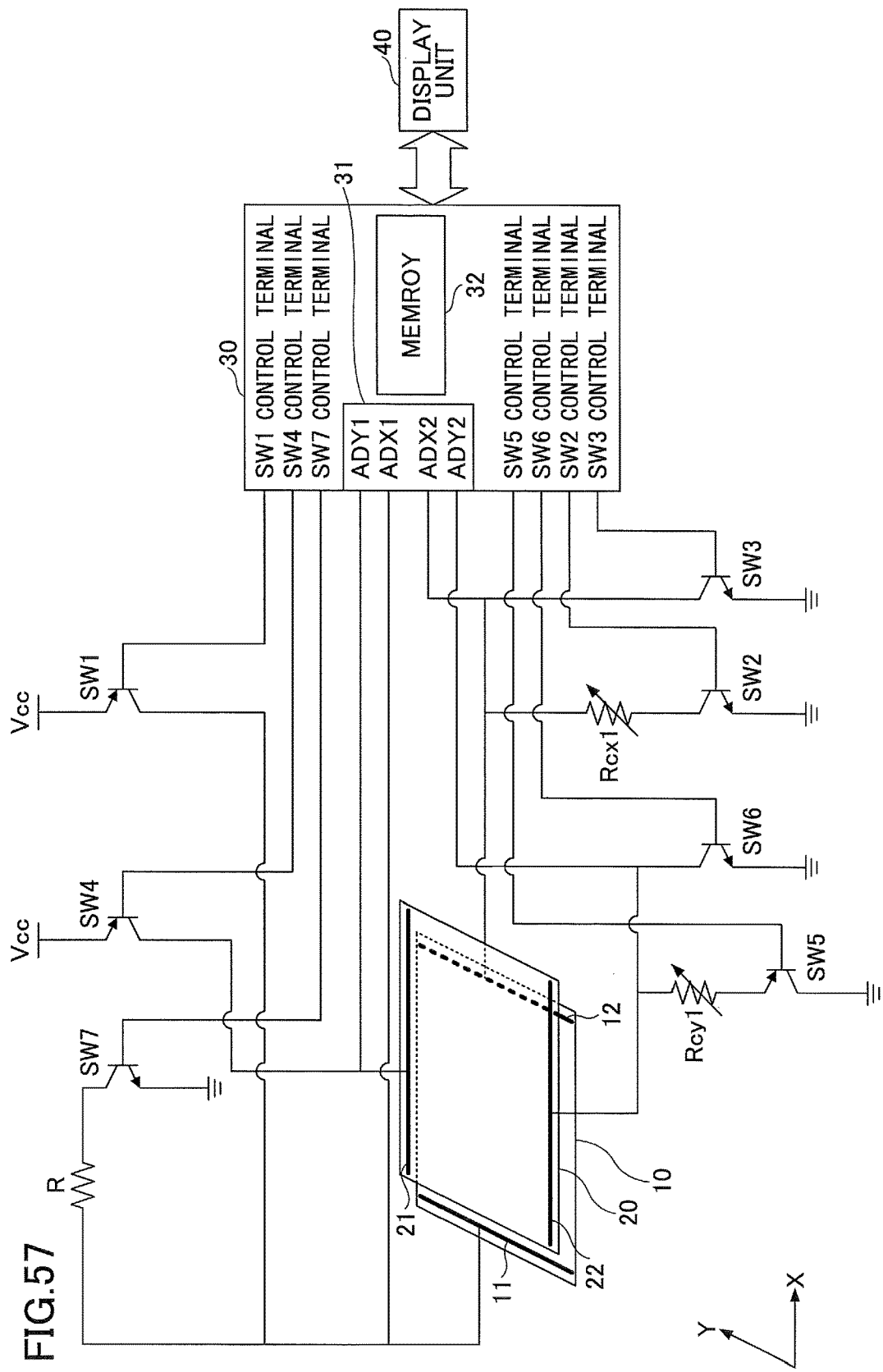
FIG. 57 is a diagram illustrating yet another touchscreen panel according to the sixth embodiment of the present invention.

Next, FIG. 57 illustrates a touchscreen panel according to this embodiment, which corresponds to the touchscreen panel of FIG. 52. In the touchscreen panel of FIG. 57, the touchscreen panel of the fifth embodiment is modified to have the resistors Rcx1 and Rcy1 connected to the ground side of the touchscreen panel. Specifically, the resistor Rcx1, which is formed of a varistor, is connected in series to the XL electrode 12 side of the first resistive film 10, and likewise, the resistor Rcy1, which is formed of a varistor, is connected in series to the YL electrode 22 side of the second resistive film 20. The resistor Rcx1 is grounded via the switch SW2, which is formed of a transistor, and the resistor Rcy1 is grounded via the switch SW5, which is formed of a transistor.

Figure 58:
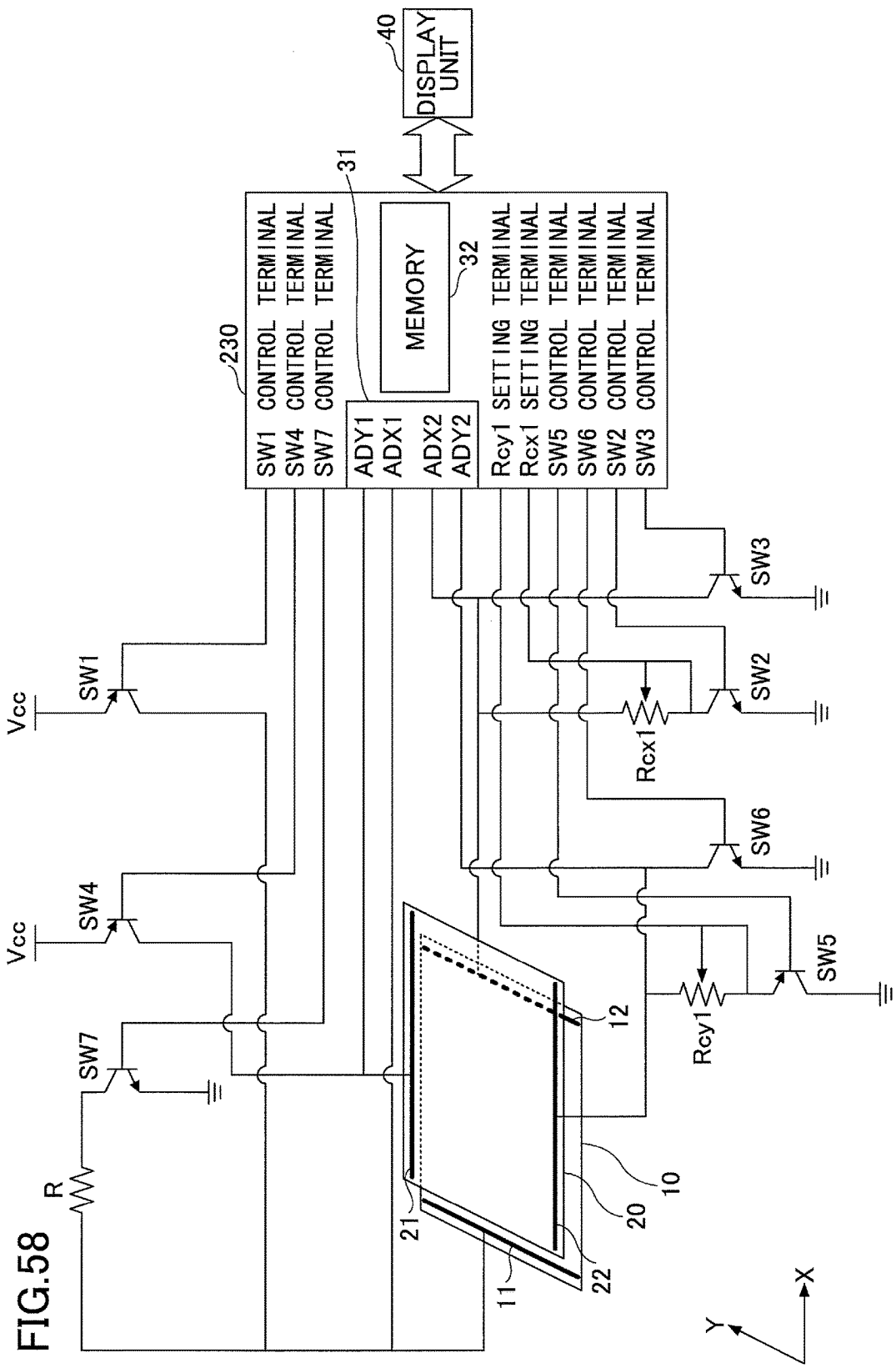
FIG. 58 is a diagram illustrating yet another touchscreen panel according to the sixth embodiment of the present invention.

Next, FIG. 58 illustrates a touchscreen panel according to this embodiment, which corresponds to the touchscreen panel of FIG. 53. In the touchscreen panel of FIG. 58, the touchscreen panel of the fifth embodiment is modified to have the resistors Rcx1 and Rcy1 connected to the ground side of the touchscreen panel. Specifically, the resistor Rcx1 is connected in series to the XL electrode 12 side of the first resistive film 10, and likewise, the resistor Rcy1 is connected in series to the YL electrode 22 side of the second resistive film 20. The resistor Rcx1 is grounded via the switch SW2, which is formed of a transistor, and the resistor Rcy1 is grounded via the switch SW5, which is formed of a transistor. The resistance values of the resistor Rcx1 and the resistor Rcy1 may be set via the Rcx1 setting terminal and the Rcy1 setting terminal, respectively, in the control part 230.

Seventh Embodiment

Next, a description is given of a seventh embodiment. This embodiment relates to a method of initializing the touchscreen panel or the like in the first embodiment. Specifically, this embodiment relates to an initialization method for performing position detection with more accuracy in the case where the touchscreen panel is contacted at two points.

Figure 59:
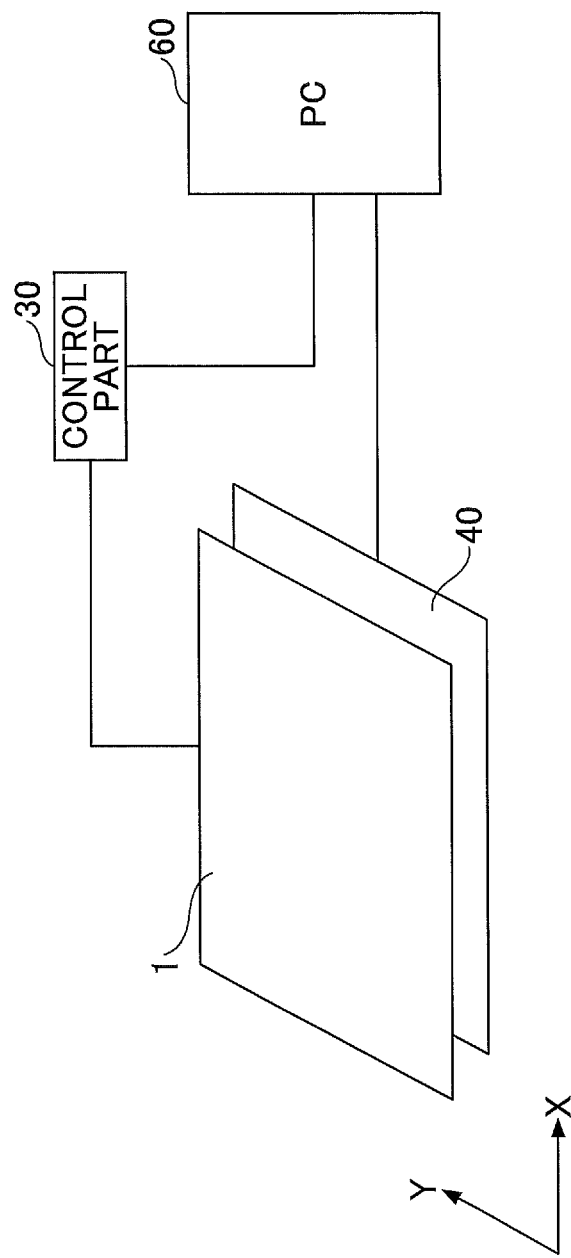
FIG. 59 is a diagram for illustrating a touchscreen panel according to a seventh embodiment of the present invention.

According to the initialization method of this embodiment, as illustrated in FIG. 59, initialization is performed with a touchscreen panel 1, which is the touchscreen panel of the first embodiment, being placed at a predetermined position on the display unit 40 connected to a personal computer (PC) 60. The display unit 40 may be directly connected to the control part 30 of the touchscreen panel 1 without intervention of the personal computer 60. In this case, the touchscreen panel 1 may form part of the display unit 40.

Figure 60:
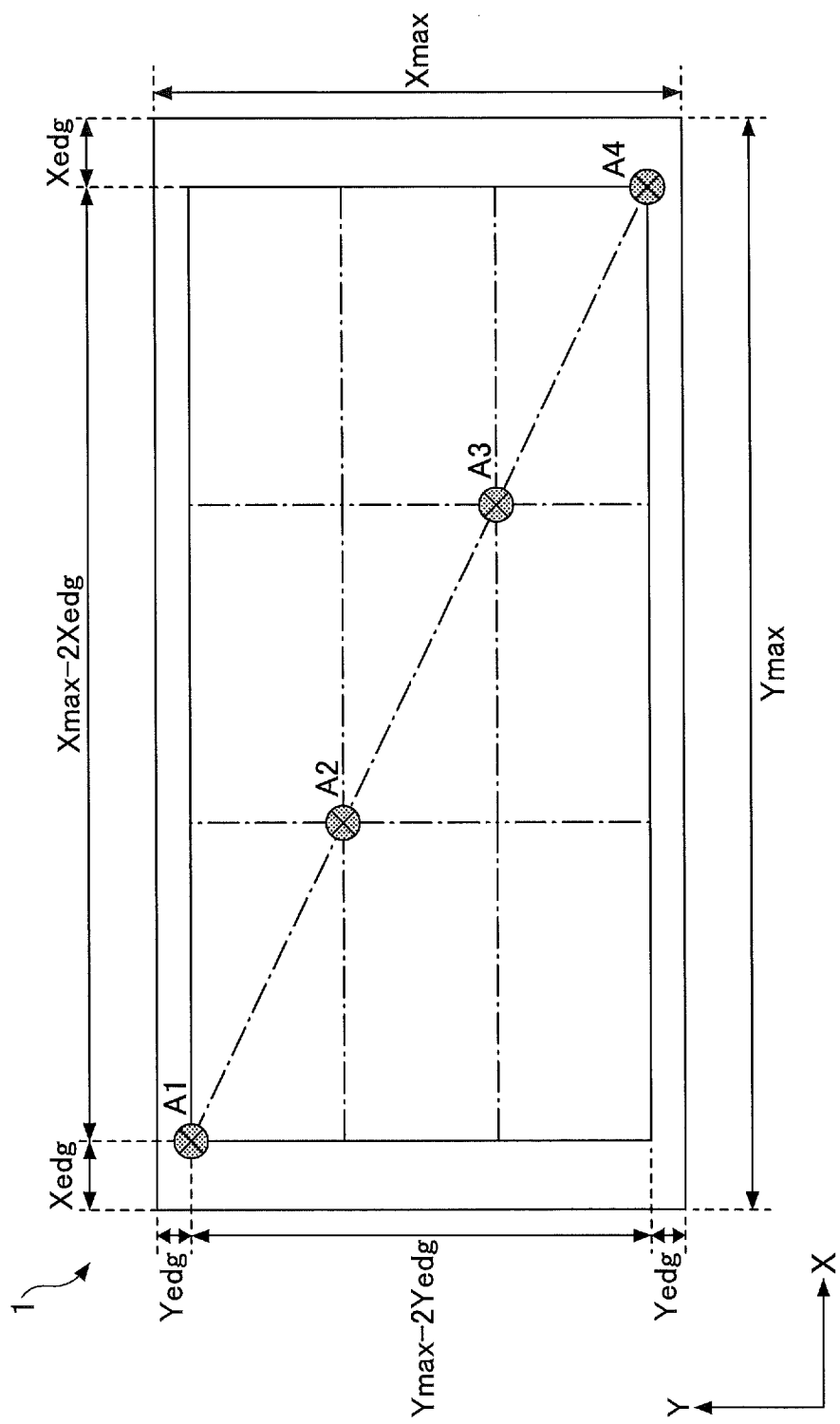
FIG. 60 is a diagram for illustrating a method of initializing a touchscreen panel according to the seventh embodiment of the present invention.

According to this embodiment, as illustrated in FIG. 60, Point A1, Point A2, Point A3, and Point A4 are displayed in time with pressing on the display screen of the display unit 40, on which the touchscreen panel 1 is provided, and the touchscreen panel 1 may be initialized by pressing displayed Points A1 through A4. Points A1 and A4 are positioned diagonally on the display screen of the display unit 40, each being inside the display screen with a margin of Xedg in the X-axis direction and a margin of Yedg in the Y-axis direction. Point A2 and Point A3 are positioned at respective coordinates that trisect the distance in the X-axis direction and the distance in the Y-axis direction between Point A1 and Point A4. Therefore, Point A1, Point A2, Point A3, and Point A4 are on the same straight line. Point A1, Point A2, Point A3, and Point A4 may be at positions other than the above-described positions that trisect the distances in the X-axis direction and the Y-axis direction as long as Point A1, Point A2, Point A3, and Point A4 are four points on the display screen of the display unit 40.

Figure 61A:
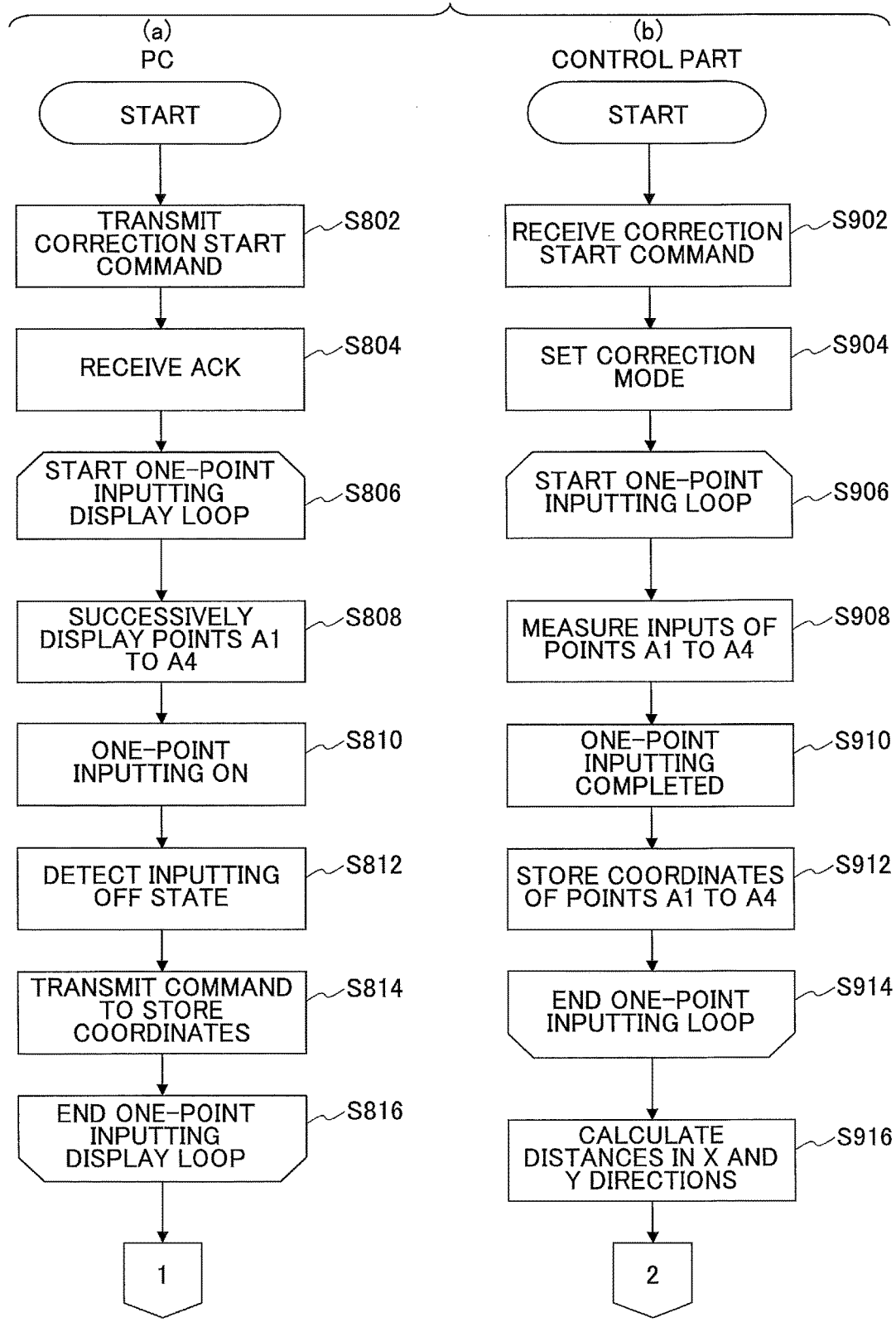

Next, a description is given, with reference to FIGS. 61A and 61B, of an initialization method according to this embodiment. In FIGS. 61A and 61B, (a) illustrates a flow executed in the personal computer 60 and (b) illustrates a flow executed in the control part 30 of the touchscreen panel 1. A description is given of this embodiment while correlating the two flowcharts.

First, the personal computer 60 and the touchscreen panel 1 are turned on.

Next, in step S802, a correction start command is transmitted from the personal computer 60 to the touchscreen panel 1. This correction start command means the start of initialization of the touchscreen panel 1 in this embodiment. As a result, in step S902, the control part 30 of the touchscreen panel 1 receives the correction start command transmitted from the personal computer 60, and transmits an ACK (acknowledgement) signal to the personal computer 60. Then, the process proceeds to step S904. In step S904, the control part 30 sets the touchscreen panel 1 to a correction mode different from a mode for normal touchscreen panel input operations in order to start initialization.

Next, in step S804, the personal computer 60 receives the ACK signal transmitted from the control part 30, and proceeds to a loop that performs a display operation for performing one-point inputting as illustrated in steps S806 through S816. Steps S906 through S914 are a loop in the control part 30 corresponding to steps S806 through S816.

In the loop of steps S806 through S816, first, in step S808, Point A1 is displayed on the display screen of the display unit 40.

Next, in step S810, one-point inputting is performed by pressing Point A1, so that one-point inputting is ON. This information is transmitted from the personal computer 60 to the control part 30. In step S908, based on this information, the potential of Point A1 is measured in the X-axis direction and the Y-axis direction in the control part 30.

Next, in step S812, the pressing of Point A1 is canceled, that is, there is no press on Point A1, so that the OFF state of inputting is detected. This information is transmitted from the personal computer 60 to the control part 30. Based on this information, the one-point inputting of Point A1 is completed and the coordinate position of Point A1 is calculated in the control part 30 in step S910.

Next, in step S814, a command to store the coordinates of Point A1 is transmitted from the personal computer 60 to the control part 30. In step 912, the control part 30 stores the coordinate position of Point A1.

In the loop of steps S806 through S816, the same operation is performed with respect to each of the four points of Point A1, Point A2, Point A3, and Point A4. Specifically, in step S808, Point A1, Point A2, Point A3, and Point A4 are successively displayed, and the coordinate positions of Point A1, Point A2, Point A3, and Point A4 are detected and stored by pressing respective predetermined positions. That is, steps S806 through S816 and steps S906 through S914 are sequentially performed with respect to Point A1, Point A2, Point A3, and Point A4.

Next, in step S916, the distance in the X-axis direction and the distance in the Y-axis direction between Point A and each of Points A2 through A4 are calculated and stored. Specifically, based on the coordinate positions of Point A1, Point A2, Point A3, and Point A4 determined in the loop of steps S806 through S816 and the loop of steps S906 through S914, that is, Point A1 (XA1, YA1), Point A2 (XA2, YA2), Point A3 (XA3, YA3), and Point A4 (XA4, YA4), the distance between Point A1 and Point A2 (LXA2A1, LYA2A1), the distance between Point A1 and Point A3 (LXA3A1, LYA3A1), and the distance between Point A1 and Point A4 (LXA4A1, LYA4A1) are calculated based on the following equations (Eqs. (3)):

$$A2(XA2,YA2)-A1(XA1,YA1)=(LXA2A1,LYA2A1),$$

$$A3(XA3,YA3)-A1(XA1,YA1)=(LXA3A1,LYA3A1), \text{ and}$$

$$A4(XA4,YA4)-A1(XA1,YA1)=(LXA4A1,LYA4A1).$$

Next, the process proceeds to a loop for performing a display operation for performing two-point inputting as illustrated in steps S822 through S832 in FIG. 61B. Steps S922 through S930 in FIG. 61B are a loop in the control part 30 corresponding to steps S822 through S832.

In the loop of steps S822 through S832, first, in step S824, Point A1 and Point A2 are displayed on the display screen of the display unit 40.

Next, in step S826, two-point inputting is performed by simultaneously pressing Point A1 and Point A2, so that two-point inputting is ON. This information is transmitted from the personal computer 60 to the control part 30. Based on this information, a subroutine for calculating an average is executed in the control part 30 in step S924. A description is given below of the subroutine of step S924 for calculating an average.

Next, in step S828, the pressing of Point A1 and Point A2 is canceled, that is, there is no press on either Point A1 or Point A2, so that the OFF state of two-point inputting is detected. This information is transmitted from the personal computer 60 to the control part 30. Based on this information, the two-point inputting of Point A1 and Point A2 is completed and voltage drop values in this state are measured in the control part 30 in step S926.

Next, in step S830, a command to store the voltage drop values is transmitted from the personal computer 60 to the control part 30. In step S928, the voltage drop values in the case of pressing the two points of Point A1 and Point A2 are stored in the control part 30.

In the loop of steps S822 through S832, the same operation is performed three times in total, that is, with respect to the two points of Point A1 and Point A2, the two points of Point A1 and Point A3, and the two points of Point A1 and Point A4. Specifically, in step S824, Point A1 and Point A2 in combination, Point A1 and Point A3 in combination, and Point A1 and Point A4 in combination are successively displayed, and voltage drop values in the case of pressing Point A1 and Point A2, pressing Point A1 and Point A3, and pressing Point A1 and Point A4 are detected and stored by pressing the predetermined positions of the two points. That is, steps S822 through S832 and steps S922 through S930 are sequentially performed with respect to these combinations of points.

Next, in step S932, approximation equations are calculated. Specifically, based on the distance between Point A1 and Point A2, the distance between Point A1 and Point A3, and the distance between Point A1 and Point A4 in each of the X-axis direction and the Y-axis direction illustrated in Eqs. (3) and on the voltage drop values in the X-axis direction and the Y-axis direction in the case of pressing Point A1 and Point A2, pressing Point A1 and Point A3, and pressing Point A1 and Point A4, detected in the loop of steps S822 through S832 and the loop of steps S922 through S930, $\alpha_2$, $\beta_2$, and $\gamma_2$ in the diagonal X direction approximation equation and $\alpha_4$, $\beta_4$, and $\gamma_4$ in the diagonal Y direction approximation equation illustrated in Eqs. (1) may be determined. Therefore, it is possible to calculate approximation equations based on the equations illustrated in Eqs. (1). Specifically, position coordinates and voltage drop values in the X-axis direction and the Y-axis direction may be determined in the three different contact point combinations of Point A1 and Point A2, Point A1 and Point A3, and Point A1 and Point A4. Therefore, the three unknowns $\alpha_2$, $\beta_2$, and $\gamma_2$ in the X-axis direction and the three unknowns $\alpha_4$, $\beta_4$, and $\gamma_4$ in the Y-axis direction may be calculated. Likewise, by pressing points to be pressed arranged along the X-axis direction and the Y-axis direction instead of points to be pressed in diagonal directions, $\alpha_1$, $\beta_1$, and $\gamma_1$ in the parallel direction approximation equation and $\alpha_3$, $\beta_3$, and $\gamma_3$ in the perpendicular direction approximation equation illustrated in Eqs. (1) may be determined.

Next, in step S934, the approximation equations are stored. The stored approximation equations are used for position detection in the case of two contact points in the touchscreen panel in this embodiment.

Figure 62:
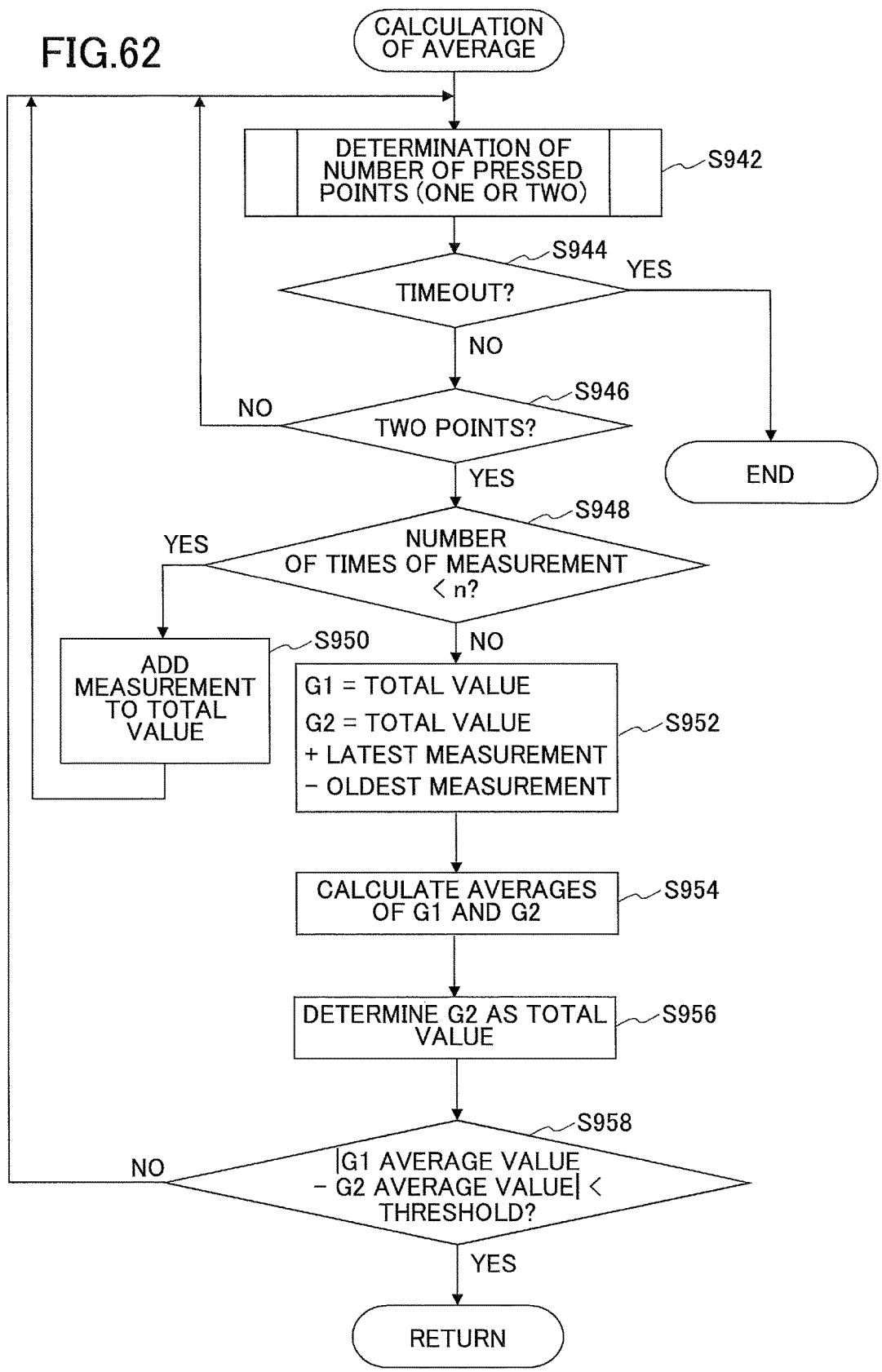
FIG. 62 is another flowchart of the method of initializing a touchscreen panel according to the seventh embodiment of the present invention.

Next, a description is given, with reference to FIG. 62, of the subroutine for average calculation in step S924.

First, in step S942, it is determined whether the touchscreen panel is pressed at one point or two points.

Next, in step S944, it is determined whether a timeout has occurred with a fixed amount of time having elapsed. Specifically, steps S942 through S946 form a loop, and if a fixed amount of time has elapsed during this period, it is determined that a timeout has occurred. Accordingly, if it is determined that a timeout has occurred (YES in step S944), the process ends. On the other hand, if a timeout has not occurred (NO in step S944), the process proceeds to step S946. The fixed amount of time is predetermined.

Next, in step S946, it is determined whether the input is made at two points. If it is determined that the input is made at two points (YES in step S946), the process proceeds to step S948. On the other hand, if it is determined that the input is not made at two points (NO in step S946), the process proceeds to step S942.

In step S948, the number of times of measurement is less than a predetermined number of times n. If it is determined that the number of times of measurement is less than a predetermined number of times n (YES in step S948), the process proceeds to step S950. On the other hand, if the number of times of measurement is not less than (that is, the number of times of measurement is more than or equal to) a predetermined number of times n (NO in step S948), the process proceeds to step S952.

Next, in step S950, a new measurement (a newly determined value) is added to a total value. In this subroutine, the initial total value, which is an initialized value, is zero. Therefore, by repeating step S950, new measurements are added to the total value one after another.

Next, in step S952, the total value is determined as G1, and a value obtained by (the total value+the latest [(n+1)$^{th}$] measurement−the oldest [earliest] measurement) is determined as G2. Thereby, each of the G1 total value and the G2 total value is the sum of the values determined by n times of measurement.

Next, in step S954, the average of G1 is calculated by dividing the value of G1 by n, and the average of G2 is calculated by dividing the value of G2 by n. The average of G2 is the moving average subsequent to the average of G1.

Next, in step S956, the value of G2 replaces the value of G1 as the total value.

Next, in step S958, it is determined whether the absolute value of the difference between the average of G1 and the average of G2 (|the average of G1−the average of G2|) is less than or equal to a predetermined threshold. If |the average of G1−the average of G2| is less than or equal to a predetermined threshold (YES in step S958), the process returns to the main routine illustrated in FIG. 61B. On the other hand, if |the average of G1−the average of G2| is not less than or equal to a predetermined threshold (NO in step S958), the process proceeds to step S942. The threshold is provided in order to determine the stability of a measured voltage value, and is determined from such a viewpoint.

Thereby, this subroutine ends.

In this embodiment, a description is given of the case where the combinations of two points of contact are Point A1 and Point A2, Point A1 and Point A3, and Point A1 and Point A4. However, the combinations of two points of contact may also be Point A1 and Point A4, Point A2 and Point A4, and Point A3 and Point A4. Preferably, one of the two points of contact in combination is either end point A1 or A4 because this allows accurate approximation equations to be obtained.

Figure 63:
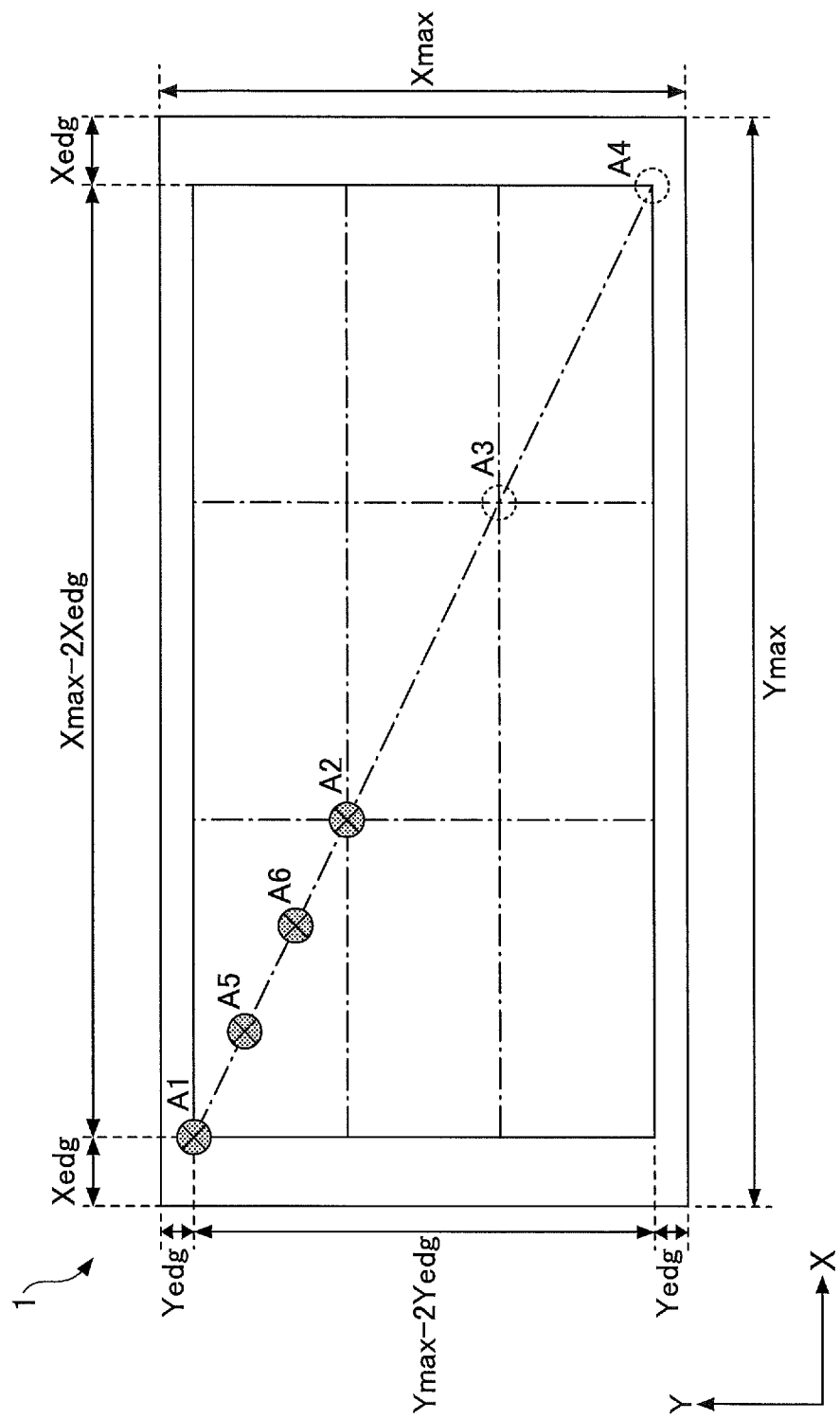
FIG. 63 is a diagram for illustrating another method of initializing a touchscreen panel according to the seventh embodiment of the present invention.

Further, an error is likely to occur with respect to the combination of Point A1 and Point A2. Therefore, as illustrated in FIG. 63, the distance between Point A1 and Point A2 is further trisected to create Point A5 and Point A6, approximation equations between Point A1 and Point A2 may be separately calculated by repeating the initialization process illustrated in FIGS. 61A and 61B and FIG. 62 with respect to Point A1, Point A5, Point A6, and Point A2. In this case, the process is executed by regarding Point A5, Point A6, and Point A2 as corresponding to Point A2, Point A3, and Point A4, respectively, in the flowchart of FIGS. 61A and 61B and FIG. 62.

In the above-described case, $L_2$ and $L_4$ in the cubic equations illustrated in Eqs. (2) may be calculated by using any five points of Point A1, Point A2, Point A3, Point A4, Point A5, and Point A6. Further, $L_1$ and $L_3$ illustrated in Eqs. (2) also may be calculated by pressing five points arranged in the X-axis direction and five points arranged in the Y-axis direction.

As a method of increasing the accuracy of the distance between two points, the distance between two input points is finely determined, and for example, the relationship between the distance and a potential difference due to a voltage drop caused by two-point inputting as illustrated in FIG. 33 is stored as a table, thereby determining curves passing through these input points, for example, spline curves. These spline curves may be determined as quadratic equations as illustrated in Eqs. (1). As a result, the distance between two points may be calculated with accuracy from the potentials measured during the two-point inputting operation.

Further, the calculation of an approximation equation for calculating the coordinates of two points may be simplified by the following method. Specifically, a typical touchscreen panel is selected from touchscreen panels of different sizes, and potential differences due to voltage drops caused by multiple times of two-point inputting operations on the selected touchscreen panel are stored as a table in a read-only memory (ROM) or the like. Thereafter, a touchscreen panel different from the selected touchscreen panel is connected to a circuit board having a control part, and the potential difference ratio with respect to the case of inputting at two points of a maximum distance in this combination is calculated. The coordinates of two points adjusted for the connected (different) touchscreen panel may be determined by multiplying the respective stored values of the other combinations of two input points by the above-described potential difference ratio, which is the ratio of the potential difference due to a voltage drop measured in the case of inputting at two points of a maximum distance in the different touchscreen panel to that in the selected touchscreen panel.

Further, according to this embodiment, a description is given of the case of calculating the quadratic approximation equations illustrated in Eqs. (1) in step S932. Alternatively, however, linear approximation equations linearly connecting Point A1 and Point A2, Point A2 and Point A3, and Point A3 and Point A4, respectively, may be calculated. Specifically, linear approximation equations as illustrated in Eqs. (4) may be calculated based on measured values. In this case, the values of $\varepsilon_1$ through $\varepsilon_6$ and $\eta_1$ through $\eta_6$ may be calculated based on values at the two linearly connected points.

$Lx = \varepsilon_1 V + \eta_1 (XA1 \le Lx \le XA2)$, $Lx = \varepsilon_2 V + \eta_2 (XA2 \le Lx \le XA3)$, $Lx = \varepsilon_3 V + \eta_3 (XA3 \le Lx \le XA4)$, $Ly = \varepsilon_4 V + \eta_4 (XY1 \le Lx \le XY2)$, $Ly = \varepsilon_5 V + \eta_5 (XY2 \le Lx \le XY3)$, and $Ly = \varepsilon_6 V + \eta_6 (XY3 \le Lx \le XY4)$.

Eighth Embodiment

Figure 64:
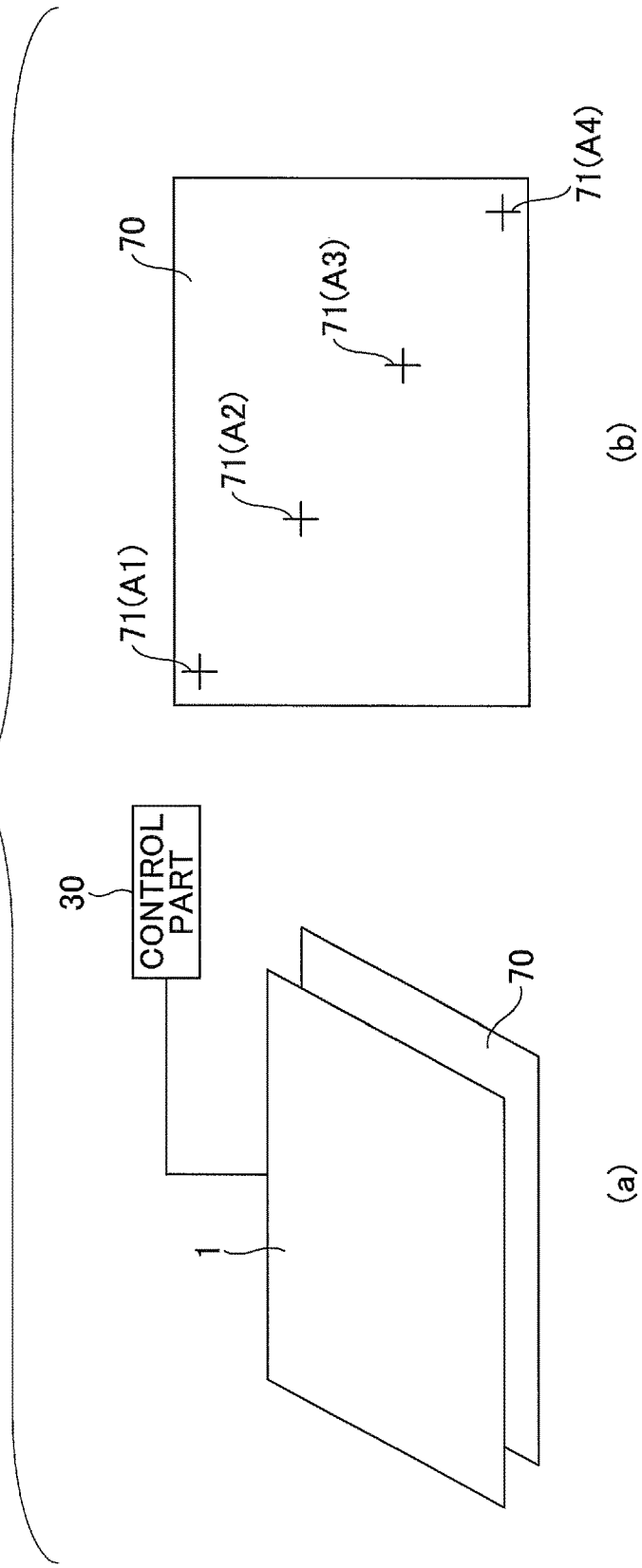
FIG. 64 is a diagram for illustrating a touchscreen panel according to an eighth embodiment of the present invention.

Next, a description is given of an eighth embodiment. This embodiment relates to a method of performing initialization without using the display unit 40. Specifically, as illustrated in FIG. 64, in place of the display unit 40, a display jig 70 is used that is provided with marks 71 formed by printing at the positions of Point A1, Point A2, Point A3, and Point A4. The touchscreen panel 1 is provided on this display jig 70 and is initialized in the same manner as in the seventh embodiment. In FIG. 64, (a) is a perspective view of a configuration for this method, and (b) is a plan view of the display jig 70.

Figure 65:
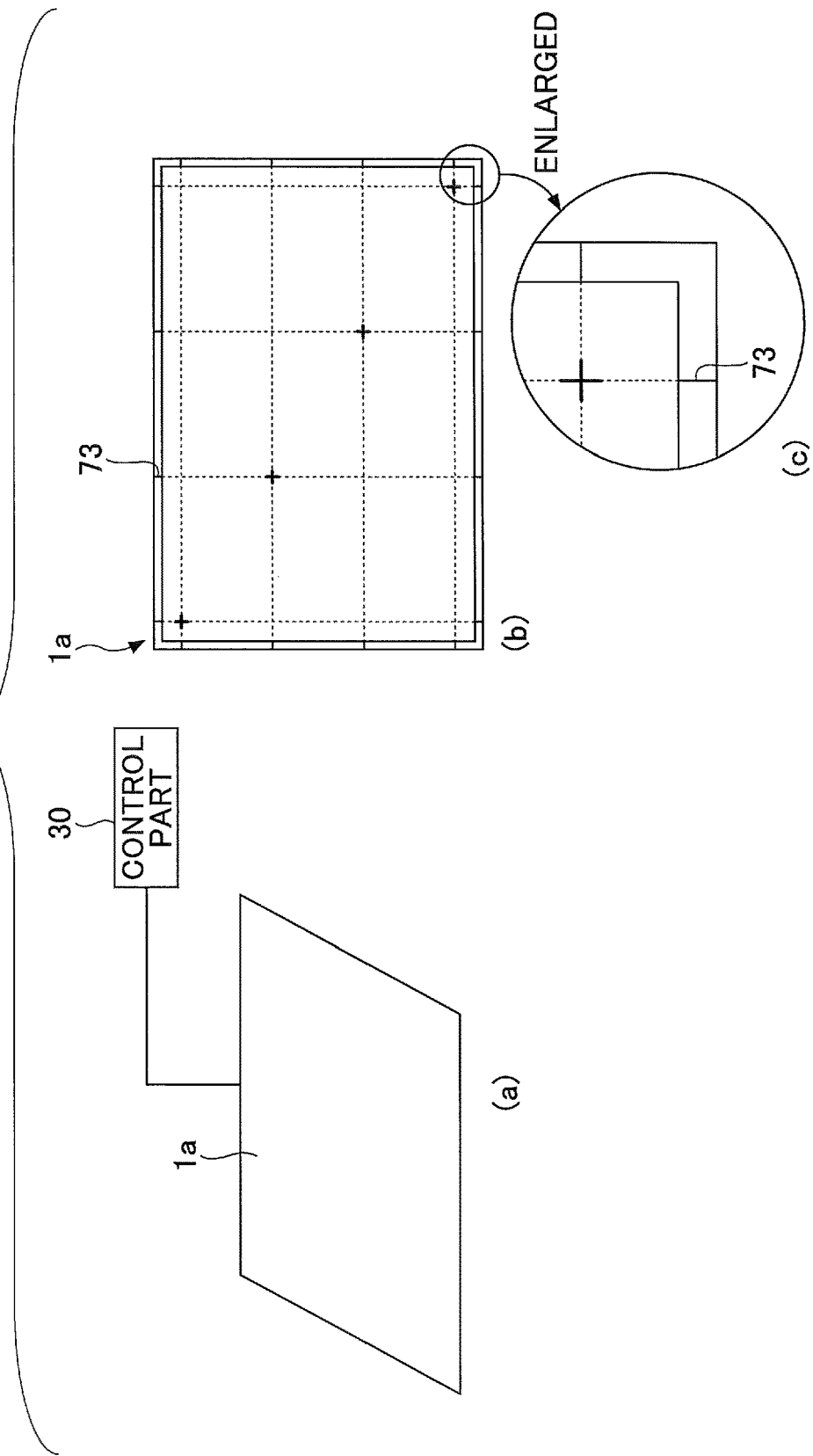
FIG. 65 is a diagram for illustrating another touchscreen panel according to the eighth embodiment of the present invention.

Further, as illustrated in FIG. 65, a touchscreen panel 1a may be used that has marks 73 indicating the positions of Point A1, Point A2, Point A3, and Point A4 provided in its periphery. These marks 73 may be formed of electrically conductive paste or the like. Specifically, these marks 73 are formed so that the straight lines connecting the marks 73 provided at opposite positions in the X-axis direction and the straight lines connecting the marks 73 provided at opposite positions in the Y-axis direction cross at the positions of Point A1, Point A2, Point A3, and Point A4, thereby indicating points to be contact points. In FIG. 65, (a) is a perspective view of a configuration for this method, (b) is a plan view of the touchscreen panel 1a, and (c) is an enlarged view of the circled portion of the touchscreen panel 1a illustrated in (b).

Figure 66:
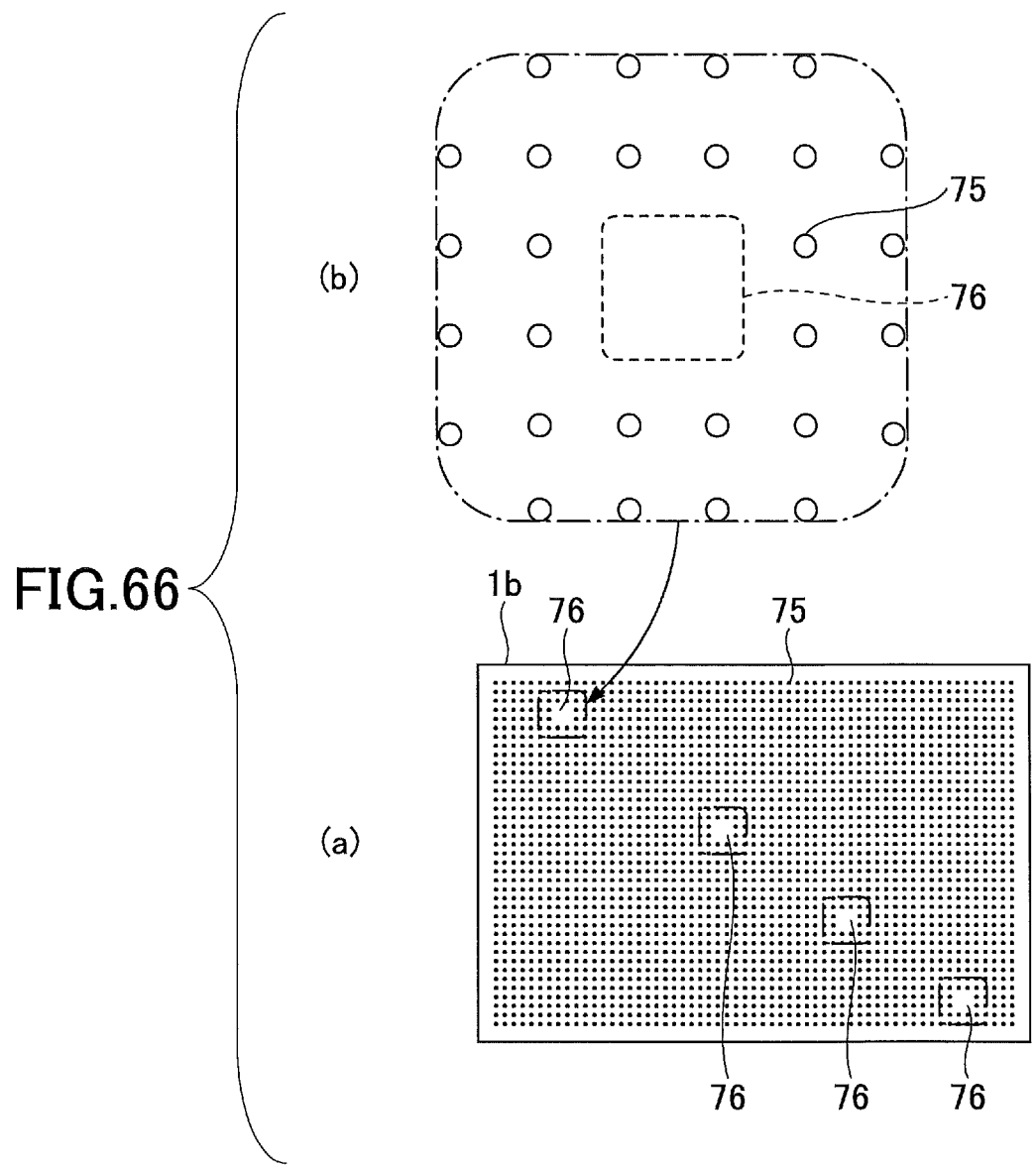
FIG. 66 is a diagram for illustrating another touchscreen panel according to the eighth embodiment of the present invention.

Further, as illustrated in FIG. 66, a touchscreen panel 1b may be used where pressing areas 76 are formed by thinning out dot spacers 75 at positions corresponding to Point A1, Point A2, Point A3, and Point A4. The pressing areas 76 are points to serve as contact points. In FIG. 66, (a) is a plan view of the touchscreen panel 1b, and (b) is an enlarged view of part of the touchscreen panel 1b including one of the pressing areas 76.

All examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to a showing of the superiority or inferiority of the invention. Although the embodiments of the present invention have been described in detail, it should be understood that various changes, substitutions, and alterations could be made hereto without departing from the spirit and scope of the invention.

What is claimed is:

1. A touchscreen panel that is controlled by a controller including a potential detecting part, comprising:
    a first resistive film having a first electrode and a second electrode provided at corresponding ends thereof in a first direction;
    a second resistive film having a third electrode and a fourth electrode provided at corresponding ends thereof in a second direction perpendicular to the first direction; and
    a switch having a first end connected to the first electrode and a second end connected to a first end of a resistor group including a plurality of resistors, the resistor group having a second end connected to a certain electric potential,
    the switch being configured to always select one of the resistors of the resistor group, that has a resistance value that is closest to 75% of the first resistive film between the first electrode and the second electrode regardless of a value of the certain electric potential connected to the resistor group, to be connected in series to the first resistive film, thereby determining, by the controller, whether the touch screen is pressed at one point or two points based on a difference between a potential at the first electrode detected by the potential detecting part when the touchscreen is pressed at the one point and another potential at the first electrode detected by the potential detecting part when the touchscreen is pressed at the two points.

2. The touchscreen panel as claimed in claim 1, further comprising:
    a second switch having a first end connected to the third electrode and a second end connected to a first end of a second resistor group including a plurality of resistors, the second resistor group having a second end connected to a certain electric potential,
    the second switch being configured to always select one of the resistors of the second resistor group, that has a resistance value that is closest to 75% of the second resistive film between the third electrode and the fourth electrode regardless of a value of the certain electric potential connected to the second resistor group, to be connected in series to the second resistive film, thereby determining, by the controller, whether the touch screen is pressed at the one point or the two points based on the difference between the potential detected at the third electrode by the potential detecting part when the touchscreen is pressed at the one point and another potential at the third electrode detected by the potential detecting part when the touchscreen is pressed at the two points.

* * * * *